United States Patent
Muto et al.

(10) Patent No.: US 9,372,558 B2
(45) Date of Patent: Jun. 21, 2016

(54) SETTING VIBRATION PORTIONS IN PIECES OF ELECTRONIC DATA THAT ARE DISPLAYABLE ON A DISPLAY DEVICE

(71) Applicant: International Business Machines Corporation, Armonk, NY (US)

(72) Inventors: Satoshi Muto, Tokyo (JP); Satoshi Yokoyama, Chiba (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 13/719,716

(22) Filed: Dec. 19, 2012

(65) Prior Publication Data

US 2013/0162568 A1    Jun. 27, 2013

(30) Foreign Application Priority Data

Dec. 21, 2011 (JP) ................................. 2011-279481

(51) Int. Cl.
G06F 3/041 (2006.01)
G06F 3/0484 (2013.01)

(52) U.S. Cl.
CPC ............ *G06F 3/041* (2013.01); *G06F 3/04847* (2013.01)

(58) Field of Classification Search
CPC . G06F 3/041; G06F 3/04847; G06F 15/0291; G06F 17/241; H04L 65/4092; H04N 21/21805; H04W 12/06; H04M 1/2755
See application file for complete search history.

(56) References Cited

U.S. PATENT DOCUMENTS 5,663,748 A * 9/1997 Huffman et al. .............. 345/173
(Continued)

FOREIGN PATENT DOCUMENTS

| JP | 2000250606 A | 9/2000 |
| JP | 2002149312 A | 5/2002 |

(Continued)

OTHER PUBLICATIONS

Kanbe Atsushi et al., "Virtual Motor Training Environment for Feedback Control of Large Motion of Upper Extremity," IEICE Technical Report, The Institute of Electronics, Infomation and Communication Engineers, vol. 108, No. 146, p. 51-56, Jul. 12, 2008.

*Primary Examiner* — Aneeta Yodichkas
*Assistant Examiner* — Richard Hong
(74) *Attorney, Agent, or Firm* — Cantor Colburn LLP; David B. Woycechowsky

(57) ABSTRACT

Vibration portions are set in electronic data displayable on a display device. In response to a first portion in the one or more pieces of electronic data being specified on the display device, an embodiment sets the specified first portion as a first vibration portion. The first vibration portion triggers a first vibration in response to the first vibration portion being specified with a movable object. Moreover, in response to a second portion in the one or more pieces of electronic data being specified on the display device, an embodiment sets the specified second portion as a second vibration portion. The second vibration portion triggers the second vibration in response to the second vibration portion being specified with a movable object. The data storing settings for generating the first vibration and the second vibration include an order in which the first vibration and the second vibration are generated.

18 Claims, 32 Drawing Sheets

(56) References Cited

U.S. PATENT DOCUMENTS

| | | | |
|---|---|---|---|
| 7,013,130 B2 * | 3/2006 | Ku | 455/414.2 |
| 7,089,292 B1 * | 8/2006 | Roderick | G06F 3/016 345/156 |
| 8,723,810 B2 * | 5/2014 | Kim | G06F 3/016 345/156 |
| 2006/0129719 A1 * | 6/2006 | Cruz-Hernandez | G06F 3/0488 710/58 |
| 2012/0139844 A1 * | 6/2012 | Ramstein et al. | 345/173 |

FOREIGN PATENT DOCUMENTS

| | | |
|---|---|---|
| JP | 2005196810 A | 7/2005 |
| JP | 2006040005 A | 2/2006 |
| JP | 2006163460 A | 6/2006 |
| JP | 2006221568 A | 8/2006 |
| JP | 2007011785 A | 1/2007 |
| JP | 2010055282 A | 3/2010 |
| JP | 2010282346 A | 12/2010 |
| JP | 2011501307 A | 1/2011 |
| JP | 2011048760 A | 3/2011 |

* cited by examiner

FIG. 5A

|  | 521<br>VIBRATING POSITION NUMBER | 522<br>VIBRATION SEQUENCE NUMBER | 523<br>DOCUMENT NUMBER | 524<br>PAGE | 525<br>START POINT (OF LINE) | 526<br>END POINT (OF LINE) | 527<br>START (CHARACTER NUMBER) | 528<br>END (CHARACTER NUMBER) |
|---|---|---|---|---|---|---|---|---|
| 511 RECORD 1 | 0001 | 3 | 1 | 1 | 3 | 3 | | |
| 512 RECORD 2 | 0002 | 1 | 1 | 1 | 4 | 5 | | |
| 513 RECORD 3 | 0003 | 2 | 2 | 1 | | | | |
| 514 RECORD 4 | 0004 | 4 | 2 | 3 | | | 100 | 150 |
| 515 RECORD 5 | 0005 | 5 | 3 | 2 | 3 | 5 | 70 | 140 |

|       |          | 541 | 542 | 543 | 544 | 545 | 546 | 547 | 548 |
|-------|----------|-----|-----|-----|-----|-----|-----|-----|-----|
|       |          | VIBRATING POSITION NUMBER | VIBRATION SEQUENCE NUMBER | DOCUMENT NUMBER | PAGE | X START POINT | X END POINT | Y START POINT | Y END POINT |
| 531 | RECORD 1 | 0001 | 3 | 1 | 1 |    | 100 | 20 | 30 |
| 532 | RECORD 2 | 0002 | 1 | 1 | 1 | 50 | 100 | 50 | 60 |
| 533 | RECORD 3 | 0003 | 2 | 2 | 1 | 50 | 100 | 70 | 80 |
| 534 | RECORD 4 | 0004 | 4 | 2 | 3 | 100 | 150 | 20 | 30 |
| 535 | RECORD 5 | 0005 | 5 | 3 | 2 | 50 | 100 | 70 | 80 |

502

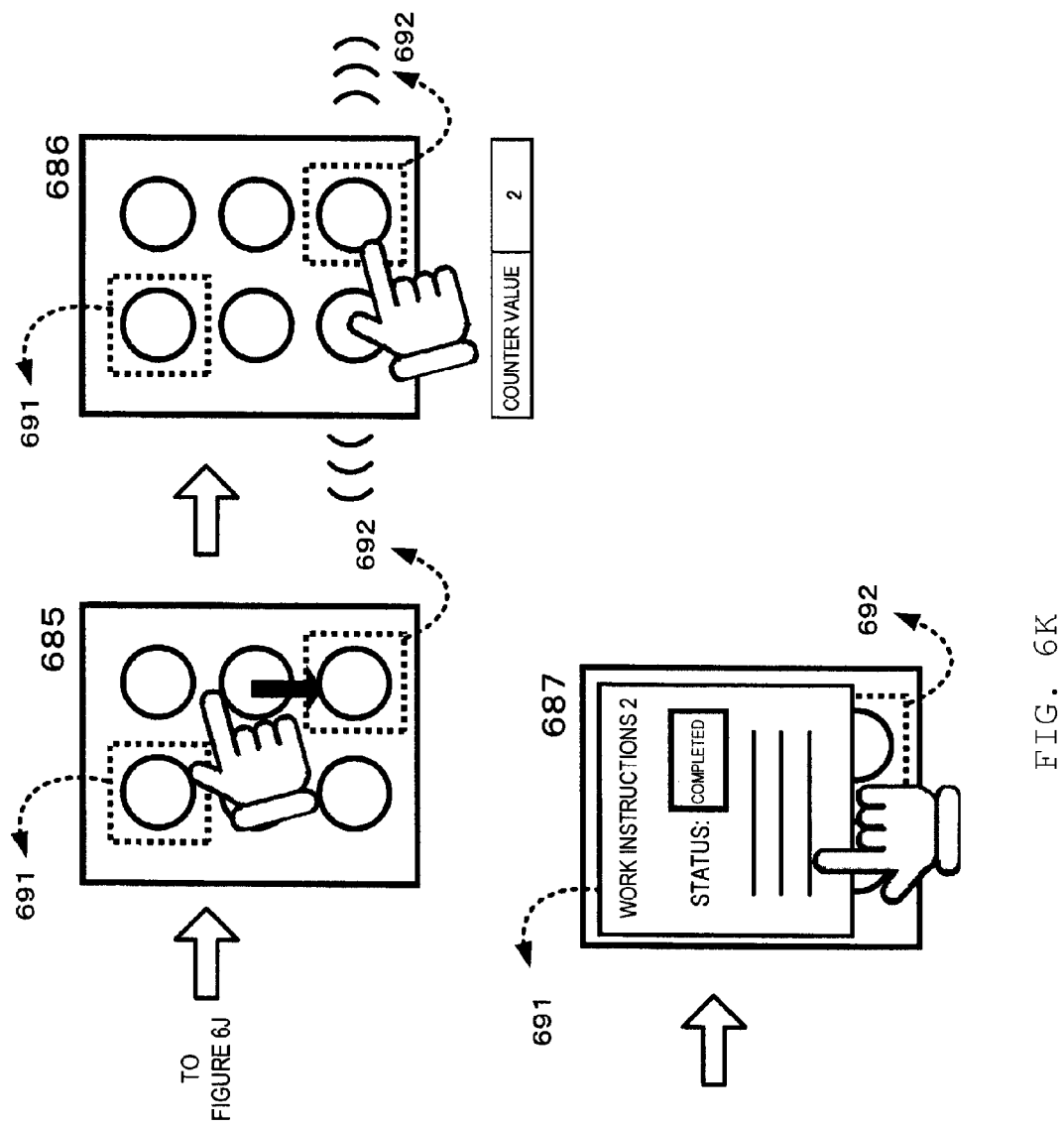

| | VIBRATION SEQUENCE NUMBER | DOCUMENT NUMBER | PAGE | START POINT (OF LINE) | END POINT (OF LINE) | START (CHARACTER NUMBER) | END (CHARACTER NUMBER) |
|---|---|---|---|---|---|---|---|
| VIBRATION POSITION NUMBER | 741 / 742 | 743 | 744 | 745 | 746 | 747 | 748 |
| 731 RECORD 1 — 0001 | 1 | 2 | 1 | | | | |
| 732 RECORD 2 — 0002 | 2 | 2 | 3 | 4 | 4 | | |
| 733 RECORD 3 — 0003 | 3 | 2 | 3 | 18 | 18 | | |
| ⋮ RECORD n — 000n | ⋮ | ⋮ | ⋮ | ⋮ | ⋮ | ⋮ | ⋮ |

SETTING VIBRATION PORTIONS IN PIECES OF ELECTRONIC DATA THAT ARE DISPLAYABLE ON A DISPLAY DEVICE

PRIORITY

The present application claims priority to Japanese Patent Application No. 2011-279481, filed on Dec. 21, 2011, and all the benefits accruing therefrom under 35 U.S.C. §119, the contents of which in its entirety are herein incorporated by reference.

BACKGROUND

The present invention generally relates to a technique for displaying one or more pieces of electronic data on a display device having a touch screen, and more particularly, to setting vibration portions in one or more pieces of electronic data that are displayable on a display device with a touch screen.

Contemporary portable information processing terminals, such as smartphones, mobile phones, electronic book readers, personal digital assistants (PDAs), handheld computers, tablet terminals, netbooks, tablet personal computers (PCs), netbook and mobile laptop PCs are extensively used these days. Some of these portable information processing terminals have a display including a touch-panel function which is intended to improve the usability. Typically, the touch-panel function is achieved by providing a pressure sensor, a proximity sensor, or the combination of these sensors inside the display.

Because of their portability, contemporary portable information processing terminals are typically used in a wide variety of applications such as marketing activities, sales activities, sales promotion activities, building sites, construction sites, manufacturing places, and medical facilities.

As more businesses are switching to digital documentation, contemporary portable information processing terminals equipped with touch panels are often used to access information. Applications of contemporary portable information processing terminals are also steadily expanding. For example, the portable information processing terminals are used to see or write in equipment design drawings, equipment operation manuals, procedures, diagrams, or work journals at building sites or construction sites, to see or write in product brochures, sales manuals, or sales promotion manuals in marketing, sales or sales promotion activities, to see or write in process charts indicating fabrication processes or manufacturing instruction manuals at manufacturing sites, or to see and write in diagnostic images, equipment manuals, drug information, pathologic conditions data, medical records, or nursing records at medical facilities.

SUMMARY

According to an embodiment, a computer-implemented method for setting vibration portions in one or more pieces of electronic data on a display device is disclosed. In response to a first portion in the one or more pieces of electronic data being specified on the display device, an embodiment sets the specified first portion as a first vibration portion. The first vibration portion triggers a first vibration in response to the first vibration portion being specified with a movable object. Moreover, in response to a second portion in the one or more pieces of electronic data being specified on the display device, an embodiment sets the specified second portion as a second vibration portion. The second vibration portion triggers the second vibration in response to the second vibration portion being specified with a movable object. The data storing settings for generating the first vibration and the second vibration include an order in which the first vibration and the second vibration are generated.

According to another embodiment, a computer-implemented method for generating vibration on a display device in response to a predetermined portion in one or more pieces of electronic data on the display device being specified with a movable object is disclosed. The generating of vibration on the display device includes the display of one or more pieces of electronic data on the display device in which a plurality of vibration portions are set. A first vibration is generated in response to a first vibration portion in the one or more pieces of electronic data being specified with the movable object on the display device. A second vibration is generated in response to a second vibration portion in the one or more pieces of electronic data being specified with the movable object on the display device. The one or more pieces of electronic data are associated with data storing settings to generate the first vibration and the second vibration, and the data storing the settings include an order in which the first vibration and the second vibration are generated.

According to another embodiment, an apparatus including a display device that displays one or more pieces of electronic data, a central processing unit (CPU), and a memory connected to the CPU is disclosed. The one or more pieces of electronic data are associated with data storing settings for generating a first vibration and a second vibration. The data storing the settings includes an order in which the first vibration and the second vibration are generated. A vibrating device then generates, in accordance with the order, the first vibration in response to a first vibration portion in the one or more pieces of electronic data being specified with the movable object on the display device. Additionally, the vibrating device generates, in accordance with the order, the second vibration in response to a second vibration portion in the one or more pieces of electronic data being specified with the movable object on the display device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5A is a diagram illustrating vibration setting data storing the vibration sequence in which a plurality of vibration portions set in electronic data are vibrated according to an embodiment;

FIG. 5B is a diagram illustrating vibration setting data storing the vibration sequence in which a plurality of vibration portions set in electronic data are vibrated according to an embodiment;

FIG. 6K is a diagram illustrating a scheme for causing vibrations in a set vibration sequence in response a plurality of vibration portions set in electronic data being specified with a movable object according to an embodiment;

FIG. 7B is a diagram illustrating vibration setting data storing the vibration sequence in which a plurality of vibration portions set in a plurality of electronic documents are vibrated according to an embodiment;

DETAILED DESCRIPTION

Embodiments disclosed herein set a first vibration portion that includes a first portion of one or more pieces of electronic data that can be displayed on a display device, and set a second vibration portion that includes a second portion of the one or more pieces of electronic data. Embodiments provide that the first and second vibration portions vibrate in a preset vibration sequence. Embodiments enable a user to readily determine which portion of an electronic document the user is pointing to on a personal computer or portable information terminal equipped with a touch panel. Embodiments also enable the user to intuitively find out what order predetermined portions of the electronic document are to be referenced. Because vibration facilitates browsing and referencing in electronic documents, embodiments are especially useful in a noisy environment.

A contemporary personal computer or portable information terminal with a touch screen is typically manipulated through touching operations on the touch screen with a movable object, such as a finger or stylus pen. When a user views an electronic document in a contemporary device, the user can have trouble seeing contents of the electronic document and recognizing which portion in the electronic document to reference.

For example, when a user refers to parts in a design specification or a device image of a procedural or instruction manual using a contemporary device with a touch screen, it may be difficult for the user to grasp which parts are indicated or in which order they should be operated. Moreover, when a contemporary device is used at a plant or construction site, sensing or communication utilizing sound may be impractical due to noise. A procedural or instruction manual shown on the display of a contemporary device can be difficult to view, even if color-coded, depending on the lighting conditions at the work site. Additionally, when an operator wearing color goggles uses a contemporary device, color distinction on the display device, such as viewing of a color-coded procedural or instruction manual, can be difficult due to the goggles.

Accordingly, embodiments provide enhanced and improved viewing or recording of an electronic document in a personal computer or portable information terminal with a touch screen. Embodiments further provide a personal computer or portable information terminal with a touch screen that can sense a perpendicular movement of a movable object with respect to the screen. According to an embodiment, a plurality of vibration portions and a vibration sequence are set in one or more pieces of electronic data on a display device. The plurality of vibration portions are then controlled to vibrate in accordance with the vibration sequence according to an embodiment.

Figure 1:
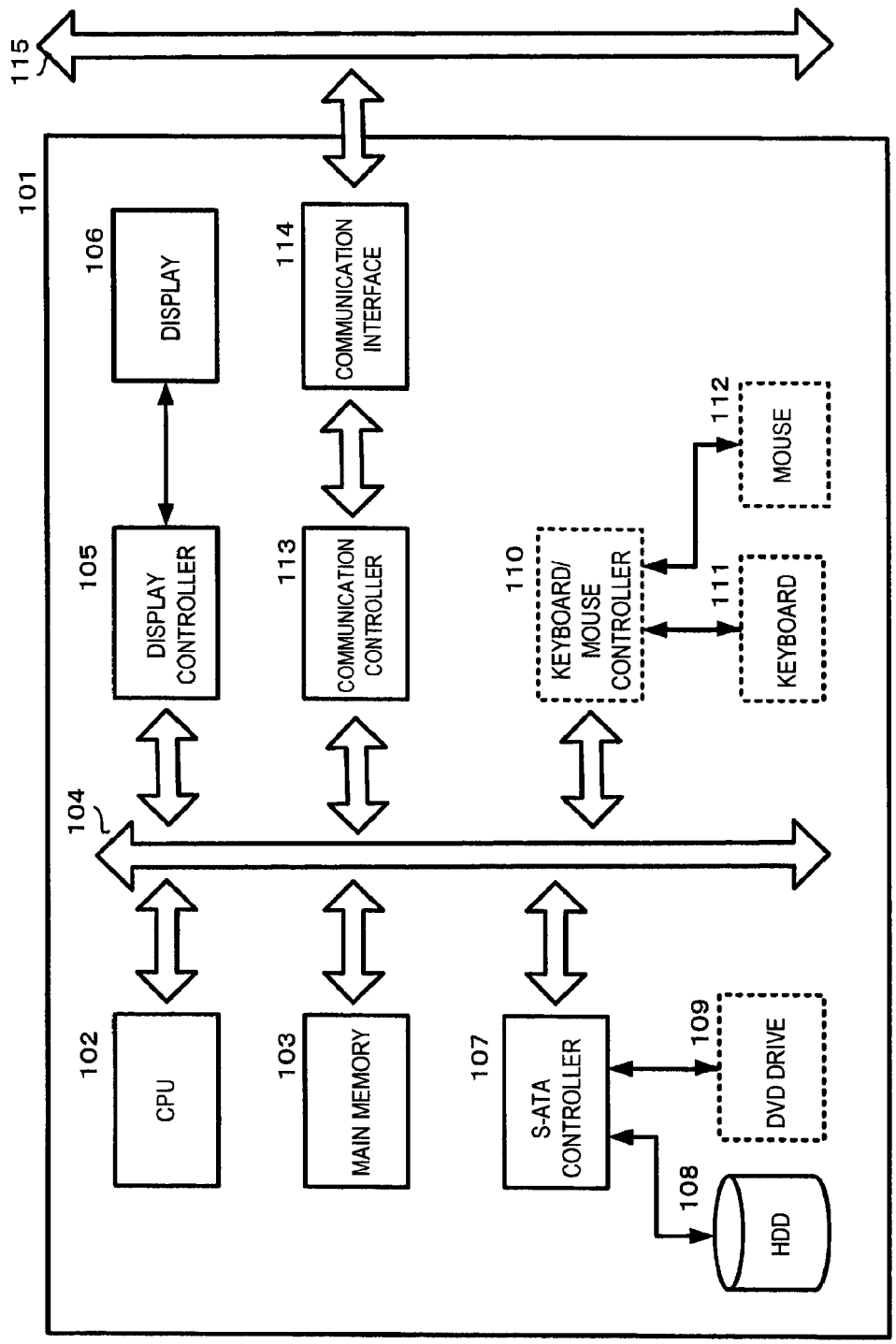
FIG. 1 is a block diagram illustrating an exemplary hardware configuration of an information processing terminal according to an embodiment.

FIG. 1 is a diagram illustrating an exemplary hardware configuration of an information processing terminal according to an embodiment.

An apparatus 101 of an embodiment may be any information processing terminal that includes a display capable of sensing movements of a movable object in the direction perpendicular to the screen. Specifically, the apparatus 101 may be a portable information processing terminal. Examples of the information processing terminal include, but are not limited to, a smartphone, a mobile phone, an electronic book reader, a PDA, a handheld computer, a tablet terminal, a netbook, a tablet PC, or a netbook and mobile laptop PC.

The apparatus 101 of an embodiment includes a central processing unit (CPU) 102 and a main memory 103, which are connected to a bus 104. The CPU 102 is preferably based on a 32-bit or 64-bit architecture and may be a Core i™ series processor, a Core 2™ series processor, an Atom™ series processor, a Xeon™ series processor, a Pentium® series processor, or a Celeron® series processor from Intel Corporation, or an Opteron™ series processor, a Phenom™ series processor, an Athlon™ series processor, a Turion™ series processor, a Sempron™ series processor, or an A series processor from Advanced Micro Devices, Inc. A display 106, such as a liquid-crystal display (LCD), can be connected to the bus 104 through a display controller 105. The display 106 is used for displaying information concerning a computer connected to a network through a communication link and information concerning software running on the computer through an appropriate graphic interface, for managing the computer. A disk 108, such as a silicon disk or a hard disk, can also be connected to the bus 104 through a Serial Advanced Technology Attachment (SATA) or intelligent drive electronics (IDE) controller 107. Optionally, a drive 109, such as a compact disk (CD), digital video disc (DVD) or Blu-ray (BD) drive, can also be connected to the bus 104 through the SATA or IDE controller 107. Optionally, a keyboard 111 and a mouse 112 can also be connected to the bus 104 through a keyboard/mouse controller 110 or a universal serial bus (USB) not shown).

An operating system of an embodiment provides a JAVA® processing environment such as Java 2 Platform Enterprise Edition (J2EE), a JAVA application, a JAVA virtual machine (VM), a JAVA just-in-time (JIT) compiler, and other programs and data stored on the disk 108 in such a manner that they can be loaded into the main memory. A frontend processor (FEP), which is software that enables input or editing of text and character conversion software, is also stored on the disk 108 in such a manner that it can be loaded into the main memory. The operating system of an embodiment may be a Windows® operating system provided by Microsoft Corporation, MacOS® or iOS® provided by Apple Computer Incorporated, a UNIX®-based system including X Window System for example, AIX® provided by International Business Machines Corporation®), or other operating system that supports a graphical user interface (GUI) multiwindow environment, such as Android®.

The drive of an embodiment 109 can be used for installing a program from a CD, DVD, or BD onto the disk 108. The communication interface 114 of an embodiment may conform to Ethernet® protocols. The communication interface 114 is connected to the bus 104 through a communication controller 113, and is responsible for physically connecting the apparatus 101 to a communication link 115, and provides a network interface layer to a Transmission Control Protocol/Internet Protocol (TCP/IP) communication protocol for a communication facility of the operating system of the apparatus 101. The communication link may be one based on a wired local-area network (LAN) environment or one based on a wireless LAN environment, for example Wi-Fi standards such as Institute of Electrical and Electronics Engineers (IEEE) 802.11a/b/g/n.

It will be understood from the foregoing that an embodiment is not limited to a particular operating system environment.

An example of an embodiment will be described with reference to FIGS. 2A and 2B. It should be noted that embodiments are not limited to the specific example illustrated in FIGS. 2A and 2B.

Figure 2A:
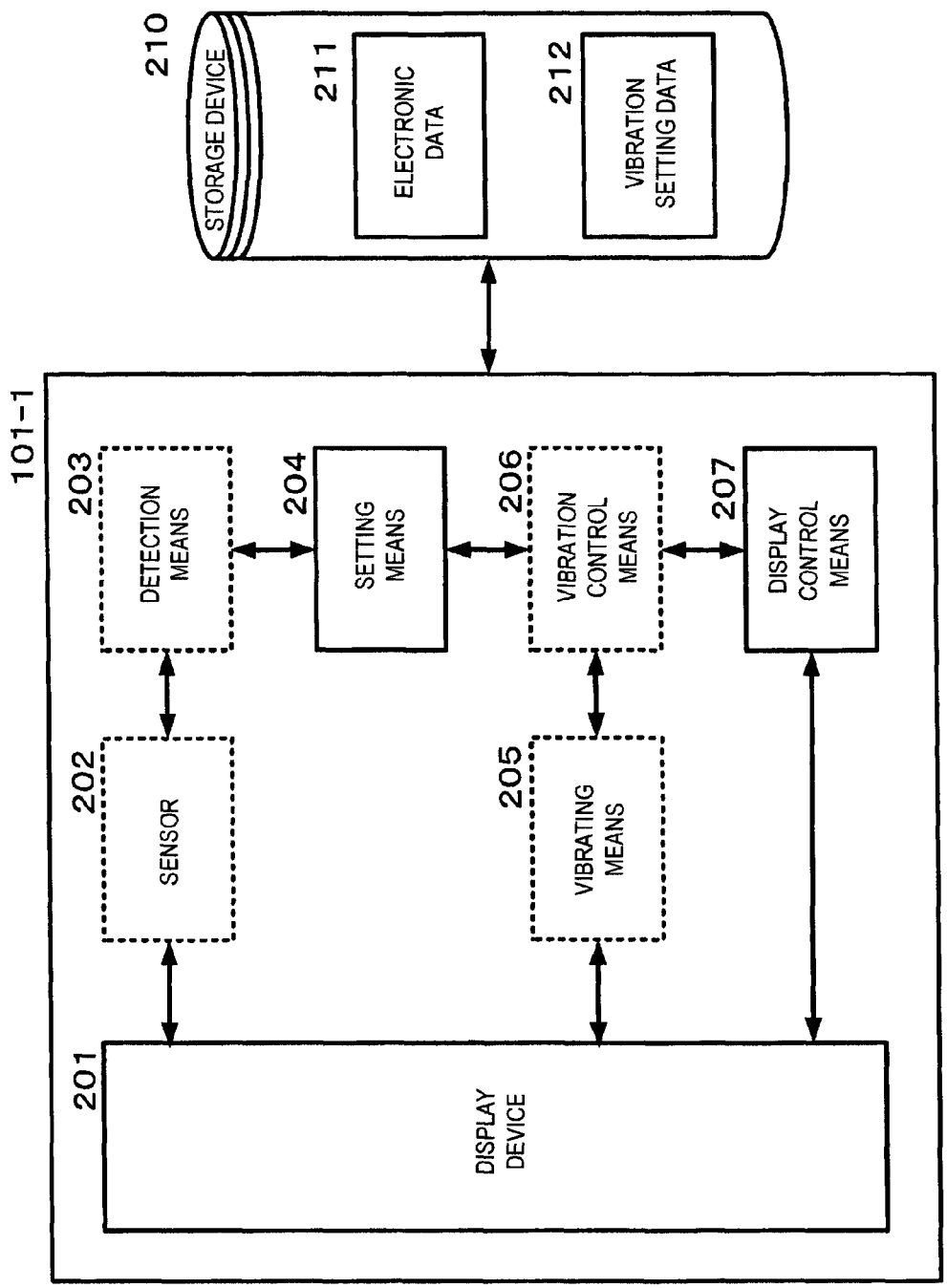
FIG. 2A is a functional block diagram of a setting apparatus for setting a plurality of vibration portions in one or more pieces of electronic data according to an embodiment.

FIG. 2A is a functional block diagram of a setting apparatus for setting a plurality of vibration portions in one or more pieces of electronic data according to an embodiment.

The setting apparatus 101-1 of an embodiment may have the hardware configuration illustrated in FIG. 1. The setting apparatus 101-1 includes a display device 201, setting means 204 (also referred to as a "setting device"), display control means 208 (also referred to as a "display control device") and storage device 210 and can have a configuration required for setting a plurality of vibration portions in electronic data. The setting apparatus 101-1 may itself include a display device 201 or may be wired or wirelessly connected to a display device 201. The setting apparatus 101-1 itself may include a display device 201.

The setting apparatus 101-1 of an embodiment may further include a sensor 202 and detection means 203 (also referred to as a "detection device"), and vibrating means 205 (also referred to as a "vibrating device") and vibration control means 206 (also referred to as a "vibration control device"). This configuration may be a configuration required for setting a plurality of vibration portions in one or more pieces of electronic data and optionally associating information with the vibration portions, and then verifying a plurality of vibration portions of one or more electronic files in which the plurality of vibration portions are set and the vibration sequence in which the plurality of vibration portions vibrate. If the setting apparatus 101-1 further includes a sensor 202 and detection means 203, and vibrating means 205 and vibration control means 206, the setting apparatus 101-1 may be an apparatus with vibrating means 101-2 as well, described later and illustrated in FIG. 2B.

If the sensor of an embodiment 202 is a sensor capable of sensing movement distance, the setting apparatus 101-1 may alternatively include the sensor capable of sensing movement distance externally to the setting apparatus 101-1. If the setting apparatus 101-1 of an embodiment externally includes the sensor 202 capable of sensing movement distance, the sensor 202 capable of sensing movement distance may be wired or wirelessly connected to the setting apparatus 101-1.

The display device 201 is typically a liquid-crystal display device and includes a touch panel function. The display device 201 may include vibrating means 205. All or part of the display device 201 or all or part of its screen can be triggered to vibrate by the vibrating means 205. The display device 201 may include as the vibrating means 205 a plurality of vibration generators, or may include a single vibration generator.

The display device 201 can utilize display of one or more pieces of electronic data. The display device 201 may display all or part (for example, a page) of electronic data on its screen at a time. Electronic data may be, but not limited to: image data, for example, design drawing data, process chart data, diagnostic image data; manual data, for example, equipment manual data, manufacturing instruction manual data: procedure data: diagram data; product brochure data; sales manual data; sales promotion manual data; drug information data; pathologic condition data; medical record data; or nursing record data.

The setting means 204 of an embodiment sets an n-th portion of one or more pieces of electron data as an n-th vibration portion in response to the n-th portion being specified on the display device 201 (n is an integer greater than or equal to 1). The n-th portion can be specified by encircling a region to be set as a vibration portion with a pointing device (for example, a mouse), an operating finger, or a stylus pen or selecting the region with a cursor, or inputting or specifying an electronic data name (for example, a file name) of the region to be set as a vibration portion, a page number in the electronic data, a paragraph number, a line number, the positions of characters (from- and to-character numbers), or information (for example, from- and to-character numbers) identifying a graphic or the like.

The setting means 204 may associate the n-th vibration portion with the n-th information (n is an integer greater than or equal to 1) so that the n-th information associated with the n-th vibration portion is displayed on the display device 201 in response to occurrence of the n-th vibration.

The setting means 204 may associate so that the n+1-th vibration is triggered (n is an integer greater than or equal to 1) in response to the n+1-th vibration portion being specified with the movable object after the n-th information associated with the n-th vibration portion is displayed on the display device 201.

The setting means 204 may provide a user interface for setting a vibration attribute of the first vibration or second vibration. The setting means 204 may also provide a graphical user interface for allowing the user to set a vibration attribute of the first vibration or the second vibration. The vibration attribute may be the intensity, the number of times, duration, or the mode of vibration. The mode of vibration may be vibration of part or the entirety of the display device or part or the entirety of its screen, or the way of vibration (for example, in the direction horizontal or vertical to the screen).

The sensor 202 of an embodiment may be a pressure sensor or a sensor capable of sensing movement distance.

The pressure sensor of an embodiment is a pressure sensor capable of sensing pressure applied by a movable object in contact with the screen. The pressure sensor may be a sensor capable of sensing pressure applied by a movement of a movable object in contact with the screen in the direction perpendicular to the screen. The pressure sensor may be any pressure sensor available to those skilled in the art. The pressure sensor may be, but not limited to, a pressure sensor array.

The sensor capable of sensing movement distance is a sensor capable of sensing movements of a movable object in the direction perpendicular to the screen. The sensor may be a proximity sensor or a sensor having a (red, green, blue (RGB)) camera, a depth sensor and a multi-array microphone built-in. The proximity sensor may be a sensor capable of sensing distance and the direction in which a movable object is moving. The proximity sensor may be any sensor available to those skilled in the art. The proximity sensor may be an optical proximity sensor large-scale integrated sensor (LSI). The sensor having an RGB camera, a depth sensor and multi-array microphone built-in may be a Kinect® sensor commercially available from Microsoft® Corporation.

A "movable object" may be an operating finger of a user, an operation pen, or an operation stick. The operating finger of a user may be a right or left index finger, or a plurality of fingers, for example, a thumb and an index finger. The operation pen may be a touch-panel pointing device (for example, a stylus pen). The operation stick may be a remote-control device.

If the sensor 202 is a pressure sensor, the display control means 207 may display on the display device 201 a response to an operation performed on electronic data (for example, a page turn) in response to pressure on the screen applied by a movable object.

If the sensor 202 is a sensor capable of sensing a movement distance, the display control means 207 may display on the display device 201 a response to an operation performed on electronic data (for example, a page turn) in response to a sensed movement of a movable object with respect to the screen (for example, a movement in the vertical or horizontal direction).

The detection means 203 of an embodiment can be connected to a sensor 202 capable of sensing movement distance. The detection means 203 is capable of detecting the presence of a movable object in a detection range of the sensor 202 through the sensor 202 capable of sensing movement distance. The detection means 203 is also capable of determining the distance between a movable object and the screen and also capable of determining the distance of movement of the movable object in the perpendicular direction (in the z direction, along the axis passing through the screen). Movement distance in the perpendicular direction is a distance in one of the direction along the axis passing from the front to the back of the screen (called left-hand system coordinates) and the direction along the axis passing from the back of the screen toward the screen (called right-hand system coordinates). The positive direction in the left-hand system coordinates is the direction in which a movable object moves toward the screen; the positive direction in the right-hand system coordinates is the direction in which the movable object moves way from the screen.

The detection means 203 of an embodiment can be connected to a pressure sensor 202. The detection means 203 can detect, through the pressure sensor 202, that a movable object is in contact with the screen. The detection means 203 can also digitize pressure applied by the movable object in contact with the screen.

The vibrating means 205 of an embodiment itself has the function of vibrating. The vibrating means 205 can trigger part or the entirety of the apparatus or part or the entirety of the screen depending on the location of the vibrating means 205 or the intensity of vibration of the vibrating means 205. The vibrating means 205 can be implemented using any vibration technology, for example, any method known to or used by those skilled in the art. The vibrating means 205 may be a plurality of vibration generators or a single vibration generator.

The vibration control means 206 of an embodiment controls activation of vibration of vibrating means 205 according to the vibration sequence in the vibration setting data stored in the storage device 210. FIGS. 5A and 5B are examples of the vibration setting data 212.

The storage device 210 of an embodiment stores one or more pieces of electronic data 211 and the vibration setting data. The vibration setting data may be prepared for each piece of electronic data or for a set of plurality of pieces of electronic data as a unit such as structured documents (for example, HTML documents and XML documents).

The piece or pieces of electronic data 211 of an embodiment may be of any content that can be displayed on the display device 201. One piece of electron data may be a file or a unit of data made up of one or more files that can be displayed on the screen through a hyperlink. An electronic document may include a plurality of pages. Alternatively, an electronic document may lack the concept of page, such as the case of a unit made up of one or more files that can be displayed on the screen through a hyperlink.

The vibration setting data 212 of an embodiment may be stored in the storage device 210 as a vibration setting file. Alternatively, the vibration setting data 212 may be stored in the main memory 103. The vibration setting data 212 may be a vibration setting table. The vibration setting data 212 may be output in the SYLK or CSV format. FIGS. 5A and 5B illustrate details of the table vibration setting data 212.

Figure 2B:
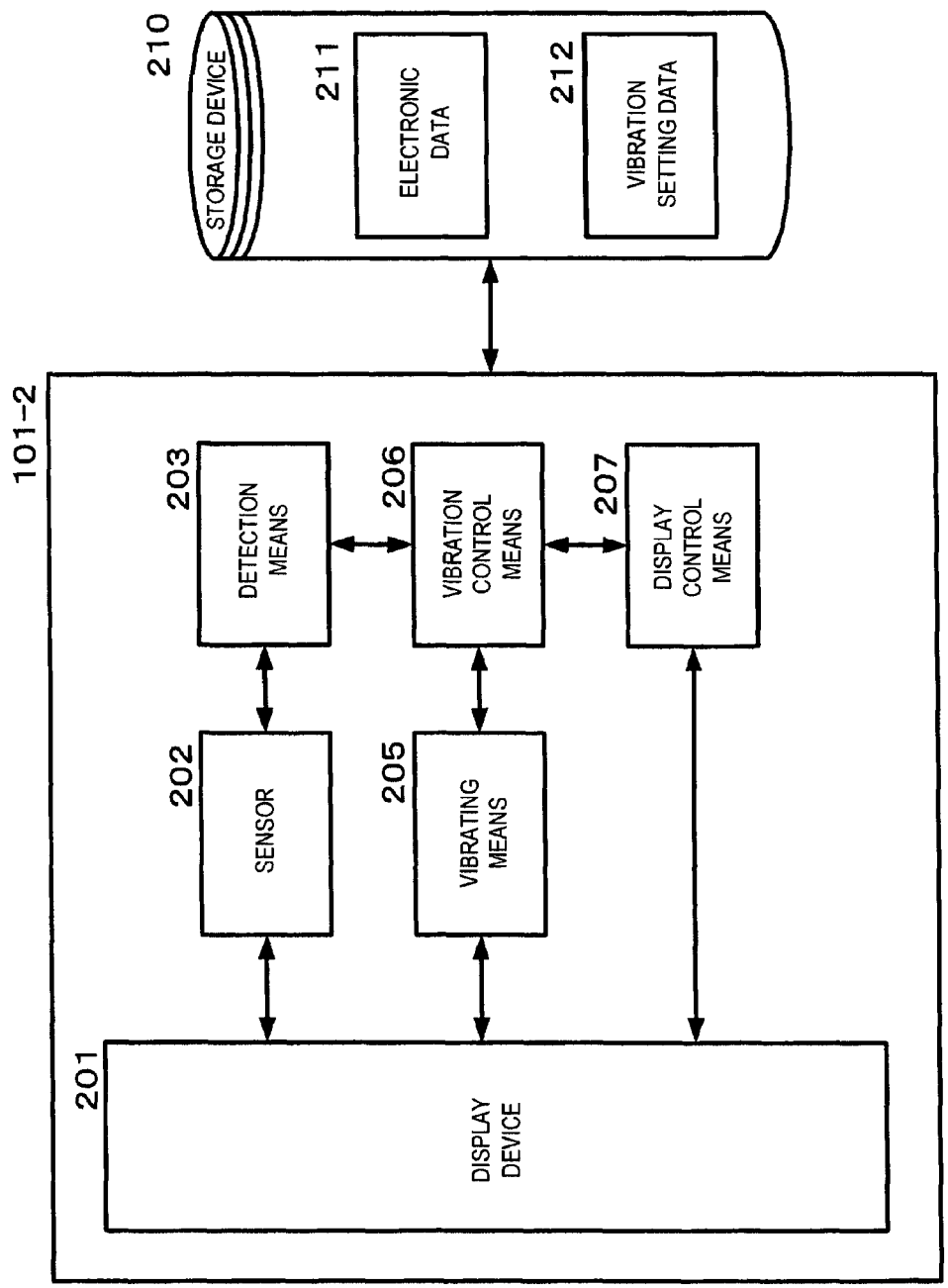
FIG. 2B is a functional block diagram of an apparatus with a vibrating means for causing vibration in response to a given portion of one or more pieces of electronic data being specified with a movable object according to an embodiment.

FIG. 2B is a functional block diagram of an apparatus with a vibrating means for causing vibration in response to a given portion in electronic data being specified with a movable object according to an embodiment.

The apparatus with vibrating means 101-2 of an embodiment may have the hardware configuration illustrated in FIG. 1. The apparatus with vibrating means 101-2 includes a display device 201, a sensor 202, detection means 203, vibrating means 205, vibration control means 206, display control means 207, and a storage device 210. The apparatus with vibrating means 101-2 of an embodiment differs from the setting apparatus 101-1 in not including the setting means 204.

If the sensor 202 is a sensor capable of sensing movement distance, the apparatus with vibrating means 101-2 may alternatively include the sensor capable of sensing movement distance externally to the apparatus with vibrating means 101-2. If the apparatus with vibrating means 101-2 externally includes the sensor 202 capable of sensing movement distance, the sensor 202 capable of sensing movement distance may be wired or wirelessly connected to the apparatus with vibrating means 101-2.

If the apparatus with vibrating means 101-2 further include setting means 204, the apparatus with vibrating means 101-2 may be a setting apparatus 101-1 as well.

A scheme for setting a plurality of vibration portions in electronic data, a scheme for changing the vibration sequence in which the plurality of vibration portions are vibrated, and a scheme for associating information with the vibration portions will be described with reference to FIGS. 3A to 3C and 4A to 4C. It should be noted that the schemes according to embodiments are not limited to the examples described and illustrated in FIGS. 3A to 3C and 4A to 4C.

Figure 3A:
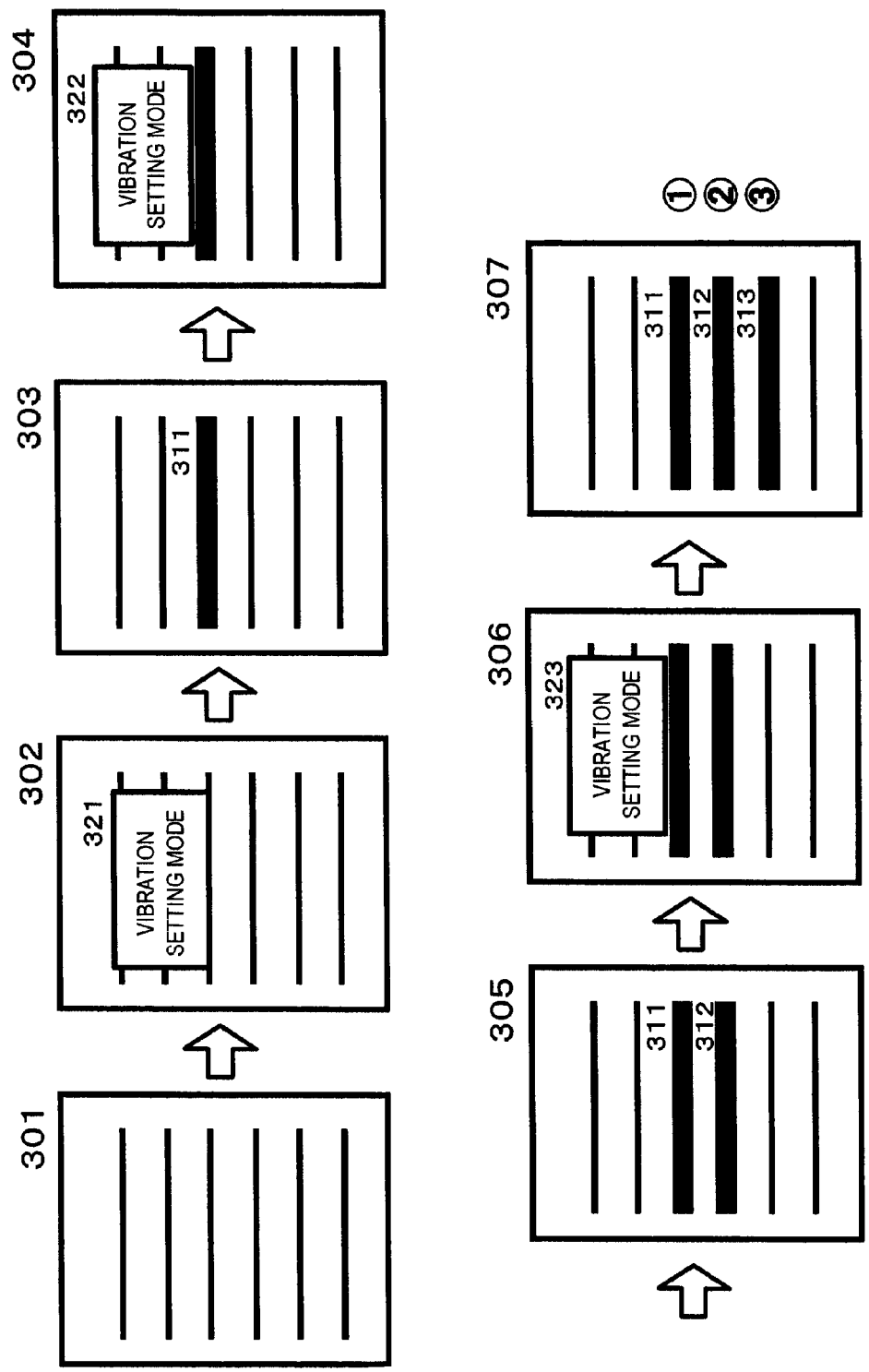
FIG. 3A is a scheme for setting a plurality of vibration portions in electronic data according to an embodiment.

FIG. 3A is a diagram illustrating a scheme for setting a plurality of vibrating positions in electronic data according to an embodiment.

A user attempts to set a plurality of vibration portions in electronic data by using the setting apparatus 101-1. It is assumed in the example in FIG. 3A that the electronic data includes a plurality of pages and one of the pages contains text (text characters).

At block 301, the user issues a request to call electronic data in which a plurality of vibration portions is to be set (for example, a request to read from the storage device 210 or a request to download from a network). In response to the user's request, the setting means 204 reads the electronic data from the storage device 210 or downloads the electronic data from the network into the main memory 103 in the setting apparatus 101-1.

At block 302, the user issues a request to go to a vibration setting mode, for example, the user calls a menu for a vibration mode. The user right-clicks the mouse on the page or, if the display device 201 is a touch panel, double-clicks the screen with an operating finger, to call the menu. In response to the call from the user, the setting means 204 enters the vibration setting mode. The setting means 204 may send an instruction to the display control means 207 to display a window 321 for notifying the user that the vibration setting mode has been entered. In response to reception of the instruction, the display control means 207 may display the window 321 on the display device 201.

At block 303, the user drags and drops a portion to be vibrated (a first vibration portion) on the page with the mouse to enclose the portion with a box (the portion labeled with reference numeral 311). If the display device 201 is a touch panel, the user encloses a portion (a first vibration portion) to be vibrated (the portion labeled with reference numeral 311) on the page with an operating finger. In response to the user's operation, the setting means 204 may register a vibration sequence number, a document number, and optionally the page number and the start and end points of the line enclosed in the box, or the start and end characters (for example, the from- and to-character numbers), or a combination of any of these in the vibration setting data 212. If the user's operation is the first operation on the electronic data, the vibration sequence number may be set to 1 by default.

At block 304, the user then attempts to specify another portion to be vibrated on the electronic data. The user calls the vibration setting mode in the same way as in block 302. Note that the process may proceed to the next block 305 without performing block 304 every time vibration setting is made. The setting means 204 may send an instruction to the display control means 207 to display a window 322 for notifying the user that the vibration setting mode for setting a second vibration portion has been entered. In response to reception of the instruction, the display control means 207 may display the window 322 on the display device 201.

At block 305, the user drags and drops a portion a second vibration portion) to be vibrated on the page with the mouse to enclose the portion with a box (the portion labeled with reference numeral 312). If the display device 201 is a touch panel, the user encloses a portion (a second vibration portion) to be vibrated (the portion labeled with reference numeral 312) on the page with the operating finger. As in block 303, in response to the user's operation, the setting means 204 may register a vibration sequence number, a vibration sequence number, a document number, and optionally the page number and the start and end points of the line enclosed in the box, or the start and end characters (for example, the from- and to-character numbers), or a combination of any of these in the vibration setting data 212. If the user's operation is the second operation on the electronic data, the vibration sequence number may be set to 2 by default.

At block 306, the user then attempts to specify another portion to be vibrated on the electronic data. The user calls the vibration setting mode on the page in the same way as in block 302. As has been stated in the description of block 304, the process may proceed to the next block 307 without performing block 306 every time vibration setting is made. The setting means 204 may send an instruction to the display control means 207 to display a window 323 for notifying the user that the vibration mode for setting a third vibration portion has been entered. In response to reception of the instruction, the display control means 207 may display the window 323 on the display device 201.

At block 307, the user drags and drops a portion (a third vibration portion) to be vibrated on the page with the mouse to enclose the portion with a box (the portion labeled with reference numeral 313). If the display device 201 is a touch panel, the user encloses a portion (a third vibration portion) to be vibrated (the portion labeled with reference numeral 313) on the page with the operating finger. As in blocks 303 and 305, in response to the user's operation, the setting means 204 may register a vibration sequence number, a document number, and optionally the page number and the start and end points of the line enclosed in the box, or the start and end characters (for example, the from- and to-character numbers), or a combination of any of these in the vibration setting data. If the user's operation is the third operation on the electronic data, the vibration sequence number may be set to 3 by default. The encircled numbers in the diagram of block 307 indicate that the first vibration portion set at block 303, the second vibration portion set at block 305, and the vibration portion set at block 307 will be vibrated first, second and third, respectively. The encircled numbers are added for the purpose of facilitating the understanding of embodiments of the present invention. The encircled numbers may be displayed on the display device 201 when the setting apparatus 101-1 verifies the vibration sequence number and may be omitted at other times.

The portions set as vibration portions on the screen may be displayed in the same fashion as before the settings. Alternatively, the display control means 207 may highlight the set portions or may display an icon near the set portions indicating that the portions are set as vibration portions.

Figure 3B:
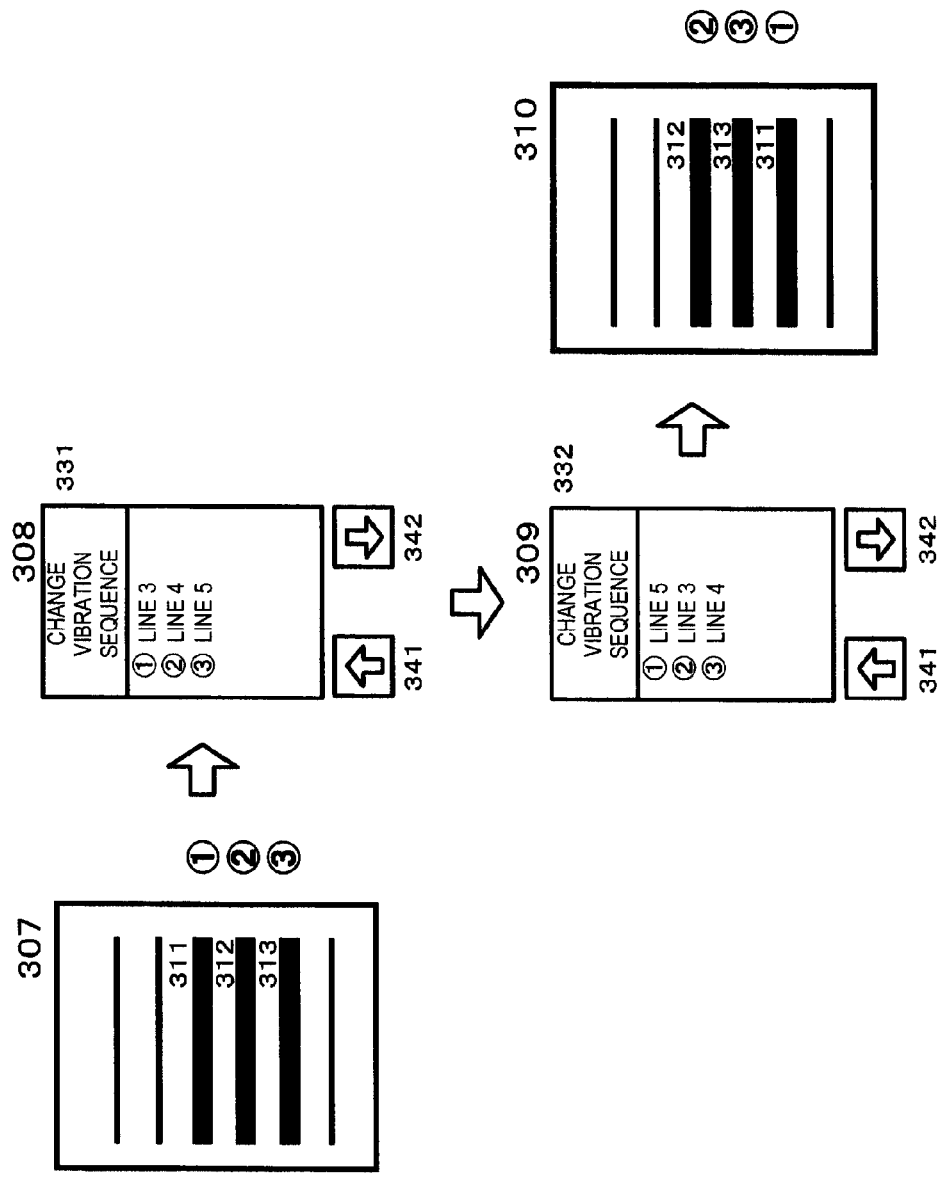
FIG. 3B is a diagram illustrating a scheme for changing the vibration sequence in which a plurality of vibration portions set in electronic data are vibrated according to an embodiment.

FIG. 3B is a diagram illustrating a scheme for changing the vibration sequence in which a plurality of vibration portions set in electronic data are vibrated according to an embodiment.

In FIG. 3A, three vibration portions were set in the electronic document: the first vibration portion set at block 303, the second vibration portion set at block 305, and the third vibration portion set at block 307. The vibration sequence numbers, 1, 2 and 3, indicating the vibration sequence are set for the first, second and third vibration portions, respectively, according to the order in which the vibration portions have been set.

Block 307 of FIG. 3B is the same as block 307 of FIG. 3A. Suppose that the user wants to change the default vibration sequence described above. Here, assume that the user wants to change the vibration sequence to: the third vibration portion, the first vibration portion, and the second vibration portion.

At block 308, the user calls a menu for changing the vibration sequence. The user right-clicks the mouse on the page or, if the display device 201 is a touch panel, double-clicks the screen with an operating finger to call the menu. In response to the user's call, the setting means 204 displays a window 331 for changing the vibration sequence on the display device 201. The window 331 may further display a button 341 for moving a selected line in the window 331 up (that is, moving up the position in the vibration sequence) and a button 342 for moving a selected line in the window 331 down (that is, lowering the position in the vibration sequence).

The window 331 indicates the vibration sequence at the time the window has been called. That is, the window 331 indicates that the line 3 (reference numeral 311) of the page of the electronic data will be vibrated first, the line 4 (reference numeral 312) of the page will be vibrated second, and the line 5 (reference numeral 313) will be vibrated third. This vibration sequence is read from the vibration setting data 212 stored in the storage device 210. The user selects the place in the window 331 that the user wants to move in the vibration sequence. For example, the user left-clicks the mouse to select the third item from the top in the window 331 (which corresponds to line 5 of the page of the electronic data that is labeled with reference numeral 312). Then the user left-clicks the mouse on the button 341 to move the selected third item in the window 331 to the top (that is, the user left-clicks the button 341 twice). The result is indicated in the window 332.

At block 309, the display control means 207 changes the display of the window 331 to the window 332. The window 332 indicates the changed vibration sequence. That is, the window 332 indicates that line 5 (reference numeral 313) will be vibrated first, line 3 (reference numeral 311) will be vibrated second, and line 4 (reference numeral 312) will be vibrated third.

In response to the completion of the operation for changing the vibration sequence, the user left-clicks an "OK" button (not shown) on the window 332 at block 310. In response to the left-click, the setting means 204 changes the vibration sequence in the vibration setting data 212 to the sequence changed at block 309 and confirmed. The encircled numbers in the diagram of block 310 indicate that the first vibration portion set at block 309, the second vibration portion set at block 305, and the vibration portion set at block 307 will be vibrated second, third and first, respectively. The encircled numbers are added for the purpose of facilitating the understanding embodiments of the present invention. The encircled numbers may be displayed on the display device 201 when the setting apparatus 101-1 verifies the vibration sequence and may be omitted at other times.

Figure 3C:
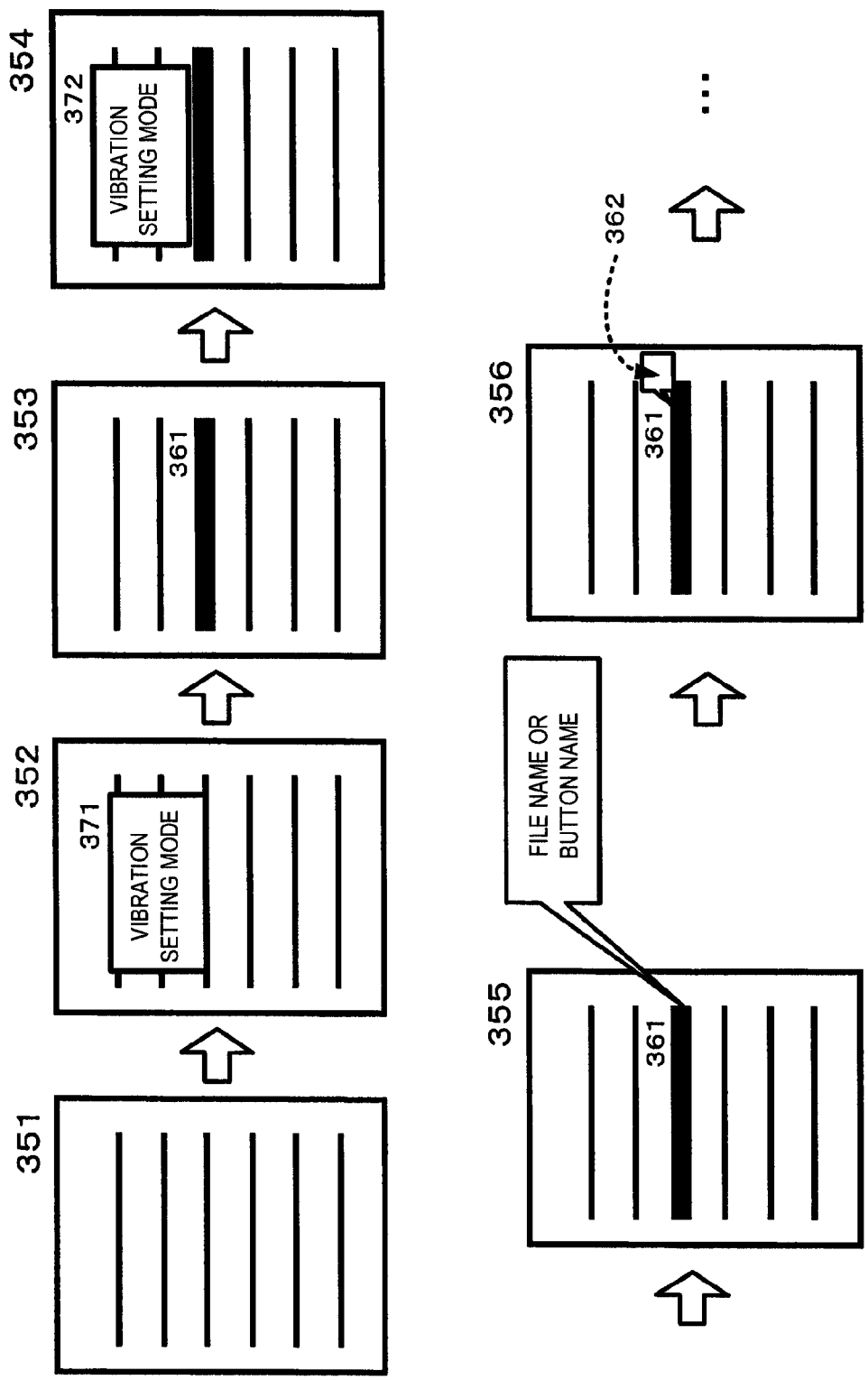
FIG. 3C is a diagram illustrating a scheme for associating information with a vibration portion set in electronic data according to an embodiment.

FIG. 3C is a diagram illustrating a scheme for associating information with a vibration portion set in electronic data according to an embodiment.

Blocks 351 to 353 of FIG. 3C correspond to blocks 301 to 313, respectively, of FIG. 3A. See the description of blocks 301 to 303 for details of blocks 351 to 353.

Assume that, at block 354, the user wants to associate information with a vibration portion (a first vibration portion) set at block 353. The user calls the vibration setting mode (or a mode for associating information) in the same way as at block 352. The setting means 204 may send an instruction to the display control means 207 to display a window 372 for notifying the user that the vibration setting mode has been entered for associating information with a vibration portion.

In response to reception of the instruction, the display control means 207 may display the window 372 on the display device 201.

At block 355, the user right-clicks the mouse on a first vibration portion 311 and selects information to be associated with the first vibration portion 311, for example, a file name or a button name. The setting means 204 registers the information, for example, the file name or button name, to be associated with the first vibration portion in the vibration setting data 212, for example, in association with the first vibration portion. The registered information is the information associated with the first vibration portion. The display control means 207 may display the information associated with the first vibration portion on the display device 201 when the first vibration portion 311 is specified by an operator and vibrated. The user can further right-click the mouse on the first vibration portion 311 and select information that can be associated with the electronic data or page that contain the first vibration portion 311, for example, a file name or a button name. The setting means 204 registers the information that can be associated with the electronic data or page containing the first vibration portion 311, for example, a file name or button name, in the vibration setting data 212, for example, in association with the first vibration portion 311. The registered information is the information associated with the electronic data or page containing the first vibration portion (hereinafter such information is also referred to as information to be displayed in association with a vibration portion). The display control means 207 may display the information to be displayed in association with the first vibration portion on the display device 201 when the electronic data or page containing the first vibration portion is displayed on the display device 201 and vibrated.

At block 356, the setting means 204 may optionally display an icon 362 near the first vibration portion 361 for indicating the user that information is associated with the first vibration portion.

Following block 356, blocks 304 and 305 of FIG. 3A may be performed to set a second vibration portion in the electronic data. Then, blocks 354 and 355 may be performed to associate information with the second vibration portion of the electronic data. Likewise, information can be associated with an n-th vibration portion and so on. If a particular vibration portion does not need to be associated with information, the process for associating information with the particular vibration portion may be skipped.

Figure 4A:
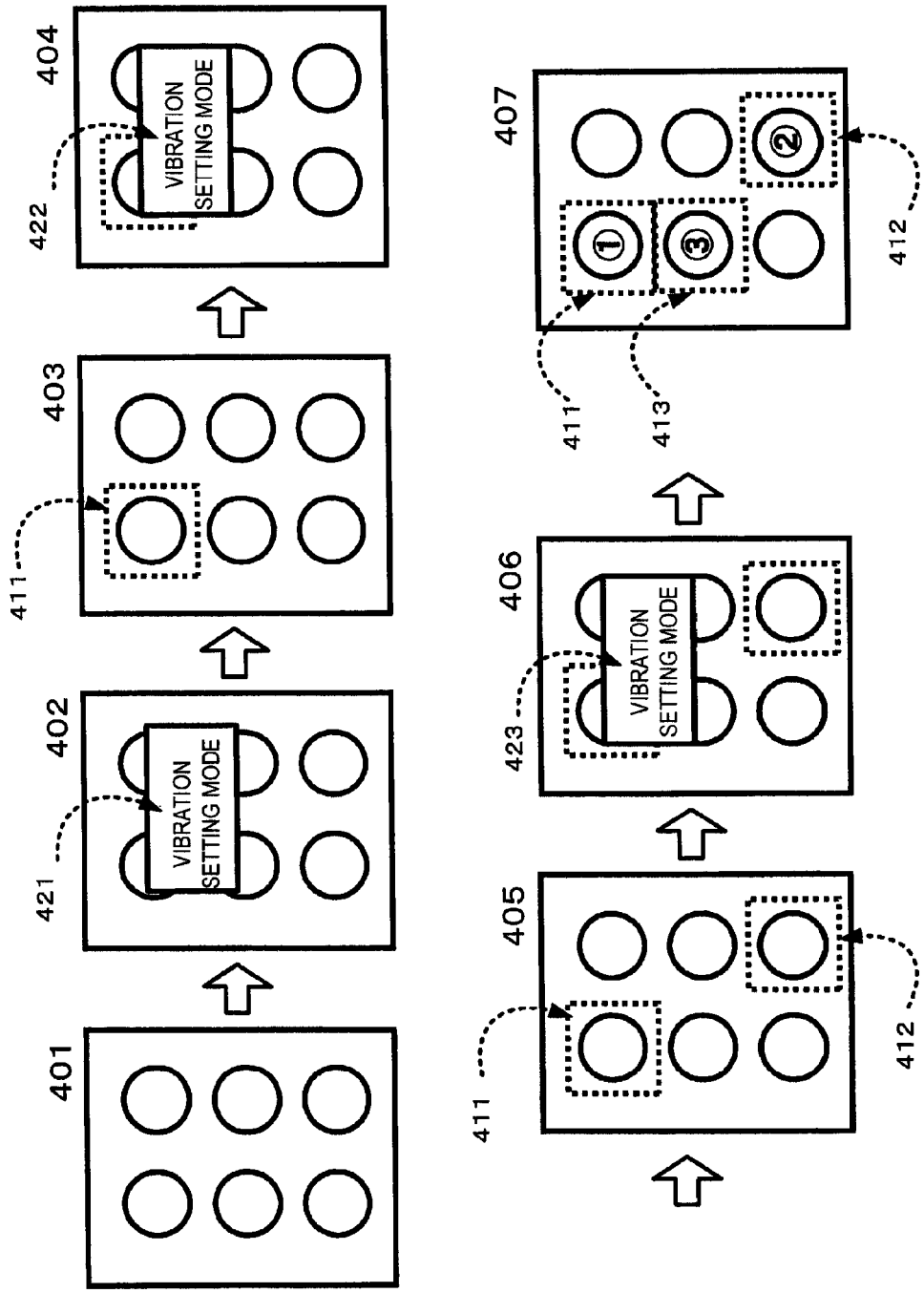
FIG. 4A is a diagram illustrating a scheme for setting a plurality of vibration portions in electronic data according to an embodiment.

FIG. 4A is a diagram illustrating a scheme for setting a plurality of vibration portions in electronic data according to an embodiment.

The user attempts to set a plurality of vibration portions in electronic data by using the setting apparatus 101-1. It is assumed in the example in FIG. 4A that the electronic data includes a plurality of pages, one of which contains a plurality of graphics. The plurality of graphics is represented by circles in this example for convenience.

At block 401, the user issues a request to call electronic data in which a plurality of vibration portions is to be set. In response to the user's request, the setting means 204 reads the electronic data from the storage device 210 or downloads the electronic data from the network into the main memory 103 in the setting apparatus 101-1.

At block 402, the user issues a request to go to a vibration setting mode, for example, the user calls a menu for the vibration mode. The user right-clicks the mouse on the page or, if the display device 201 is a touch panel, double-clicks the screen with an operating finger, to call the menu. In response to the user's call, the setting means 204 enters the vibration setting mode. The setting means 204 may send an instruction to the display control means 207 to display a window 421 for notifying the user that the vibration setting mode has been entered. In response to reception of the instruction, the display control means 207 may display the window 421 on the display device 201.

At block 403, the user drags and drops a portion (first vibration portion) to be vibrated on the page with the mouse to enclose the portion (the graphic labeled with reference numeral 411 at the top left) with a box. If the display device 201 is a touch panel, the user encloses the portion (the first vibration portion) on the page with the operating finger (the graphic labeled with reference numeral 411 at the top left). In response to the user's operation, the setting means 204 may register a vibration sequence number, a document number, and optionally the page number and the start and end points of the line enclosed in the box, or the start and end characters (for example, the from- and to-character numbers), or a combination of any of these in the vibration setting data 212. If the user's operation is the first operation on the electronic data, the vibration sequence number may be set to 1 by default.

At block 404, the user then attempts to specify another portion to be vibrated on the electronic data. The user calls the vibration mode in the same way as at block 402 422. Note that the process may proceed to the next block 405 without performing block 404 every time vibration setting is made. The setting means 204 may send an instruction to the display control means 207 to display a window 422 for notifying the user that the vibration setting mode for setting a second vibration portion has been entered. In response to the instruction, the display control means 207 may display the window 422 on the display device 201.

At block 405, the user drags and drops a portion (a second vibration portion) to be vibrated on the page with the mouse to enclose the portion with a box (the graphic labeled with reference numeral 412 at the bottom right). If the display device 201 is a touch panel, the user encloses a portion (a second vibration portion) to be vibrated (the graphic labeled with reference numeral 412 at the bottom right) on the page with an operating finger. As at block 403, in response to the user's operation, the setting means 204 may register a vibration sequence number, a document number, and optionally the page number and the start and end points of the line enclosed in the box, or the start and end characters (for example, the from- and to-character numbers), or a combination of any of these. If the user's operation is the second operation on the electronic data, the vibration sequence number may be set to 2 by default.

At block 406, the user then attempts to specify another portion to be vibrated on the electronic data. The user calls the vibration setting mode on the page in the same way as at block 402. As has been stated in the description of block 404, the process may proceed to the next block 407 without performing block 406 every time vibration setting is made. The setting means 204 may send an instruction to the display control means 207 to display a window 423 for notifying the user that the vibration mode for setting a third vibration portion has been entered. In response to reception of the instruction, the display control means 207 may display the window 423 on the display device 201.

At block 407, the user drags and drops a portion (a third vibration portion) to be vibrated on the page with the mouse to enclose the portion with a box (the graphic labeled with reference numeral 413 at middle left). If the display device 201 is a touch panel, the user encloses a portion (a third vibration portion) to be vibrated (the graphic labeled with reference numeral 413 at middle left) on the page with the operating finger. As at blocks 403 and 405, in response to the user's operation, the setting means 204 may register a vibration sequence number, a document number, and optionally the page number and the start and end points of the line enclosed in the box, or the start and end characters (for example, the from- and to-character numbers), or a combination of any of these in the vibration setting data. If the user's operation is the third operation on the electronic data, the vibration sequence number may be set to 3 by default. The encircled numbers in the diagram of block 407 indicate that the first vibration portion set at block 403, the second vibration portion set at block 405, and the vibration portion set at block 407 will be vibrated first, second and third, respectively. The encircled numbers are added for the purpose of facilitating the understanding of embodiments of the present invention. The encircled numbers may be displayed on the display device 201 when the setting apparatus 101-1 verifies the vibration sequence number and may be omitted at other times.

The portions set as vibration portions on the screen may be displayed in the same fashion as before the settings. Alternatively, the display control means 207 may highlight the set portions or may display an icon near the set portions indicating that the portions are set as vibration portions.

Figure 4B:
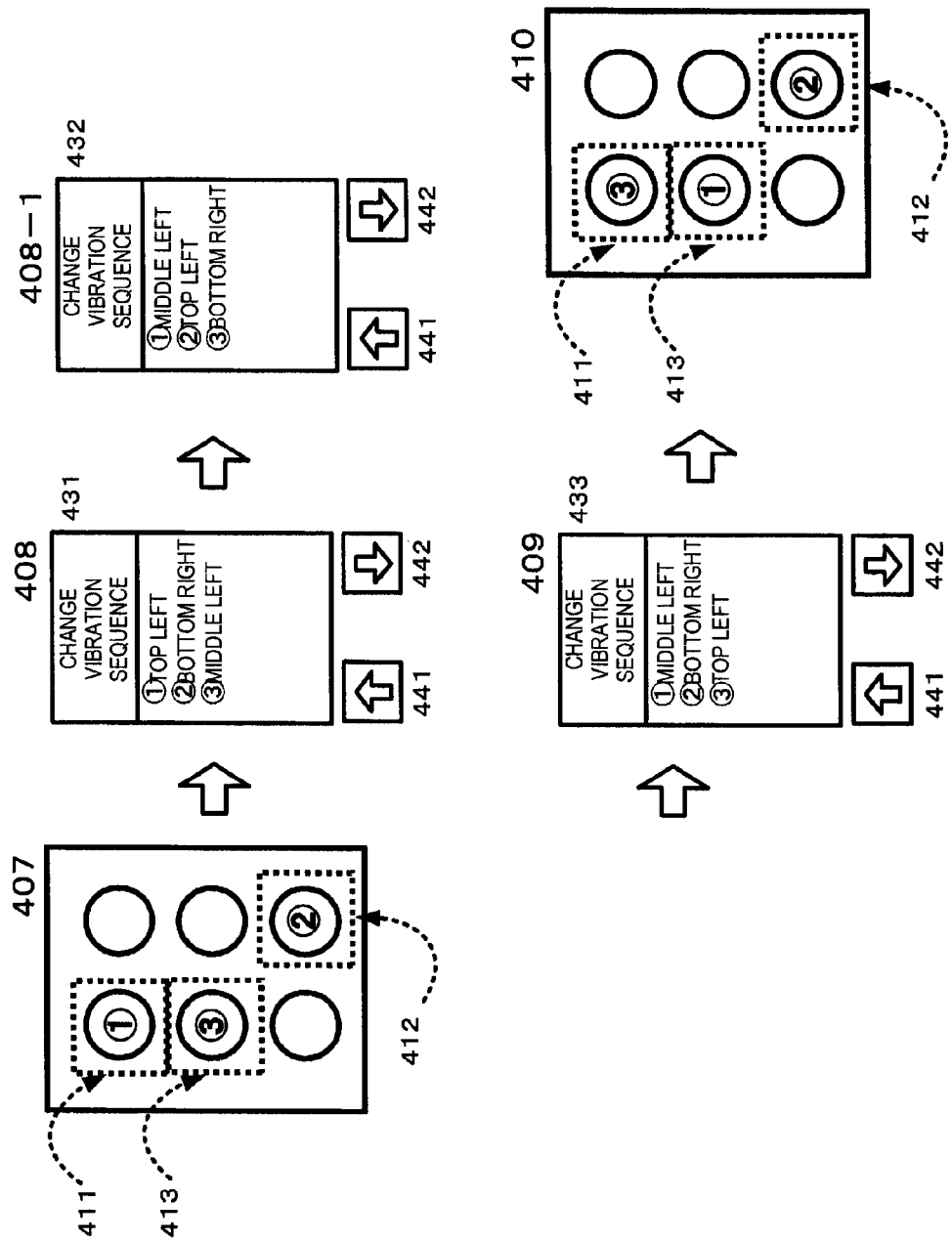
FIG. 4B is a diagram illustrating a scheme for changing the vibration sequence in which a plurality of vibration portions set in electronic data are vibrated according to an embodiment.

FIG. 4B is a diagram illustrating a scheme for changing the vibration sequence in which a plurality of vibration portions set in electronic data are vibrated according to an embodiment.

In FIG. 4A, three vibration portions were set in the electronic document: the first vibration portion set at block 403, the second vibration portion set at block 405, and the third vibration portion set at block 407. The vibration sequence numbers, 1, 2 and 3, indicating the vibration sequence are set for the first, second and third vibration portions, respectively, according to the order in which the vibration portions have been set.

Block 407 of FIG. 4B is the same as block 407 of FIG. 4A. Suppose that the user wants to change the default vibration sequence described above. Here, assume that the user wants to change the vibration sequence to: the third vibration portion, the first vibration portion, and the second vibration portion.

At block 408, the user calls a menu for changing the vibration sequence. In response to the user's call, the setting means 204 displays a window 431 for changing the vibration sequence on the display device 201. The window 431 may further display a button 441 for moving a selected line in the window 431 up (that is, moving up the position in the vibration sequence) and a button 442) for moving the selected line in the window 431) down (that is, lowering the position in the vibration sequence).

The window 431 indicates the vibration sequence at the time the window has been called. That is, the window 431 indicates that the graphic at the top left (reference numeral 411) will be vibrated first, the graphic at the bottom right (reference numeral 412) will be vibrated second, and the graphic at the middle left (reference numeral 413) will be vibrated third. This vibration sequence is read from the vibration setting data 212 stored in the storage device 210. The user selects the place in the window 431 that the user wants to move in the vibration sequence. For example, the user left-clicks the mouse to select the third item from the top in the window 431 (that is, the graphic labeled with reference numeral 413 at the middle left). Then the user left-clicks the mouse on the button 441 to move the selected third item in the window 431 to the top that is, the user left-clicks the button 441 twice). The result is indicated in the window 432.

At block 408-1, the display control means 207 changes the display of the window 431 to a window 432. Then the user left-clicks the mouse to select the second item (that is, the graphic labeled with reference numeral 411 at the top left) from the top in the window 432. The user then left-clicks the button 442 to move the selected second item in the window 432 to the bottom (that is, the user left-clicks the button 442 once). Alternatively, the user may select the third item (that is, the graphic labeled with reference numeral 412 at the bottom right) from the top in the window 432 by a left-click of the mouse. The user then left-clicks the button 441 to move the selected third item to the second place in the window 432 (that is, the user left-clicks the button 441 once). The result is shown in a window 433.

At block 409, the display control means 207 changes the display of the window 431 to a window 432. The window 433 indicates the changed vibration sequence. That is, the window 433 indicates that the graphic at the middle left (reference numeral 413) will be vibrated first, the graphic at the right bottom (reference numeral 412) will be vibrated second, and the graphic at the top left (reference numeral 411) will be vibrated third.

In response to the completion of the operation for changing the vibration sequence, the user left-clicks an "OK" button (not shown) on the window 433 at block 410. In response to the left-click, the setting means 204 changes the vibration sequence in the vibration setting data 212 to the sequence changed at block 409 and confirmed. The encircled numbers in the diagram of block 410 indicate that the first vibration portion set at block 409, the second vibration portion set at block 405, and the vibration portion set at block 407 will be vibrated third, second, and first, respectively. The encircled numbers are added for the purpose of facilitating the understanding of embodiments of the present invention. The encircled numbers may be displayed on the display device 201 when the setting apparatus 101-1 verifies the vibration sequence and may be omitted at other times.

Figure 4C:
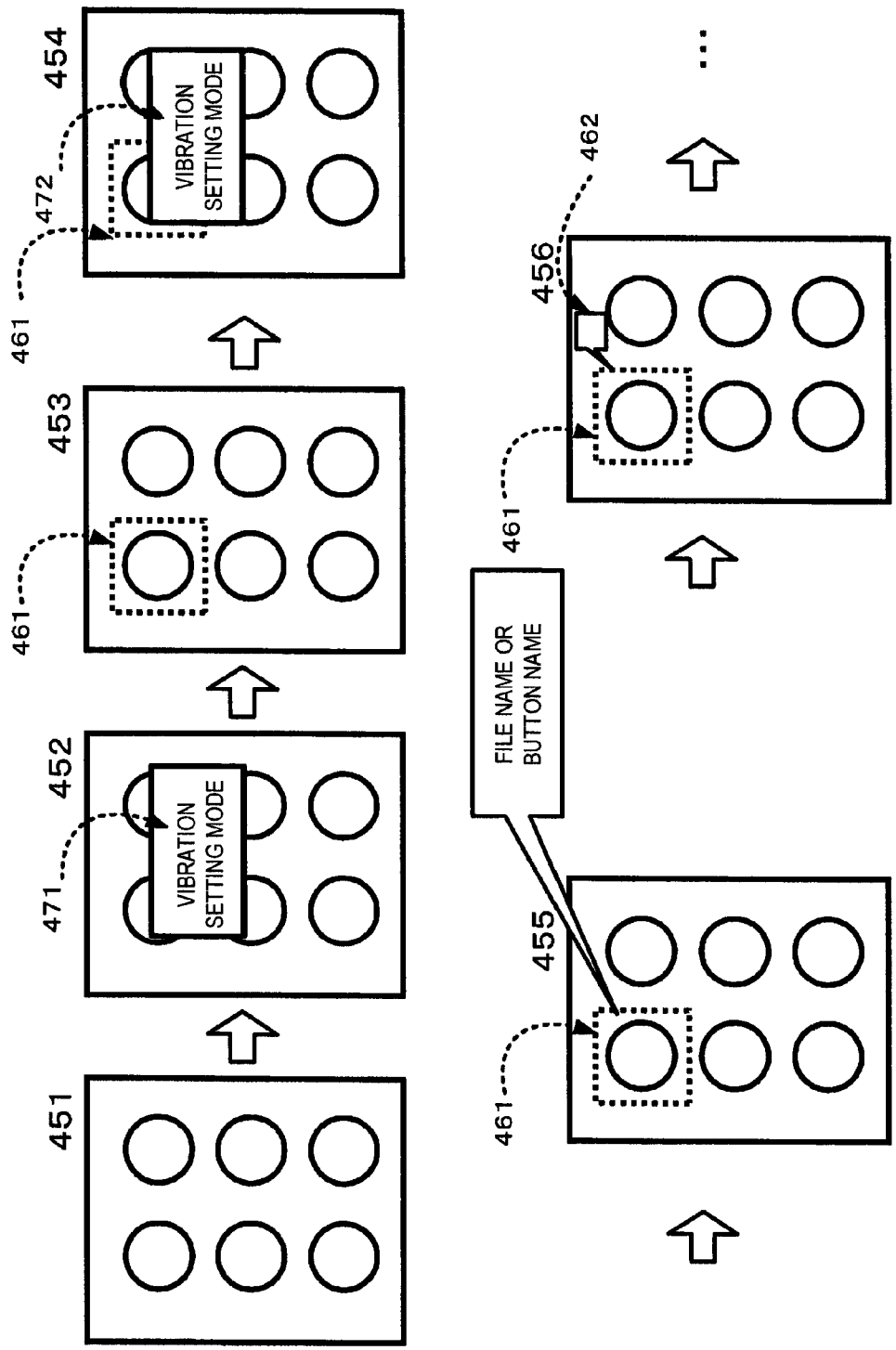
FIG. 4C is a diagram illustrating a scheme for setting a plurality of vibration portions in electronic data according to an embodiment.

FIG. 4C is a diagram illustrating a scheme for setting a plurality of vibration portions in electronic data according to the embodiment.

Blocks 451 to 453 of FIG. 4C correspond to blocks 401 to 413, respectively, of FIG. 4A. See the description of blocks 401 to 403 for details of blocks 451 to 453.

Assume that, at block 454, the user wants to associate information with a vibration portion (a first vibration portion) set at block 453. The user calls the vibration setting mode (or a mode for associating information) in the same way as at block 452. The setting means 204 may send an instruction to the display control means 207 to display a window 472 for notifying the user that the vibration setting mode has been entered for associating information with a vibration portion. In response to reception of the instruction, the display control means 207 may display the window 472 on the display device 201.

At block 455, the user right-clicks the mouse on a first vibration portion 461 and selects information to be associated with the first vibration portion 461, for example a file name or a button name. The setting means 204 registers the information, for example, the file name or button name, to be associated with the first vibration portion in the vibration setting data 212, for example, in association with the first vibration portion. The registered information is the information associated with the first vibration portion. The display control means 207 may display the information associated with the first vibration portion on the display device 201 when the first vibration portion 461 is specified by an operator and vibrated. The user can further right-click the mouse on the first vibration portion 461 and select information that can be associated with the electronic data or page that contains the first vibration portion 461, for example, a file name or a button name. The setting means 204 registers the information that can be associated with the electronic data or page containing the first vibration portion 461, for example, a file name or button name, in the vibration setting data 212, for example, in association with the first vibration portion 461. The registered information is the information associated with the electronic data or page containing the first vibration portion (information to be displayed in association with the vibration portion). The display control means 207 may display the information to be displayed in association with the first vibration portion on the display device 201 when the electronic data or page containing the first vibration portion is displayed on the display device 201 and vibrated.

At block 456, the setting means 204 may optionally display an icon 462 near the first vibration portion 461 indicating that information is associated with a portion near the first vibration portion.

Following block 456, blocks 404 and 405 of FIG. 4A may be performed to set a second vibration portion in the electronic data. Then, blocks 454 and 455 may be performed to associate information with the second vibration portion of the electronic data. Likewise, information can be associated with an n-th vibration portion and so on.

An example of vibration setting data that can be used in an embodiment will be described with reference to FIGS. 5A and 5B. It should be noted that vibration setting data that can be used in embodiments is not limited to the specific examples illustrated in FIGS. 5A and 5B.

FIG. 5A is a diagram illustrating vibration setting data storing vibration sequence of a plurality of vibration portion set in electronic data according to an embodiment.

The vibration setting data 501 may include records 1 to n for the vibration portions (first to n-th vibration portions, where n is an integer greater than or equal to 1). In FIG. 5A, records 1 to 5 are depicted.

Each of the records may contain a vibrating position number 521 and a vibration sequence number 522 and optionally a document number 523 and/or a page number 524. Each record may further contain the start and end points of a line 525 and 526, and/or start and end character numbers 527 and 528. The vibration setting data illustrated in FIG. 5A is especially useful for setting vibration portions in text data.

The vibrating position number 521 is an identification number uniquely assigned to each vibration portion.

The vibration sequence numbers 522 define the order in which vibration portions vibrate set in one or more electronic documents when the vibration portions are specified with a movable object. The vibration sequence numbers 522 are used by the vibration control means 206, which vibrate the vibrating means 205 according to the vibration sequence numbers.

The document number 523 is an identification number uniquely assigned to document data. The document number 523 is a parameter that the vibration control means 206 can use for identifying one piece of document data among a plurality of pieces of document data if there are a plurality of pieces of document data to be vibrated.

The page number 524 is an identification number uniquely assigned to each page of document data. The page number 524 does not necessarily agree with a page number displayed on each page of the document data. The page number 524 may be assigned to the pages of an electronic document in sequence starting with 1.

The start and end points of a line 525 and 526 and the start and end character numbers 527 and 528 are parameters that can be used by the vibration control means 260 for identifying a vibration portion and may be the start and end points of a line in each page of document data and the start and end character numbers.

The page number 524, the start and end points of line 525 and 526, and the start and end character numbers 527 and 528 are parameter that can be used by the vibration control means 206 for identifying a vibration portion.

In record 1 511 and record 2 512, the start and end points of a line 525 and 526 are specified. Accordingly, record 1 511 and record 2 512 indicate that vibrating potions are specified by the start and end points 525 and 526 of a line.

In record 3 513, a page number 524 is specified but the start and end points of a line 525 and 526 and start and end character numbers 527 and 528 are not specified. Accordingly, record 3 513 indicates that a vibration portion is specified by a page number (an entire page).

In record 4 514, start and end character numbers 527 and 528 are specified. Accordingly, record 4 514 indicates that a vibration portion is specified by the start and end character numbers 527 and 528.

In record 5 515, the start and end points of line 525 and 526 and start and end character numbers 527 and 528 are specified. Accordingly, record 5 indicates that a vibration portion is specified by start and end points of line 525 and 526 and the start and end character numbers 527 and 528.

FIG. 5B is a diagram illustrating vibration setting data storing the vibration sequence of a plurality of vibration portions set in electronic data according to an embodiment.

The vibration setting data 502 may include records 1 to n for vibration portions (first to n-th vibration portions, where n is an integer greater than or equal to 1). In FIG. 5B, records 1 to 5 are illustrated.

Each record may include a vibrating position number 541 and a vibration sequence number 542 and optionally a document number 543 and/or a page number 544. Each record may further include X start and X end points 545 and 546 on a page of electronic data and/or Y start and Y end points 547 and 548 on the page of the electronic data. X may be the horizontal direction on the page and Y may be the vertical diction on the page. For example, the coordinates of the top left corner of a page may be represented by $(X, Y)=(0, 0)$. The vibration setting data 502 in FIG. 5B is especially useful for setting vibration portions in image data.

The vibrating position number 541, the vibration sequence number 542, the document number 543 and the page number 544 in FIG. 5B are the same as the vibrating position number 521, the vibration sequence number 522, the document number 523 and the page number 524, respectively, in FIG. 5A. See the description of the vibrating position number 521, the vibration sequence number 522, the document number 523 and the page number 524 given above for details of the vibrating position number 541, the vibration sequence number 542, the document number 523 and the page number 544.

The X start point and X end point 545 and 546 and the Y start point and Y end point 547 and 548 in a page of electronic data are parameters that can be used by the vibration control means 206 for identifying a vibration portion.

In record 1 531 to record 5 535, the X start and X end points 545 and 546 and the Y start and Y end points 547 and 548 are specified. Accordingly, records 1 531 to 5 535 indicate that vibration portions are specified by coordinates (of a rectangle) on the page.

The vibration setting data 501 illustrated in FIG. 5A is especially useful for setting vibration portions in text data whereas the vibration setting data 502 illustrated in FIG. 5B is especially useful for setting vibration portions in image data. The user can combine the vibration setting data 501 illustrated in FIG. 5A with the vibration setting data 502 illustrated in FIG. 5B and adapt the vibration setting data 501 and 502 to use in specifying vibration portions in data containing text and image data as appropriate. Alternatively, the setting means 204 may combine and use parameters out of the parameters given above as appropriate for settings of vibration portions according to the setting of the vibration portions.

In electronic data in which a plurality of vibration portions are set, schemes for causing vibrations in a set vibration sequence in response to the plurality of vibration portions set in the electronic data being specified with a movable object of embodiments will be described below with reference to FIGS. 6A and 6B, FIGS. 6C and 6D, FIGS. 6E to 6F, FIGS. 6G from 6I, and FIGS. 6J and 6K and FIGS. 7A and 7B. It should be noted that the schemes according to embodiments are not limited to the examples illustrated in FIGS. 6A to 6K and FIGS. 7A to 7B.

Figure 6A:
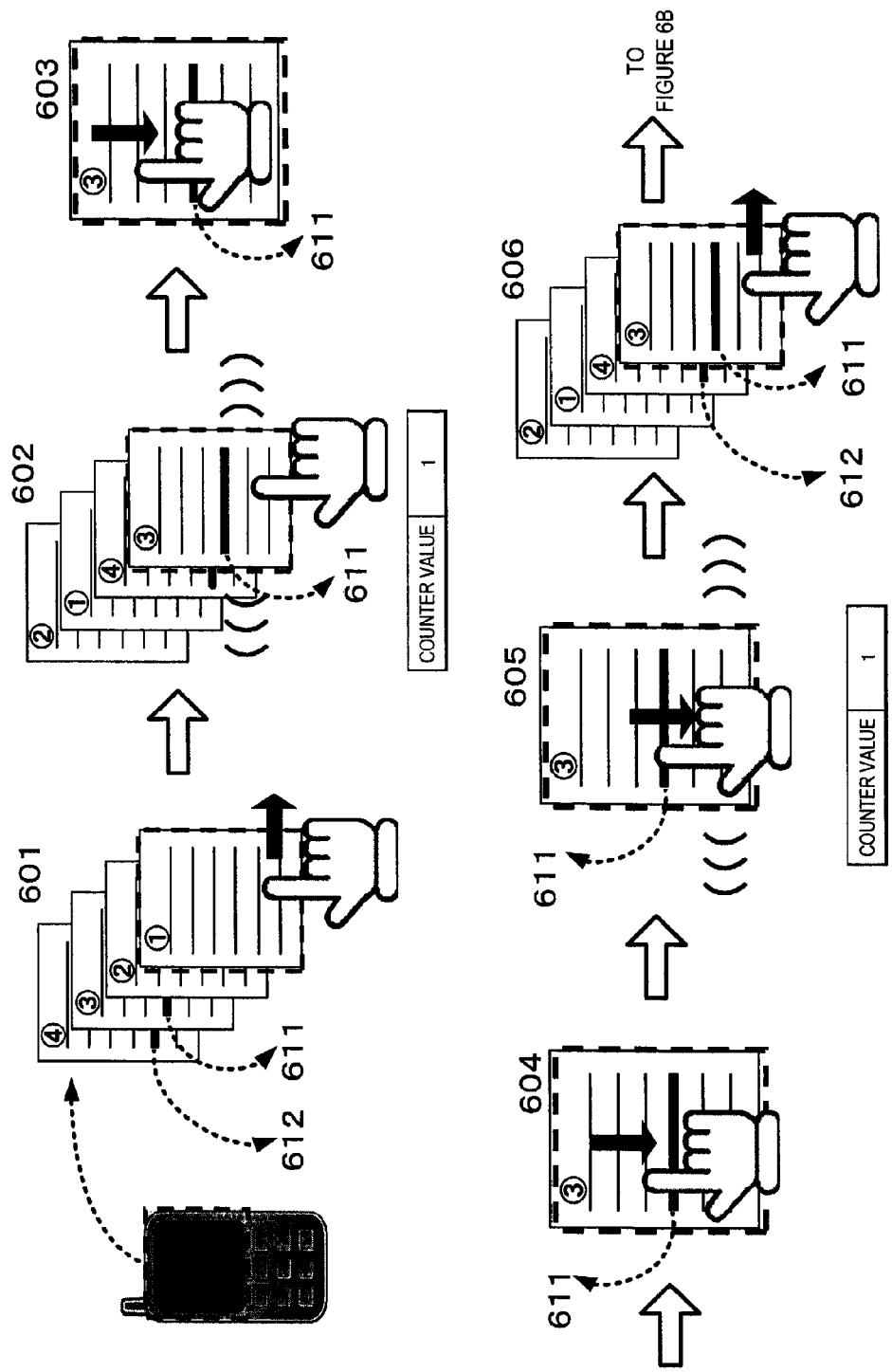
FIG. 6A is a diagram illustrating a scheme for causing vibrations in a set vibration sequence in response to a plurality of vibration portions set in electronic data being specified with a movable object according to an embodiment.
Figure 6B:
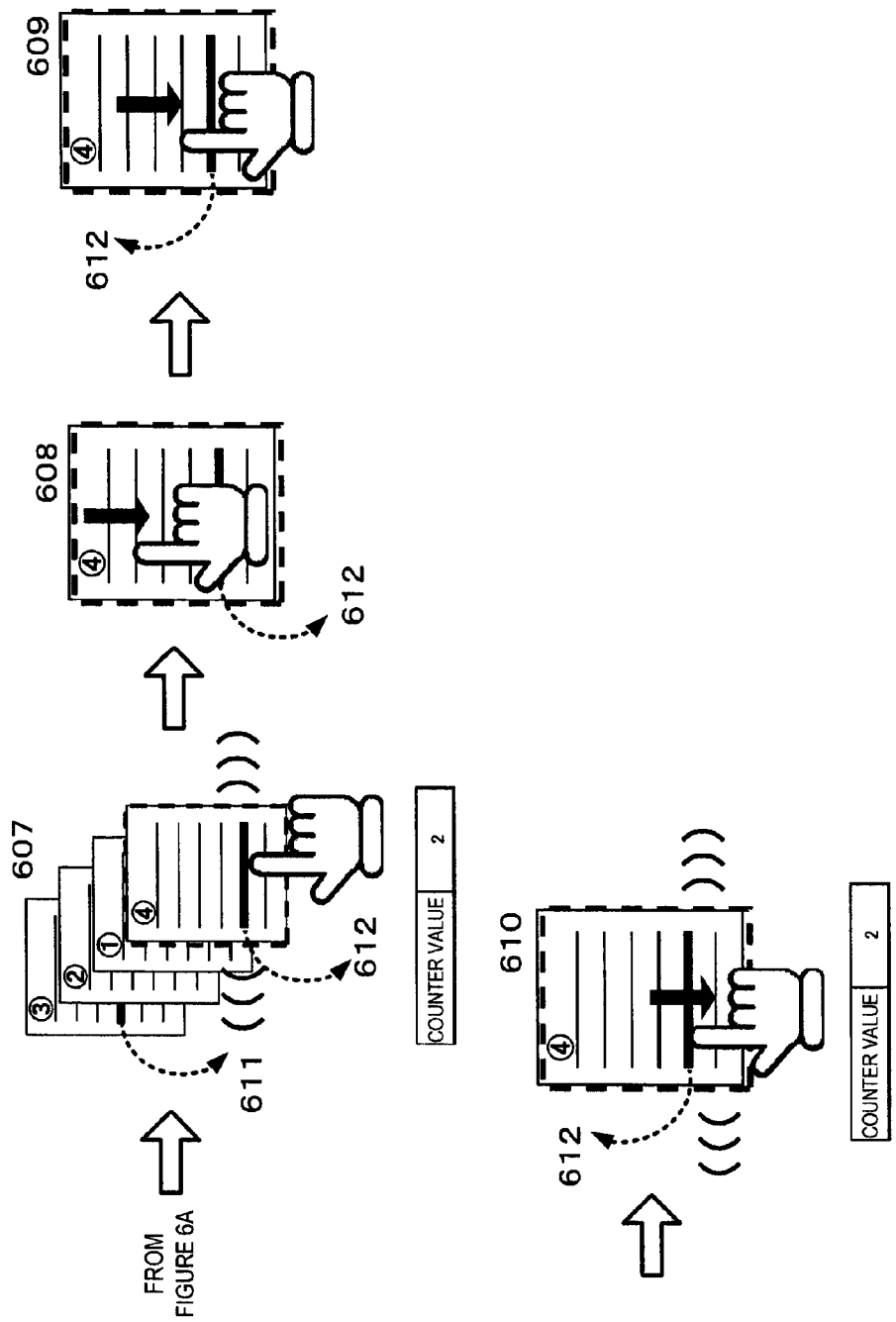
FIG. 6B is a diagram illustrating a scheme for causing vibrations in a set vibration sequence in response a plurality of vibration portions set in electronic data being specified with a movable object according to an embodiment.

FIGS. 6A and 6B are diagrams illustrating a scheme for causing vibrations in a set vibration sequence in response a plurality of vibration portions set in electronic data being specified with a movable object according to an embodiment.

The user attempts to access electronic data using an apparatus with vibrating means, for example, a mobile phone equipped with a touch panel. It is assumed in the example in FIGS. 6A and 6B that the electronic data includes a plurality of pages, that a vibration portion is set in each of a region of line 4 of page 3 611 (hereinafter referred to as region 611) (which is a first vibration portion) and a region of line 5 of page 4 612 (hereinafter referred to as region 612) (which is a second vibration portion), and that the two vibration portions, namely region 611 first and then region 612, vibrate in this order. The encircled numbers in the drawings of electronic data in FIGS. 6A and 6B indicate the page numbers. In the following description, a "counter value" used by the vibration control means 206 is a value indicating a vibration sequence that vibrates next in the sequence among vibration portions for which vibrations are set. The counter value can be incremented by 1 when an operating finger places on a set vibration portion and the vibration portion vibrates.

At block 601, the user issues a request to call electronic data to access (for example, a request to read from the storage device 210 or a request to download from a network). In response to the user's request, the display control means 207 reads the electronic data from the storage device 210 or downloads the electronic data from the network into the main memory 103 in the apparatus with vibrating means 101-2. Page 1 of the electronic data is displayed on the display device 201 of the apparatus with vibrating means 101-2. Assume that the user slides an operating finger rightward on the screen to turn the page. In response to the rightward slide, the display control means 207 increments the page number to display data associated with the page number on the display device 201.

Assume that the user slides the operating finger rightward on the screen to turn from page 2 to page 3 at block 602. In response to this, the apparatus with vibrating means 101-2 vibrates. This is because the vibration control means 206 performs the following process. The vibration control means 206 refers to vibration setting data 212 to find that vibration is set for the region of line 4 of page 3 611. In response to display of page 3 including region 611 on the screen, the vibration control means 206 compares the vibration sequence number of region 611 in the vibration setting data 212 with the counter value in the main memory 103. The vibration sequence number of region 611 is 1 and the counter value is 1. That is, the vibration sequence number is equal to the counter value. Accordingly, the vibration control means 206 sends a vibration instruction to the vibrating means 205. The vibrating means 205 receives the vibration instruction and vibrates the apparatus with vibrating means 101-2. Note that the mode of vibration when the entire page is set as a vibration portion and the mode of vibration when any portion of the page is set as a vibration portion may differ from each other so that the user can distinguish whether the entire page is set as a vibration portion or a portion of the page is set as a vibration portion. It is assumed in this example that the intensity of vibration when the entire page is set as a vibration portion is low and the intensity of vibration when any portion of the page is set as a vibration portion is high. When the intensity of vibration triggered by the vibrating means 205 is low, the user can find out that a vibration portion is set in a part of page 3.

When a vibration portion for which vibration is set in the vibration setting data 212 is specified with the operating finger to trigger vibration, the counter value is incremented by 1. At block 602, however, since the vibration is triggered in response to display of a region (page 3 in this example) that includes a vibration region (611 in this example) for which vibration is set in the vibration setting data 212 on the screen, the vibration control means 206 does not change the counter value.

Assume that the user slide the operating finger downward on the screen in page 3, running the operating finger across lines in sequence from line 1 at block 603. The operating finger is currently pointing to line 2 and is not yet moved into region 611. Accordingly, vibration does not yet occur.

Assume that the user slides the operating finger further downward on the screen in page 3 at block 604. The operating finger is currently pointing to line 3 and is not yet moved into region 611. Accordingly, vibration does not yet occur. Assume that the user slides the operating finger further downward on the screen in page 3.

Assume that the user's operating finger enters region 611 at block 605. Then the apparatus with vibrating means 101-2 vibrates. This is because the vibration control means 206 performs the following process. The vibration control means 206 refers to vibration setting data 212 to find that vibration is set for region 611. In response to region 611 being specified with the operating finger, the vibration control means 206 compares the vibration sequence number of region 611 in the vibration setting data 212 with the counter value in the main memory 103. The vibration sequence number of region 611 is 1 and the counter value is 1. That is, the vibration sequence number is equal to the counter value. Accordingly, the vibration control means 206 sends a vibration instruction to the vibrating means 205. The vibrating means 205 receives the vibration instruction and vibrates the apparatus with vibrating means 101-2. Assuming that the intensity of vibration by the vibrating means 205 is high. From the intensity, the user can find out that a vibration portion is set on line 4 of page 3.

Since vibration is triggered by specifying vibrating region 611 for which vibration is set in the vibration setting data 212 with the operating finger, the vibration control means 206 increments the counter value by 1 to 2.

Assume that the user slides the operating finger on the screen in page 3 beyond region 611 to the last line at block 606. Since there is no vibration portion in page 3 other than region 611, vibration does not occur. Assume that the user then slides the operating finger on the screen rightward to turn from page 3 to page 4.

In response to turning page 3 to page 4 by the user, the apparatus with vibrating means 101-2 vibrates at block 607.

This is because the vibration control means 206 performs the following process. The vibration control means 206 refers to the vibration setting data 212 to find that vibration is set in the region of line 5 of page 4 612. In response to display of page 4 including region 612 on the screen, the vibration control means 206 compares the vibration sequence number of region 612 in the vibration setting data 212 with the counter value in the main memory 103. The counter value is 2 at present. The vibration sequence number of region 612 is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates the apparatus with vibrating means 101-2. Assume that the intensity of vibration is low. From the intensity, the user can find out that a vibration portion is set on page 4.

When vibration is triggered by specifying a vibration portion for which vibration is set in the vibration setting data 212 with the operating finger, the counter value is incremented by 1. However, since the vibration at block 607 is triggered in response to the display of a region (page 4 in this example) that includes a vibration region (612 in this example) for which vibration is set in the vibration setting data 212 on the screen, the vibration control means 206 does not change the counter value.

Assume that the user slides the operating finger downward on the screen in page 4, running the finger across lines in sequence from line 1 at block 608. The operating finger is currently pointing to line 2 and is not yet moved into region 612. Accordingly, vibration does not occur yet.

Assume that the user slides the operating finger further downward on the screen in page 4 at block 609. The operating finger is currently pointing to line 4 and is not yet moved into region 612. Accordingly, vibration does not yet occur. Assume that the user slides the operating finger further downward on the screen in page 4.

Assume that the user's operating finger enters region 612 at block 610. Then the apparatus with vibrating means 101-2 vibrates. This is because the vibration control means 206 performs the following process. The vibration control means 206 refers to the vibration setting data 212 to find that vibration is set for region 612. In response to region 612 being specified with the operating finger, the vibration control means 206 compares the vibration sequence number of region 612 in the vibration setting data 212 with the counter value in the main memory 103. The vibration sequence number of region 612 is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to cause the apparatus with vibrating means 101-2 to vibrate. Assume that the intensity of vibration by the vibrating means 205 is high. From the intensity, the user can find out that vibration is set in line 5 of page 4.

Since vibration is triggered by specifying vibrating region 612 for which vibration is set in the vibration setting data 212 with the operating finger, the vibration control means 206 increments the counter value by 1 to 3 (not shown).

The example in FIGS. 6A and 6B illustrates a mode in which the vibration control means 206 causes the apparatus with vibrating means 101-2 to vibrate when a page including a vibration portion is displayed. But the user can make a setting to keep the vibration control means 206 from vibrating the apparatus with vibrating means 101-2 until a vibration portion is specified with the operating finger after the page including the vibration portion is displayed.

Figure 6C:
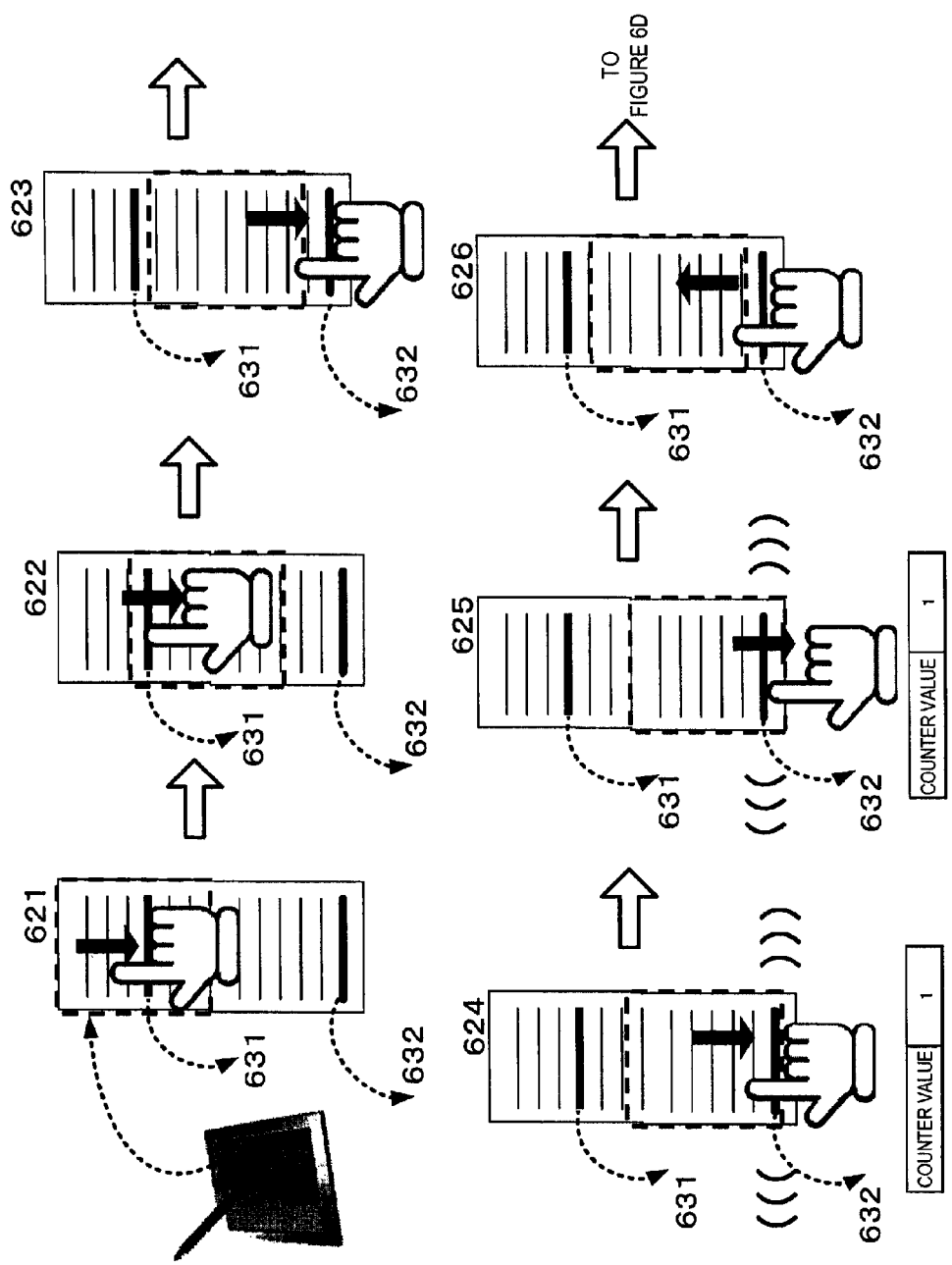
FIG. 6C is a diagram illustrating a scheme for causing vibrations in a set vibration sequence in response a plurality of vibration portions set in electronic data being specified with a movable object according to an embodiment.
Figure 6D:
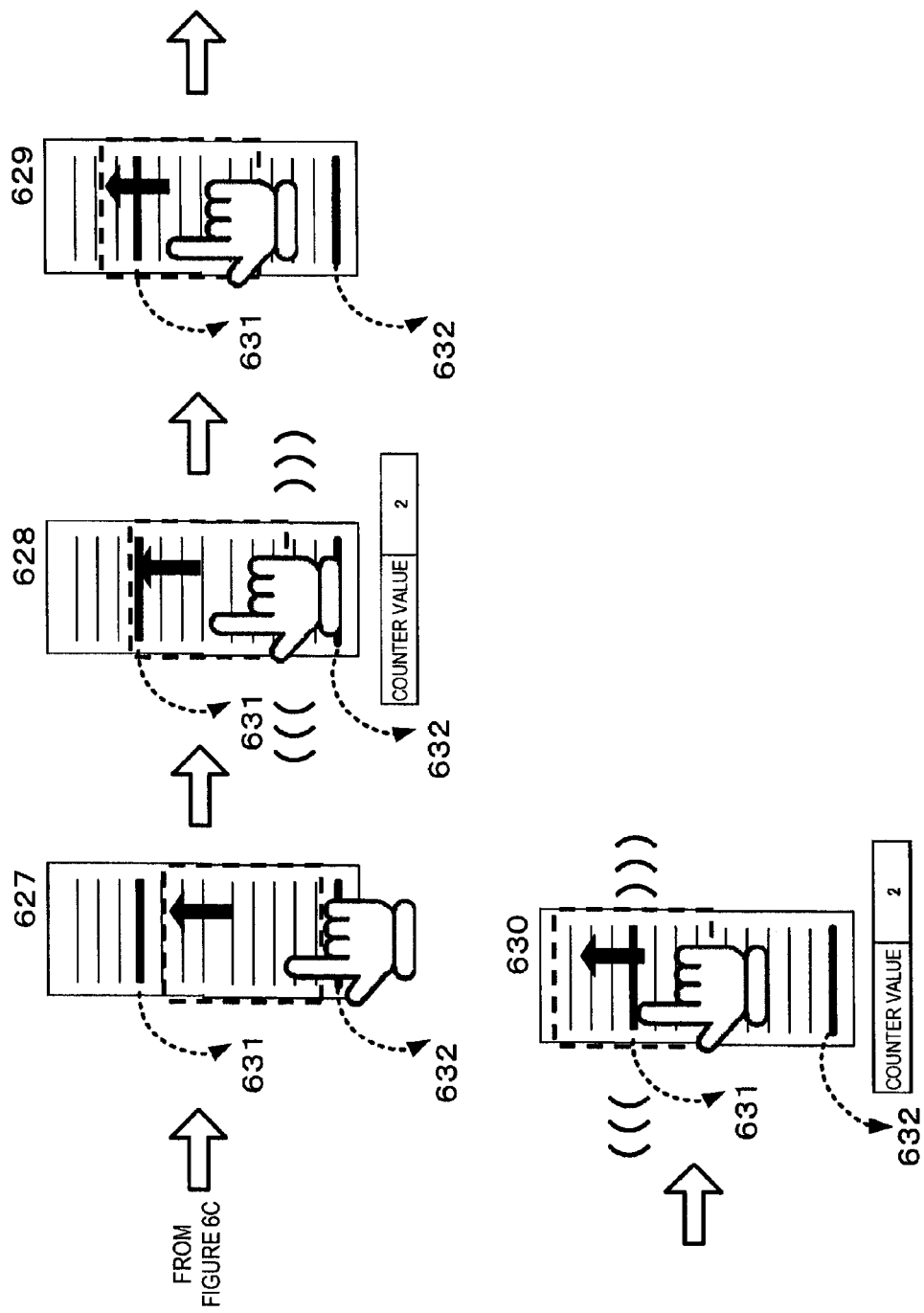
FIG. 6D is a diagram illustrating a scheme for causing vibrations in a set vibration sequence in response a plurality of vibration portions set in electronic data being specified with a movable object according to an embodiment.

FIGS. 6C and 6D are diagrams illustrating a scheme for causing vibrations according to a set vibration sequence in response to a plurality of vibration portions set in electronic data being specified with a movable object according to an embodiment.

The user attempts to access electronic data using an apparatus with vibrating means, for example a tablet terminal. In the example in FIGS. 6C and 6D, the electronic data includes one page and is not partitioned into pages (for example, the electronic data is a Web page). In the electronic data, the region of line 4 631 (hereinafter also referred to as region 631) (which is a first vibration portion) and the region of line 13 632 (hereinafter also referred to as region 632) (which is a second vibration portion) are set as vibration portions. The two vibration portions vibrate in sequence: region 632 first and then region 632.

At block 621, the user issues a request to call electronic data to access (for example, a request to read from the storage device 210 or a request to download from a network). In response to the user's request, the display control means 207 reads the electronic data from the storage device 210 or downloads the electronic data from the network into the main memory 103 in the apparatus with vibrating means 101-2. In response to the request to call the electronic document, the display device 201 displays the first portion (enclosed in a dashed box) of the electronic data. The first portion includes region 631. The vibration control means 206 refers to the vibration setting data 212 to find that vibration is set for region 631. In response to display of region 631 on the screen, the vibration control means 206 compares the vibration sequence number of region 631 with the counter value in the main memory 103. The vibration sequence number of region 631 is 2 and the counter value is 1. That is, the vibration sequence number differs from the counter value. Accordingly, the vibration control means 206 does not send a vibration instruction to the vibrating means 205. The apparatus with vibrating means 101-2 therefore does not vibrate.

Assume that the user slides the operating finger downward on the screen to change the current display on the screen to another screen display. In response to the downward slide, the display control means 207 scrolls the display downward to display corresponding content data on the display device 201.

Assume that the user slides the operating finger downward on the screen and the operating finger enters region 631 at block 622. The vibration control means 206 refers to the vibration setting data 212 to find that vibration is set for region 631. In response to display of region 631 on the screen, the vibration control means 206 compares the vibration sequence number of region 631 in the vibration setting data 212 with the counter value in the main memory 103. The vibration sequence of region 631 is 2 and the counter value is 1. That is, the vibration sequence number differs from the counter value. Accordingly, the vibration control means 206 does not send a vibration instruction to the vibrating means 205. The apparatus with vibrating means 101-2 therefore does not vibrate.

Assume that the user slides the operating finger further downward on the screen at block 623. Region 632 is not displayed on the screen yet. The operating finger is not placed in region 632 yet. Accordingly, vibration does not occur.

Assume that the user slides the operating finger further downward on the screen at block 624 to cause the display device 201 to display a portion (enclosed in a dashed box) including region 632. Then the apparatus with vibrating means 101-2 vibrates. This is because the vibration control means 206 performs the following process. The vibration control means 206 refers to the vibration setting data 212 to find that vibration is set for region 632. In response to display of region 632 on the screen, the vibration control means 206 compares the vibration sequence number of region 632 with the counter value in the main memory 103. The vibration sequence number of region 632 is 1 and the counter value is 1. That is, the vibration sequence number is equal to the counter value. Accordingly, the vibration control means 206 sends a vibration instruction to the vibrating means 205. The vibrating means 205 receives the vibration instruction and vibrates to cause the apparatus with vibrating means 101-2 to vibrate. It is assumed in this example that when a region including a vibration portion is displayed on the screen, the vibration portion vibrates intermittently at intervals of one second, for example, whereas when a vibration portion is specified with the operating finger, the vibration portion vibrates continuously for five seconds. It is assumed that the vibrating means 205 vibrates intermittently at intervals of one second. From this, the user can find out that there is a region where a vibration portion is set in the current display on the screen.

Assume that the user's operating finger enters region 632 at block 625. Then the apparatus with vibrating means 101-2 vibrates. This is because the vibration control means 206 performs the following process. The vibration control means 206 refers to the vibration setting data 212 to find that a vibration portion is set in region 632. In response to region 632 being specified with the operating finger, the vibration control means 206 compares the vibration sequence number of region 632 in the vibration setting data 212 with the counter value in the main memory 103. The vibration sequence number of region 632 is 1 and the counter value is 1. That is, the vibration sequence number is equal to the counter value. Accordingly, the vibration control means 206 sends a vibration instruction to the vibrating means 205. The vibrating means 205 receives the vibration instruction and vibrates to cause the apparatus with vibrating means 101-2 to vibrate. Assume that the vibrating means 205 has vibrated continuously for five seconds. From this, the user can find out that vibration is set in the portion being pointed to with the operating finger.

Since the vibration is triggered by specifying vibration region 632 for which vibration is set in the vibration setting data 212 with the operating finger, the vibration control means 206 increments the counter value by 1 to 2.

Assume that the user slides the operating finger further upward on the screen at block 626. Region 631 is not displayed on the screen yet. The operating finger is not placed in region 631 yet. Accordingly, vibration does not occur.

Assume that the user slides the operating finger further upward on the screen at block 627. Region 631 is not displayed on the screen yet. The operating finger is not placed in region 631 yet. Accordingly, vibration does not occur.

Assume that the user slides the operating finger further upward on the screen at block 628 to cause the display device 201 to display a portion (enclosed in a dashed box) including region 631. Then the apparatus with vibrating means 101-2 vibrates. This is because the vibration control means 206 performs the following process. The vibration control means 206 refers to the vibration setting data 212 to find that vibration is set for region 631. In response to display of region 631 on the screen, the vibration control means 206 compares the vibration sequence number of region 631 in the vibration setting data 212 with the counter value in the main memory 103. The vibration sequence number of region 632 is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to cause the apparatus with vibrating means 101-2 to vibrate. Assume that the vibrating means 205 is vibrating intermittently at intervals of 1 second. From this, the user can find out that there is region where a vibration portion is set in the current display on the screen.

When vibration is triggered by specifying a vibration portion for which vibration is set in the vibration setting data 212 with the operating finger, the counter value is incremented by 1. However, since the vibration at block 628 is triggered in response to display of a region (enclosed in the dashed box) that includes a vibration region (631 in this example) for which vibration is set in the vibration setting data 212 on the screen, the vibration control means 206 does not change the counter value.

Assume that the user slides the operating finger further upward on the screen at block 629. The operating finger is not placed in region 631 yet. According, vibration does not occur.

Assume that the user's operating finger enters region 631 at block 630. Then the apparatus with vibrating means 101-2 vibrates. This is because the vibration control means 206 performs the following process. The vibration control means 206 refers to the vibration setting data 212 to find that a vibration portion is set in region 631. In response to region 631 being specified with the operating finger, the vibration control means 206 compares the vibration sequence number of region 631 in the vibration setting data 212 with the counter value in the main memory 103. The vibration sequence number of region 631 is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to cause the apparatus with vibrating means 101-2 to vibrate. Assume that the vibrating means 205 has continuously vibrated for five seconds. From this, the user can find out that a vibration is set for the portion currently pointed to with the operating finger.

Since vibration is triggered by specifying vibrating region 631 for which vibration is set in the vibration setting data 212 with the operating finger, the vibration control means 206 increments the counter value by 1 to 3 (not shown).

The example in FIGS. 6C and 6D illustrates a mode in which the vibration control means 206 causes the apparatus with vibrating means 101-2 to vibrate when a line region 631 or 632 including a vibration portion is displayed. But the user can make a setting to keep the vibration control means 206 from vibrating the apparatus with vibrating means 101-2 until a vibration portion is specified with the operating finger after the line including the vibration portion is displayed.

Figure 6E:
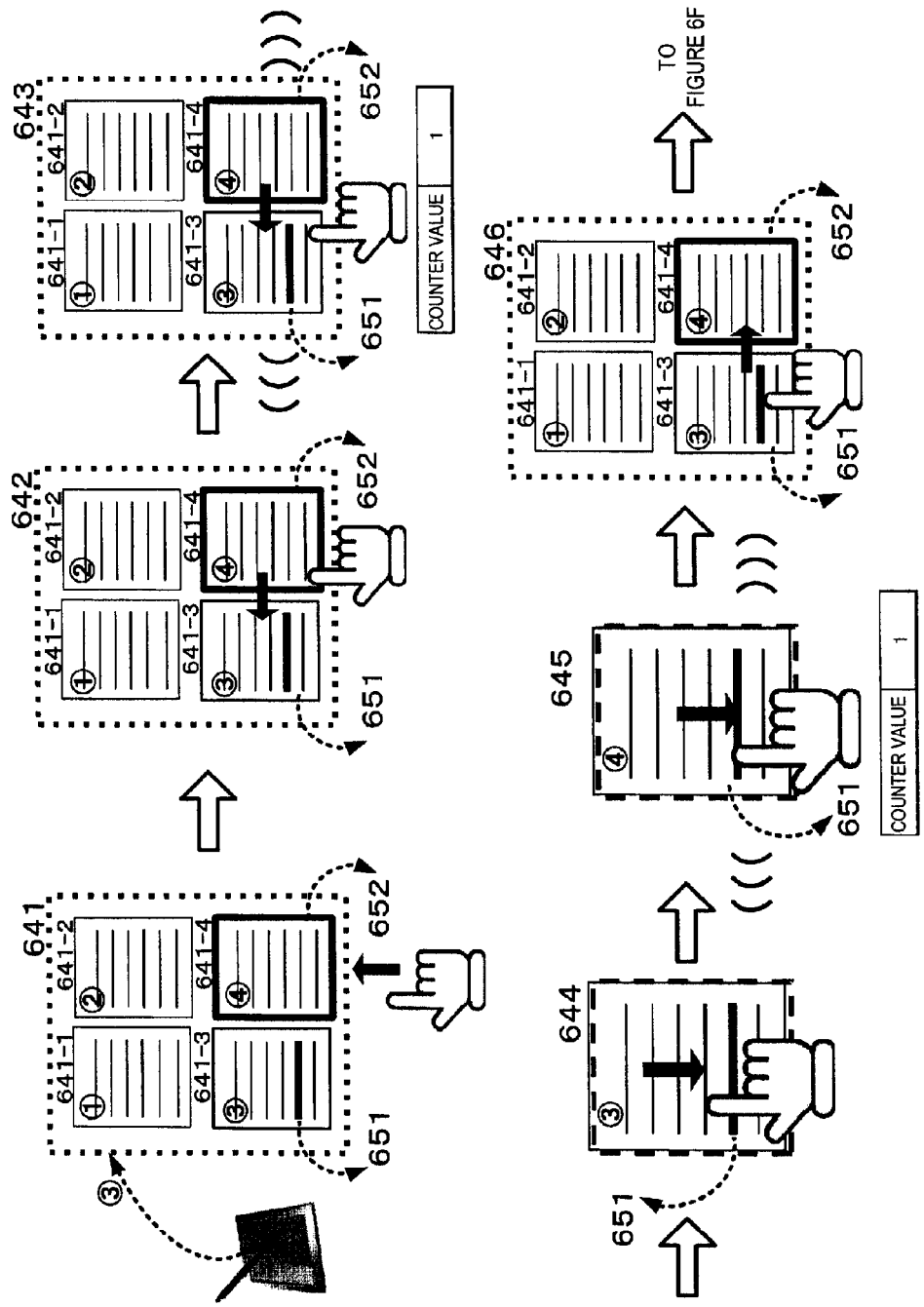
FIG. 6E is a diagram illustrating a scheme for causing vibrations in a set vibration sequence in response a plurality of vibration portions set in electronic data being specified with a movable object according to an embodiment.
Figure 6F:
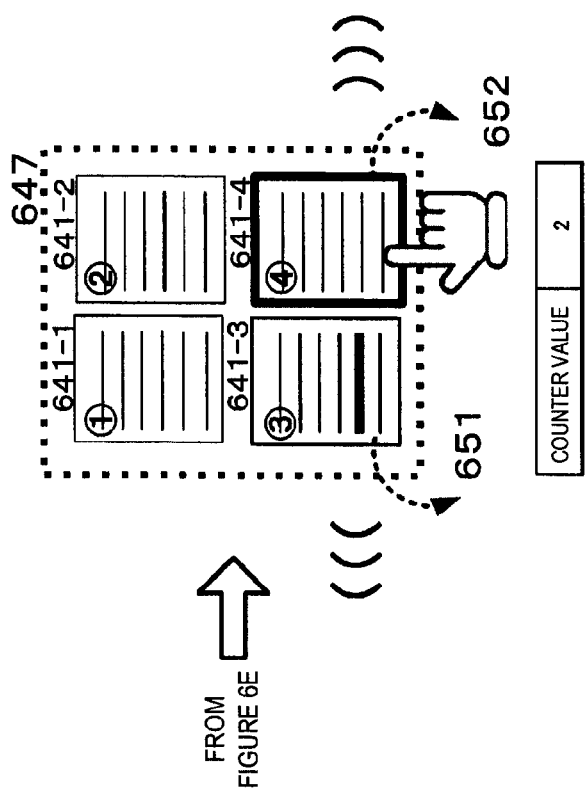
FIG. 6F is a diagram illustrating a scheme for causing vibrations in a set vibration sequence in response a plurality of vibration portions set in electronic data being specified with a movable object according to an embodiment.

FIGS. 6E and 6F are diagrams illustrating a scheme for causing vibrations according to a set vibration sequence in response a plurality of vibration portions set in electronic data being specified with a movable object according to an embodiment.

The user attempts to access electronic data using the apparatus with vibrating means 101-2, for example a tablet terminal. In the example in FIGS. 6E and 6F, the electronic data includes a plurality of pages and the display device 201 of the apparatus with vibrating means 101-2 is displaying four pages 641-1, 641-2, 641-3 and 641-4 on the screen at a time. In the electronic data, vibration portions are set in the region of line 5 of page 3 651 (hereinafter also referred to as region 651) (which is a first vibration portion) and page 4 itself 652 (hereinafter also referred to as region 652) (which is a second vibration portion) and the two vibration portions vibrate in sequence, region 651 first then region 652. In the diagram of the electronic data in FIGS. 6E and 6F, the encircled numbers indicate page numbers. It is also assumed in this example that when a page including a vibration portion among a plurality of pages displayed on the screen is specified with an operating finger, only the page that includes the vibration portion vibrates and, when a page for which vibration is set among a plurality of pages displayed on the screen is specified with the operating finger, the apparatus with vibrating means 101-2 itself, for example, vibrates.

At block 641, the user issues a request to call electronic data to access (for example, a request to read from the storage device 210 or a request to download from a network). In response to the user's request, the display control means 207 reads the electronic data from the storage device 210 or downloads the electronic data from the network into the main memory 103 in the apparatus with vibrating means 101-2. The display device 201 of the apparatus with vibrating means 101-2 is displaying pages 1 to 4 of the electronic data at the same time. The user slides an operating finger on the screen in various directions in an attempt to move the operating finger to one of pages 1 to 4.

Assume that the user places the operating finger on page 4 (that is, region 652) at block 642. In response to placement of the operating finger in region 652, the vibration control means 206 refers to the vibration setting data 212 to find that vibration is set for region 652. The vibration control means 206 compares the vibration sequence number of region 652 with the counter value in the main memory 103. The vibration sequence number of region 652 is 2 and the counter value is 1. That is, the vibration sequence number differs from the counter value. Accordingly, the vibration control means 206 does not send a vibration instruction to the vibrating means 205. Accordingly, the apparatus with vibrating means 101-2 does not vibrate.

Assume that the user then slides the operating finger to move from page 4 to page 3.

Assume that the user's operating finger enters page 3 at block 643. In response to the presence of the operating finger on page 3 including region 651, the vibration control means 206 refers to vibration setting data 212 to find that vibration is set for region 651. The vibration control means 206 compares the vibration sequence number of region 651 with the counter value in the main memory 103. The vibration sequence number of region 651 is 1 and the counter value is 1. That is, the vibration sequence number is equal to the counter value. Accordingly, the vibration control means 206 sends a vibration instruction to the vibrating means 205. The vibrating means 205 receives the vibration instruction and causes vibration as described below. Assume that the vibrating means 205 vibrates only page 3 on the screen. This enables the user to find out that a vibration portion is set on page 3. The user then triple clicks, for example, on page 3 in order to zoom in only page 3 on the screen. In response to the triple-click, the display control means 207 displays only page 3 on the screen.

When vibration is triggered by specifying a vibration portion for which vibration is set in the vibration setting data 212 with the operating finger, the counter value is incremented by 1. However, since the vibration at block 643 is triggered in response to display of a region (page 3 in this example) that includes a vibration portion (651 in this example) for which vibration is set in the vibration setting data 212 on the screen, the vibration control means 206 does not change the counter value.

Assume that the user slides the operating finger downward on page 3 on the screen at block 644. The operating finger is currently pointing to line 4 and is not placed in region 651 yet. Accordingly, vibration does not yet occur.

Assume that the user's operating finger enters region 651 at block 645. Then the apparatus with vibrating means 101-2 vibrates. This is because the vibration control means 206 performs the following process. The vibration control means 206 refers to the vibration setting data 212 to find that vibration is set for region 651. In response to region 651 being specified with the operating finger, the vibration control means 206 compares the vibration sequence number of region 651 in the vibration setting data 212 with the counter value in the main memory 103. The vibration sequence number of region 651 is 1 and the counter value is 1. That is, the vibration sequence number is equal to the counter value. Accordingly, the vibration control means 206 sends a vibration instruction to the vibrating means 205. The vibrating means 205 receives the vibration instruction and vibrates to trigger the apparatus with vibrating means 101-2 to vibrate (for example, continuously for five seconds). From this, the user finds out that vibration is set for line 5 of page 3.

Since vibration is triggered by specifying vibrating portion 651 for which vibration is set in the vibration setting data 212 with an operating finger, the vibration control means 206 increments the counter value by 1 to 2.

The user triple-clicks, for example, on page 3 in order to display pages 1 to 4 of the electronic data on the screen at the same time. In response to the triple-clock, the display control means 207 displays page 1 to 4 on the screen at the same time.

Assume that the user slides the operating finger from page 3 to page 4 at block 646.

Assume that the user slides the operating finger to move from page 3 to 4 at block 647 and the operating finger enters page 4. In response to the presence of the operating finger in region 652 (that is, page 4), the vibration control means 206 refers to the vibration setting data 212 to find that vibration is set for region 652. The vibration control means 206 compares the vibration sequence number of region 652 in the setting data 212 with the counter value in the main memory 103. The vibration sequence number is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to trigger the apparatus with vibrating means 101-2 to vibrate. Assume that the vibration of the vibrating means 205 vibrates the apparatus with vibrating means 101-2. From this vibration, the user finds out that a vibration portion is set for page 4.

Since vibration is triggered by specifying vibrating region 652 for which vibration is set in the vibration setting data 212 with the operating finger, the vibration control means 206 increments the counter value by 1 to 3 (not shown).

Figure 6G:
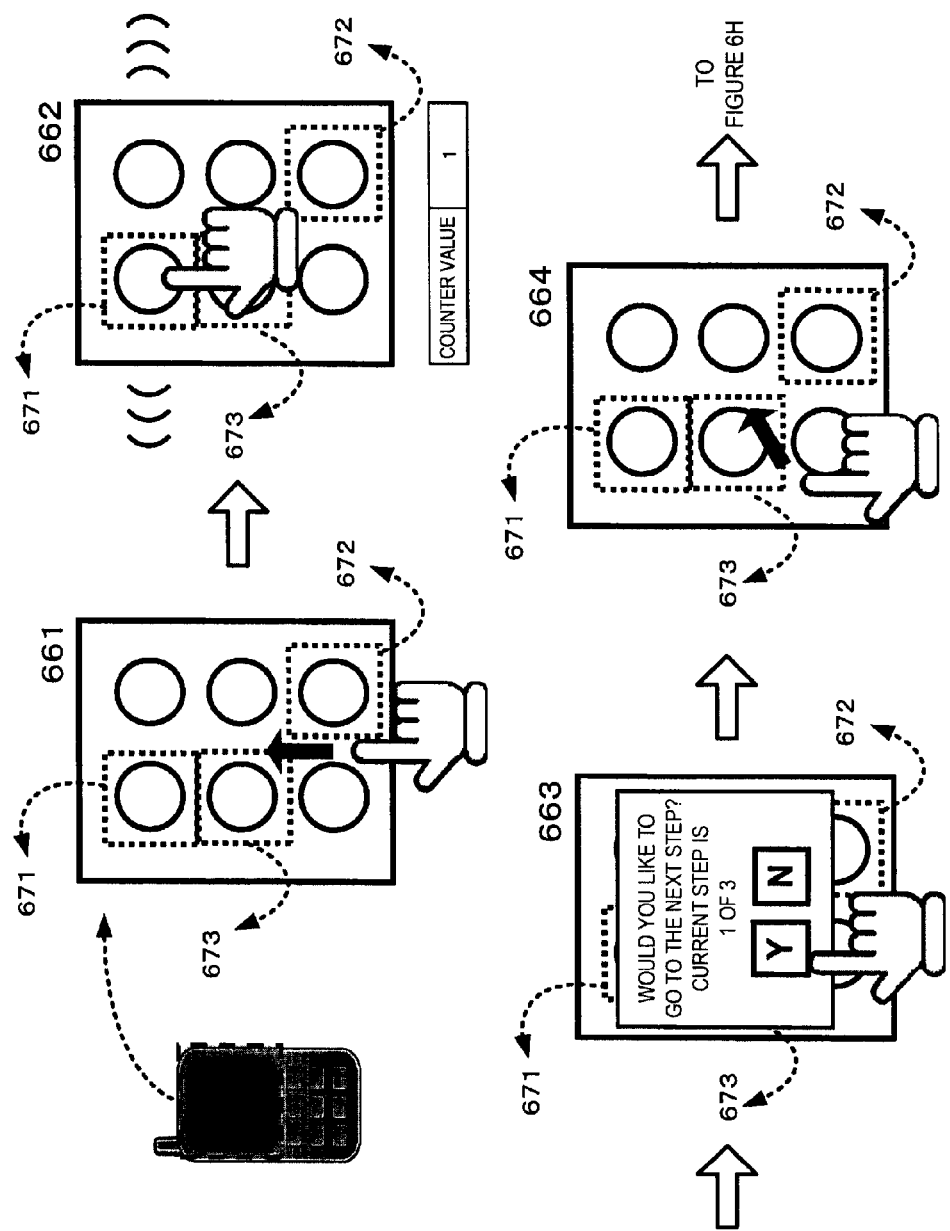
FIG. 6G is a diagram illustrating a scheme for causing vibrations in a set vibration sequence in response a plurality of vibration portions set in electronic data being specified with a movable object according to an embodiment.
Figure 6H:
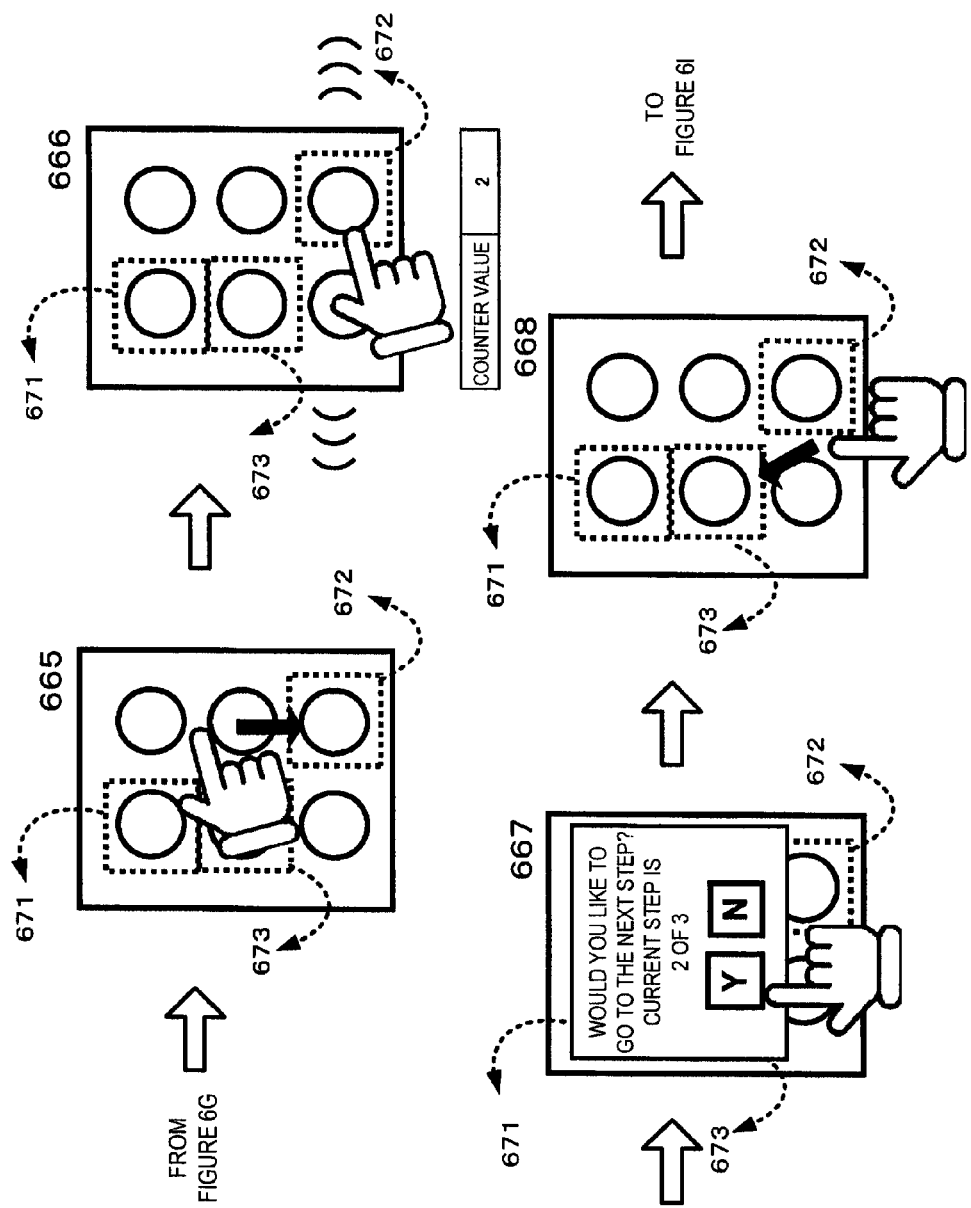
FIG. 6H is a diagram illustrating a scheme for causing vibrations in a set vibration sequence in response a plurality of vibration portions set in electronic data being specified with a movable object according to an embodiment.
Figure 6I:
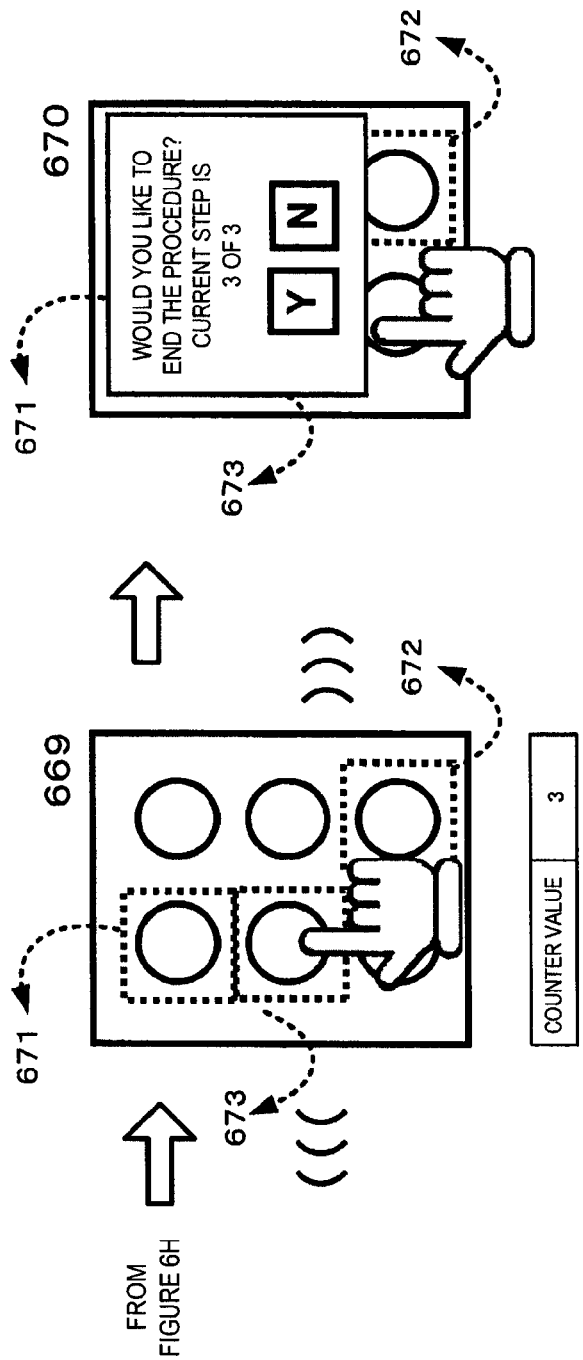
FIG. 6I is a diagram illustrating a scheme causing vibration in a set vibration sequence in response to pointing to a plurality of vibration portions set in electronic data with a movable object according to an embodiment.

FIGS. 6G, 6H and 6I are diagrams illustrating a scheme for causing vibrations according to a set vibration sequence in response to a plurality of vibration portions set in electronic data being specified with a movable object according to an embodiment.

The user attempts to access electronic data that is an instruction manual for fabricating a machine, using an apparatus with vibrating means 101-2, for example, a mobile phone with touch panel. It is assumed in the example in FIGS. 6G to 6I that the electronic data includes a plurality of graphics (six graphics in this example), for example images of a machine, on one page. The plurality of graphics in this example is represented by circles for convenience. In the electronic data, a vibration portion is set in each of the region of the graphic at the top left 671 (hereinafter also referred to as region 671) (which is a first vibration portion), the region of the graphic at the bottom right 672 (hereinafter also referred to as region 672) (which is a second vibrating region), and the region of the graphic at the middle left 673 (hereinafter also referred to as region 673) (which is a third vibration portion) and the three vibration portions vibrate in the following sequence: region 671, region 672 and region 673. It is also assumed that when a graphic for which vibration is set is specified with an operating finger, only the vibration portion, for example, in the region vibrates.

At block 661, the user issues a request to call electronic data to access (for example a request to read from the storage device 210 or a request to download from a network). In response to the user's request, the display control means 207 reads the electronic data from the storage device 210 or downloads the electronic data from the network into the main memory 103 in the apparatus with vibrating means 101-2. The display device 201 of the apparatus with vibrating means 101-2 is displaying a page including six graphics in the electronic data. The user slides an operating finger on the screen in various directions in an attempt to move the operating finger to one of the six graphics.

Assume that the user places the operating finger on the graphic at the top left (that is, region 671) at block 662. In response to the presence of the operating finger in region 671, the vibration control means 206 refer to vibration setting data 212 to find that vibration is set for region 671. The vibration control means 206 compares the vibration sequence number of region 671 in the vibration setting data 212 with the counter value in the main memory 103. The vibration sequence number of region 671 is 1 and the counter value is 1. That is, the vibration sequence number is equal to the counter value. Accordingly, the vibration control means 206 sends a vibration instruction to the vibrating means 205. The vibrating means 205 receives the vibration instruction and triggers vibration as described below. Assume that the vibration triggered by the vibrating means 205 is vibration of only region 671 of the graphic at the top left. From this vibration, the user finds out that a vibration portion is set for the graphic at the top left.

Assume that the user places the operating finger on the graphic at the top left (that is, region 671) at block 662. In response to the presence of the operating finger in region 671, the vibration control means 206 refer to vibration setting data 212 to find that vibration is set for region 671. The vibration control means 206 compares the vibration sequence number of region 671 in the vibration setting data 212 with the counter value in the main memory 103. The vibration sequence number of region 671 is 1 and the counter value is 1. That is, the vibration sequence number is equal to the counter value. Accordingly, the vibration control means 206 sends a vibration instruction to the vibrating means 205. The vibrating means 205 receives the vibration instruction and triggers vibration as described below. Assume that the vibration triggered by the vibrating means 205 is vibration of only region 671 of the graphic at the top left. From this vibration, the user finds out that a vibration portion is set for the graphic at the top left.

Since vibration is triggered by specifying vibrating region 671 for which vibration is set in the vibration setting data 212 with an operating finger, the vibration control means 206 increments the counter value by 1 to 2.

At block 663, in response to the vibration of region 671, the display control means 207 displays information associated with region 671 in a new window. The information may be a message that prompts the user to confirm a procedure ("Would you like to go to the next step? Current step is 1 of 3."). The window includes a "Y" button for inputting confirmation and an "N" button for inputting unconfirmation.

The display control means 207 may halt the processing operation by the vibration control means 206 while the window is being displayed. That is, no vibration occurs if the user touches a graphic on the screen.

Assume that the user then left clicks the mouse on the "Y" button. The display control means 207 clears the window from the screen and activates the processing operation of the vibration control means 206.

At block 664, the user then slides the operating finger on the screen in various directions in an attempt to move the operating finger to one of the six graphics.

At block 665, the user's operating finger is not in the region where vibration is set and therefore vibration does not occur. The user slides the operating finger on the screen in various directions in an attempt to move the operating finger to one of the six graphics.

Assume that the user places the operating finger on the graphic at bottom right (that is, region 672) at block 666. In response to the presence of the operating finger in region 672, the vibration control means 206 refers to the vibration setting data 212 to find that vibration is set for region 672. The vibration control means 206 compares the vibration sequence number of region 672 in the vibration setting data 212 with the counter value in the main memory 103. The vibration sequence number of region 672 is 2 and the counter value is 2. That is, the vibration sequence number is equal to the counter value. Accordingly, the vibration control means 206 sends a vibration instruction to the vibrating means 205. The vibrating means 205 receives the vibration instruction and triggers vibration as described below. Assume that the vibration by the vibrating means 205 is vibration of only the region of the graphic at the bottom right. From this vibration, the user finds out that a vibration portion is set for the graphic at the bottom right.

Since vibration is triggered by specifying vibrating region 672 for which vibration is set in the vibration setting data 212 with the operating finger, the vibration control means 206 increments the counter value by 1 to 3.

In response to the vibration of region 672, the display control means 207 displays information associated with region 672 in a new window at block 667. The information may be a message that prompts the user to confirm a procedure ("Would you like to go to the next step? Current step is 2 of 3."). The window includes a "Y" button for inputting confirmation and an "N" button for inputting unconfirmation.

The display control means 207 may halt the processing operation of the vibration control means 206 while the window is being displayed. That is, no vibration occurs if the user touches a graphic on the screen.

Assume that the user then left-clicks the mouse on the "Y" button. The display control means 207 clears the window from the screen and activates the processing operation of the vibration control means 206.

At block 668, the user then slides the operating finger on the screen in various directions in an attempt to move the operating finger to one of the six graphics.

Assume that the user places the operating finger on the graphic at the middle left (that is, region 673) at block 669. In response to the presence of the operating finger in region 673, the vibration control means 206 refers to the vibration setting data 212 to find that vibration is set for region 673. The vibration control means 206 compares the vibration sequence number of region 673 in the vibration setting data 212 with the counter value in the main memory 103. The vibration sequence number of region 673 is 3 and the counter value is 3.

That is, the vibration sequence number is equal to the counter value. Accordingly, the vibration control means 206 sends a vibration instruction to the vibrating means 205. The vibrating means 205 receives the vibration instruction and triggers vibration as described below. Assume that the vibration triggered by the vibrating means 205 is vibration of only the region of the graphic at the bottom left. From the vibration, the user finds out that a vibration portion is set for the graphic at the bottom left.

Since vibration is triggered by specifying vibrating region 673 for which vibration is set in the vibration setting data 212 with an operating finger, the vibration control means 206 increments the counter value by 1 to 4 (not shown).

In response to the vibration of region 673, the display control means 207 displays information associated with region 673 in a new window at block 670. The information may be a message that prompts the user to confirm a procedure ("Would you like to end the procedure? Current step is 3 of 3."). The window includes a "Y" button for inputting confirmation and an "N" button for inputting unconfirmation.

The display control means 207 may halt the processing operation of the vibration control means 206 while the window is being displayed. That is, no vibration occurs if the user touches a graphic on the screen.

Assume that the user then left-clicks the mouse on the "Y" button. Then the display control means 207 clears the window from the screen.

Figure 6J:
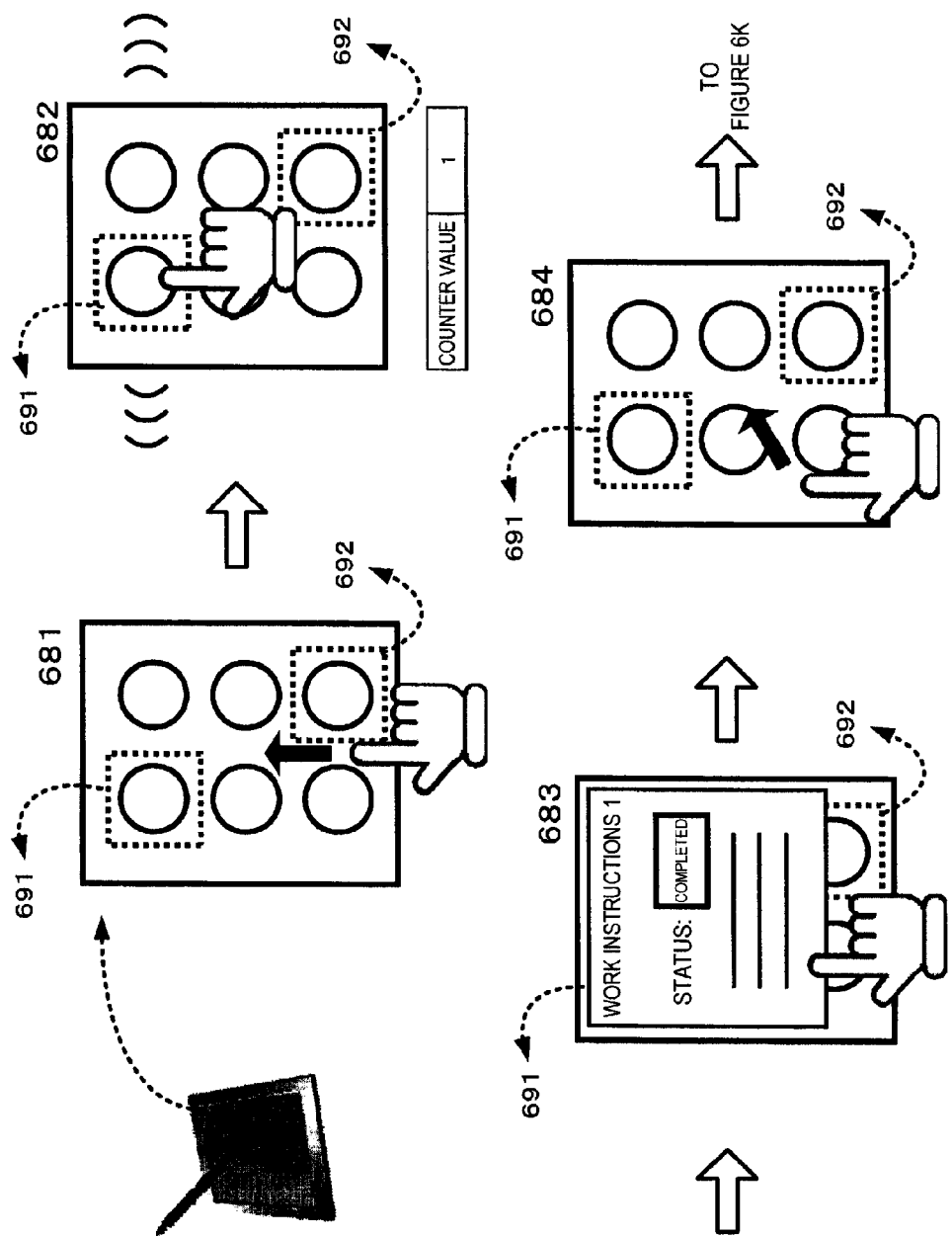
FIG. 6J is a diagram illustrating a scheme for causing vibrations in a set vibration sequence in response a plurality of vibration portions set in electronic data being specified with a movable object according to an embodiment.

FIGS. 6J and 6K are diagrams illustrating a scheme for causing vibrations according to a set vibration sequence in response to a plurality of vibration portions set in electronic data being specified with a movable object according to an embodiment.

The user attempts to access electronic data that is work instructions using an apparatus with vibrating means 101-2, for example, a mobile phone with touch panel. It is assumed in the example in FIGS. 6J and 6K that the electronic data has a plurality of graphics (six graphics in this example), for example, images of a machine, on one page. In the example, the plurality of graphics is represented by circles for convenience. In the electronic data, a vibration portion is set in each of the region of the graphic at the top left 691 (hereinafter also referred to as region 691) (which is a first vibration portion) and the region of the graphic at the bottom right 692 (hereinafter also referred to as region 692) (which is a second vibration portion) and the two vibration portions vibrate in the sequence, region 691 first and then region 692.

At block 681, the user issues a request to call electronic data to access (for example, a request to read from the storage device 210 or a request to download from a network). In response to the user's request, the display control means 207 reads the electronic data from the storage device 210 or downloads the electronic data from the network into the main memory 103 in the apparatus with vibrating means 101-2. The display device 201 of the apparatus with vibrating means 101-2 displays a page including six graphics in the electronic data. The user slides an operating finger on the screen in various directions in an attempt to move the operating finger to one of the six graphics.

Assume that the user places the operating finger on the graphic at the top left (that is region 691) at block 682. In response to the presence of the operating finger in region 691, the vibration control means 206 refers to vibration setting data 212 to find that vibration is set for region 691. The vibration control means 206 compares the vibration sequence number of region 691 with the counter value in the main memory 103. The vibration sequence number of region 691 is 1 and the counter value is 1. That is, the vibration sequence number is equal to the counter value. Accordingly, the vibration control means 206 sends a vibration instruction to the vibrating means 205. The vibrating means 205 receive the vibration instruction and vibrate to trigger the entire apparatus with vibrating means 101-2 to vibrate. From this vibration, the user finds out that a vibration portion is set for the graphic at the top left. The user therefore double-clicks the graphic at the top left. In response to the double-click, the display control means 207 displays a window indicating a work instruction associated with the graphic at the top left on the screen (not shown). The user checks the actual machine according to the work instruction. After completion of the work, the user closes the window indicating the work instruction (not shown).

Since vibration is triggered by specifying vibrating region 691 for which vibration is set in the vibration setting data 212 with an operating finger, the vibration control means 206 increments the counter value by 1 to 2.

In response to the closure of the window indicating the work instruction after the vibration of region 691, the vibration control means 206 displays information associated with region 691 in a new window. The information is a message that prompts the user to input confirmation that the work has been completed. The window also has a "Done" button for inputting confirmation.

The display control means 207 may halt the processing operation of the vibration control means 206 while the window is being displayed. That is, no vibration occurs if the user touches a graphic on the screen.

Assume that the user then left-clicks the mouse on the "Done" button. The display control means 207 clears the window from the screen and activates the processing operation of the vibration control means 206.

At block 684, the user then slides the operating finger on the screen in various directions in an attempt to move the operating finger to one of the six graphics.

Since the user's operating finger is not in a region where vibration is set, vibration does not occurs at block 685. The user then slides the operating finger on the screen in various directions in an attempt to move the operating finger to one of six graphics.

Assume that the user places the operating finger on the graphic at the bottom right (that is, region 692) at block 686. In response to the presence of the operating finger in region 692, the vibration control means 296 refers to the vibration setting data 212 to find that vibration is set for region 692. The vibration control means 262 compares the vibration sequence number of region 692 with the counter value in the main memory 103. The vibration sequence number is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to trigger the entire apparatus with vibrating means 101-2 to vibrate. From this vibration, the user finds out that a vibration portion is set for the graphic at the bottom right. The user double-clicks the graphic at the bottom right. In response to the double-click, the display control means 207 displays a window that indicates a work instruction associated with the graph at the bottom right on the screen (not shown). The user performs the work according to the work instruction and, after completion of the work, closes the window indicating the work instruction (not shown).

Since vibration is triggered by specifying vibrating region 692 for which vibration is set in the vibration setting data 212 with an operating finger, the vibration control means 206 increments the counter value by 1 to 3 (not shown).

At block 687, in response to the closure of the window indicating the work instruction after the vibration of region 692, the vibration control means 206 displays information associated with region 692 on a new window. The information is a message that prompts the user to input confirmation that the work has been completed. The window also has a "Done" button for inputting confirmation.

The display control means 207 may halt the processing operation of the vibration control means 206 while the window is being displayed. That is, no vibration occurs if the user touches a graphic on the screen.

Assume that the user then left-clicks the mouse on the "Y" button. The display control means 207 clears the window from the screen.

Figure 7A:
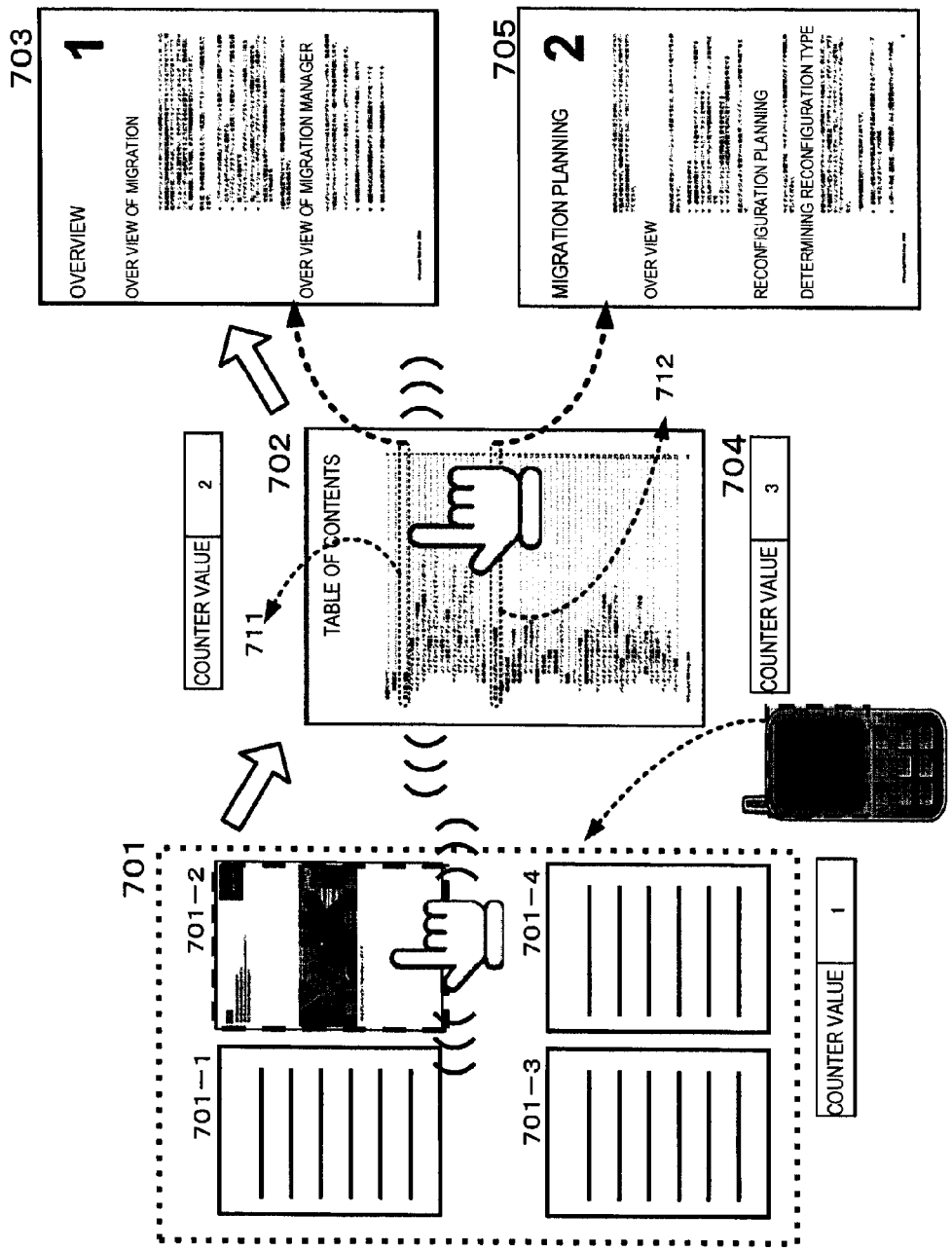
FIG. 7A is a diagram illustrating a scheme for causing vibrations in a set vibration sequence in response a plurality of vibration portions set in a plurality of electronic documents being specified with a movable object according to an embodiment.

FIG. 7A is a diagram illustrating a scheme for causing vibrations in a set vibration sequence in response to a plurality of vibration portion set in electronic data being specified with a movable object according to an embodiment.

The user attempts to access electronic data using an apparatus with vibrating means 101-2, for example, a smartphone. In the example in FIG. 7A, the screen of the apparatus with vibrating means 101-2 is displaying four electronic documents 701-1, 701-2, 701-3 and 701-4. In the four electronic documents, a vibration portion is set for each of electronic document 701-2 itself (which is a first vibration portion), a region 711 indicating Chapter 1 in a table of contents page of the electronic document 701-2 (hereinafter also referred to as region 711) (which is a second vibration portion), and a region indicating Chapter 2 in the table of contents page hereinafter also referred to as region 712) (which is a third vibration portion). The three vibration portions vibrate in the following sequence: electronic document 701-2, region 711 and then region 712.

At block 701, the user issues a request to call electronic data to access (for example a request to read from the storage device 210 or a request to download from a network). In response to the user's request, the display control means 207 reads the four pieces of electronic data from the storage device 210 or downloads the four pieces of electronic data from the network into the main memory 103 in the apparatus with vibrating means 101-2. The display device 201 of the apparatus with vibrating means 101-2 is displaying the front pages of the four pieces of the electronic data at the same time. The user slides the operating finger on the screen in various directions in an attempt to move the operating finger to one of pages 1 to 4.

Assume that the user places the operating finger on electronic document 701-2. In response to the presence of the operating finger on electronic document 701-2, the vibration control means 206 refers to vibration setting data 212 to find that vibration is set for the electronic document 701-2 itself. The vibration control means 206 compares the vibration sequence number of electronic document 701-2 in the vibration setting data 212 (see the vibration sequence number in record 1 731 in FIG. 7B) with the counter value in the main memory 103. The vibration sequence number of electronic document 701-2 is 1 and the counter value is 1. That is, the vibration sequence number is equal to the counter value. Accordingly, the vibration control means 206 sends a vibration instruction to the vibrating means 205. The vibrating means 205, which is disposed under the region of the screen where electronic document 701-2 is being displayed, receives the vibration instruction and vibrates. Therefore, vibration occurs only in the region on the screen where electronic document 701-2 is being displayed. Thus the user finds out that a vibration portion is set for electronic document 701-2.

Since vibration is triggered by specifying electronic document 701-2 for which vibration is set in the vibration setting data 212 with an operating finger, the vibration control means 206 increments the counter value by 1 to 2.

Then the user triple-clicks, for example, on electronic document 701-2 in order to display only electronic document 701-2 on the screen. In response to the triple-click, the display control means 207 displays the table of contents page of electronic document 701-2 on the screen.

Assume that the user then slides the operating finger on the table of contents page at block 702. Assume that the user's operating finger enters region 711. In response to the presence of the operating finger in region 711, the vibration control means 206 refers to the vibration setting data 212 to find that vibration is set for region 711. The vibration control means 206 compares the vibration sequence number of region 711 in the vibration setting data 212 (see the vibration sequence number in record 2 732 in FIG. 7B) with the counter value in the main memory 103. The vibration sequence number of region 711 is 2 and the counter value is 2. That is, the vibration sequence number is equal to the counter value. Accordingly, the vibration control means 206 sends a vibration instruction to the vibrating means 205. The vibrating means 205 receives the vibration instruction and vibrates to trigger the entire apparatus with vibrating means 101-2 to vibrate.

Since the vibration is triggered by specifying region 711 for which vibration is set in the vibration setting data 212 with an operating finger, the vibration control means 206 increments the counter value by 1 to 3.

The vibration indicates to the user that a vibration portion is set in the region 711 representing Chapter 1 on the table of contents page. The user double-clicks the portion that says "Chapter 1: Overview" on the table of contents page.

In response to the double-click, the display control means 207 displays a window showing the content of the page of "Chapter 1: Overview" at block 703. Alternatively, in response to the double-click, the display control means 207 changes the screen to the content of the page of "Chapter 1: Overview". When the user finish reading the page of "Chapter 1: Overview", the user triple-clicks, for example, on the screen. In response to the triple-click, the display control means 207 triggers the screen display to go back to the table of contents page (see the diagram of block 702 again).

In the example given above, the user double-clicks the portion that says "Chapter 1: Overview" on the table of contents page. However, if the portion that says "Chapter 1: Overview" is associated with the content of a "Chapter 1: Overview" page, the display control means 207 automatically changes the screen from the table of contents page to the page of that content of "Chapter 1: Overview" to display the content of "Chapter 1: Overview" associated with the region 711 indicating Chapter 1 in response to the vibration.

Assume that the user then further slides the operating finger on the table of contents page at block 704 (see the diagram of block 702). Assume that the user's operating finger enters region 712. In response to the presence of the user's operating finger in region 712, the vibration control means 206 refers to the vibration setting data 212 to find that vibration is set for region 712. The vibration control means 206 compares the vibration sequence number of region 712 in the vibration setting data 212 (see the vibration sequence number in record 3 733 in FIG. 5B) with the counter value in the main memory 103. The vibration sequence number of region 712 is 3 and the counter value is 3. That is, the vibration sequence number is equal to the counter number. Accordingly, the vibration control means 206 sends a vibration instruction to the vibrating means 205. The vibrating means 205 receives the vibration instruction and vibrates to trigger the entire apparatus with vibrating means 101-2 to vibrate.

Since the vibration is triggered by specifying vibrating region 712 for which vibration is set in the vibration setting data 212 with an operating finger, the vibration control means 206 increments the counter value by 1 to 4 (not shown).

The vibration indicates to the user that a vibration portion is set in the region 712 indicating Chapter 2 in the table of contents page. The user double-clicks the portion that says "Chapter 2: Migration Planning" on the table of contents page.

In response to the double-click, the display control means 207 displays a window indicating the content of a "Chapter 2: Migration Planning" page on the screen at block 705. Alternatively, in response to the double-click, the display control means 207 changes the screen to a content of a "Chapter 2: Migration Planning" page. When the user finishes reading the page content of "Chapter 2: Migration Planning", the user triple-clicks, for example, on the screen. In response to the triple-click, the display control means 207 triggers the screen display to go back to the table of contents page (see the diagram of block 702).

In the example given above, the user double-clicks the portion that says "Chapter 2: Migration Planning" However, if the portion that says "Chapter 2: Migration Planning" is associated with the content of a "Chapter 2: Migration Planning" page, the display control means 207 automatically changes the screen from the table of contents page to the content of that content of "Chapter 2: Migration Planning" to display the content of "Chapter 2: Migration Planning" associated with the region 712 indicating Chapter 2 in response to the vibration.

FIG. 7B is a diagram illustrating vibration setting data storing a vibration sequence of a plurality of vibration portions set in a plurality of electronic documents according to an embodiment.

The vibration setting data 721 illustrated in FIG. 7B is the vibration setting data used for displaying the four electronic documents 701-1, 701-2, 701-3 and 701-4 in FIG. 7A. In the vibration setting data 721, record 1 731, record 2 732, and record 3 733 represent vibration settings for electronic document 701-2, region 711 and region 712, respectively.

Figure 8A:
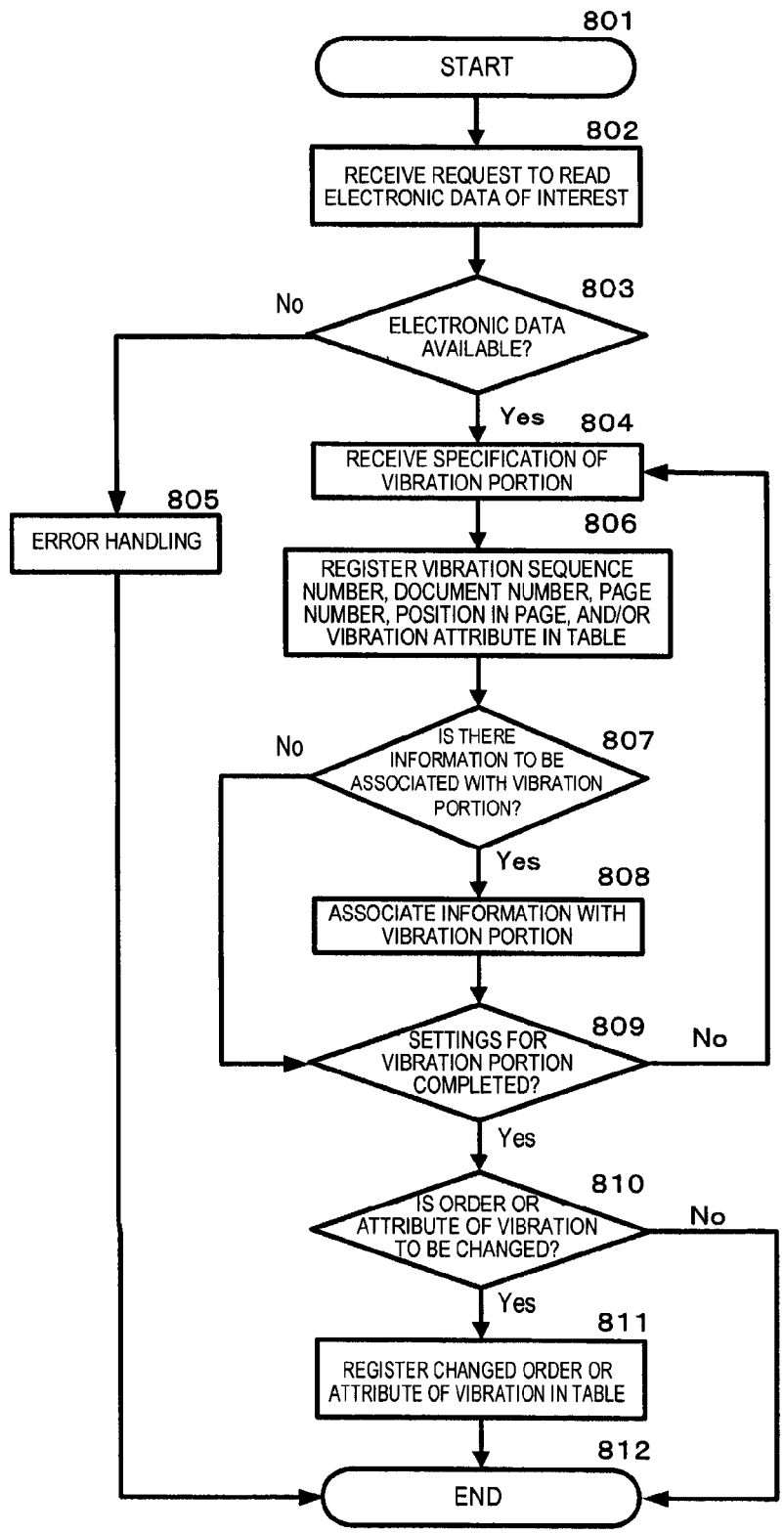
FIG. 8A illustrates a flowchart of a process for setting a plurality of vibration portions in electronic data and associating information with the set vibration portions according to an embodiment.

FIG. 8A illustrates a flowchart of a process for setting a plurality of vibration portions in electronic data and associating information with the set vibration portions according to an embodiment.

At block 801, the setting apparatus 101-1 starts the process.

At block 802, the setting means 204 receives a request to call one or more pieces of electronic data in which a plurality of vibration portions are to be set.

At block 803, the setting means 204 determines whether the electronic data requested is available or not. The electronic data can be obtained from the storage device 210 or through a network, for example. If the electronic data is available, the vibration control means 206 forwards the process to block 804. On the other hand if the electronic data is not available, the vibration control means 206 performs error handling 805 for outputting an error. At block 805, the setting means 204 displays a message that the requested electronic data is not available.

At block 804, in response to a user's request to go to the vibration setting mode, the setting means 204 enters the vibration setting mode. In response to the user specifying one of the plurality of pieces of electronic data or specifying a particular portion in electronic data, the setting means 204 identifies that the specified portion is a portion to be vibrated. See the description of FIG. 3A given above for details of the scheme for identifying the vibration portion.

In response to the identification, the setting means 204 may register a vibration sequence number, a document number, and optionally a page number and the start and end point of a line enclosed, or start and end characters (for example the from- and to-character numbers), or a combination of these, and optionally a vibration mode in the vibration setting data 212 at block 806.

At block 807, the setting means 204 determines whether or not there is information to be associated with the vibration portion. The setting means 204 may present a window to the user to ask the user whether there is information to be associated with the vibration portion. Alternatively, the setting means 204 may determine whether or not information is automatically associated with the vibration portion in accordance with the content of the vibration portion. For example, if the vibration portion is an entry of table of contents data, information to be associated with the vibration portion is the page content corresponding to the entry of the table of contents data. In response to the presence of information to be associated with the vibration portion, the setting means 204 forwards the process to block 808. On the other hand, in response to the absence of information to be associated with the vibration portion, the setting means 204 forwards the process to block 809.

At block 808, the setting means 204 associates the information with the vibration portion set in the electronic data. The association of the information can be accomplished by inputting link information to that information in the vibration setting data 212, for example. The link information may be specified in the form of a uniform resource locator (URL). See description of FIG. 3C given above for details of the scheme of an embodiment for associating the information with the vibration portion.

At block 809, the setting means 204 determines whether or not the settings for the vibration portion have been completed. The setting means 204 may present a window to the user to ask the user whether the settings for the vibration portion have been completed. In response to the completion of the settings for the vibration portion, the setting means 204 forwards the process to block 810. On the other hand, if the settings for the vibration portion have not been completed, the setting means returns the process to block 804 and repeats blocks 804 to 809.

At block 810, the setting means 204 determines whether or not the vibration sequence or the mode of vibration of the plurality of vibration portions set in the electronic data is to be changed. In response to a request from the user to change the vibration sequence or the mode of vibration, the setting means 204 forwards the process to block 811. On the other hand, in response to a request from the user to exit the vibration setting mode, the setting means 204 determines that there is not a request to change the vibration sequence and mode of vibration and forwards the process to the end block 812. See the description of FIG. 3B given above for details of the scheme for changing the vibration sequence. In the case of changing the mode of vibration, a window for changing the mode of vibration may be displayed as in the case of changing the sequence of vibration illustrated in FIG. 3B so that the mode of vibration for each vibration portion can be set. For example, the user can set the intensity, the number of times, duration, or mode of vibration. The user can select a mode of vibration from a menu, such as vibration of part of or the entire screen, or the way of vibration (for example, in the horizontal or vertical direction of the screen).

At block 811, the setting means 204 registers the changed vibration sequence numbers or vibration attributes in the vibration setting data 212.

At block 812, the setting apparatus 101-1 ends the process.

Figure 8B:
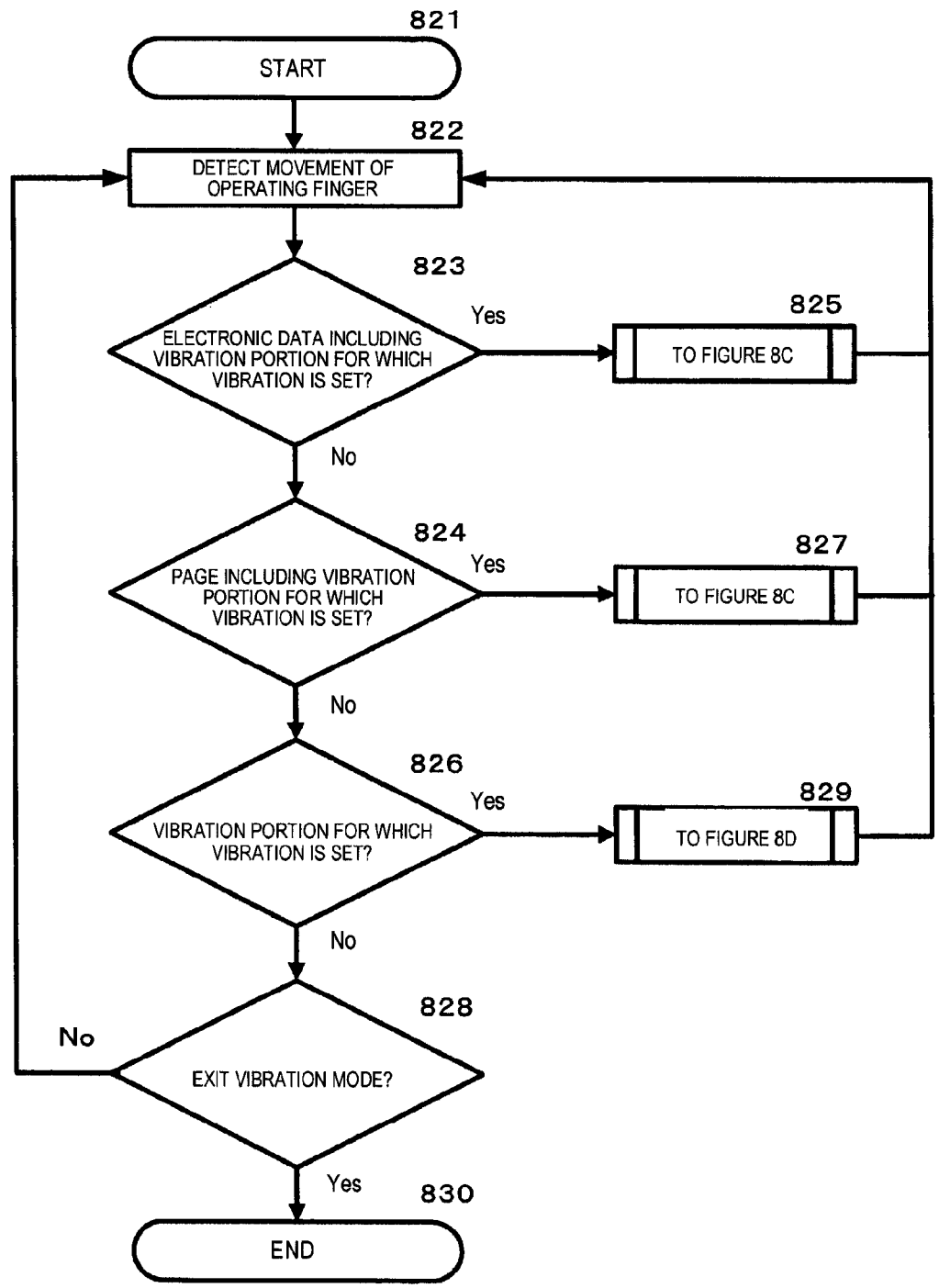
FIG. 8B illustrates a flowchart of a process for causing vibrations in a set vibration sequence and displaying information associated with a plurality of vibration portions in response to the plurality of vibration portions set in electronic data being specified with a movable object according to an embodiment.
Figure 8C:
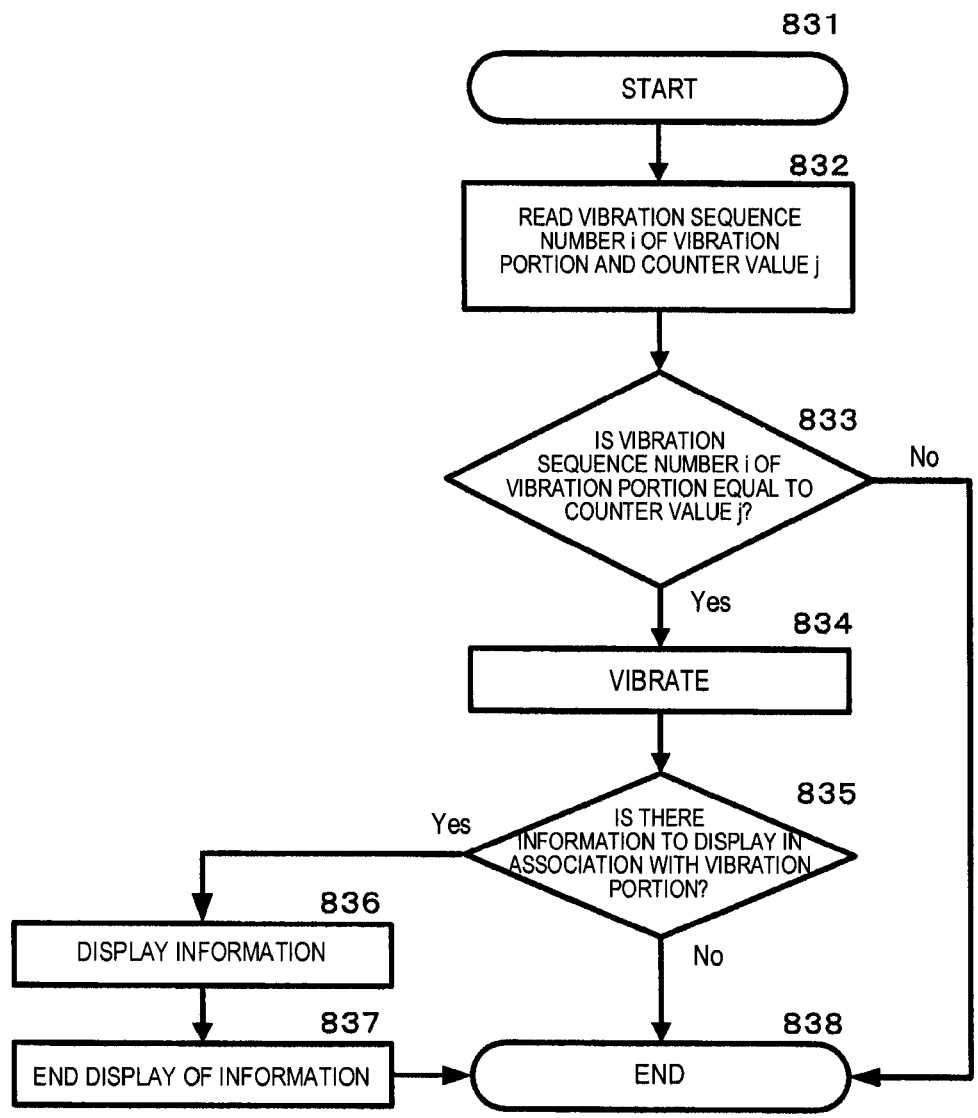
FIG. 8C illustrates a flowchart of a process for causing vibrations in a set vibration sequence and displaying information associated with a plurality of vibration portions in response to the plurality of vibration portions set in electronic data being specified with a movable object according to an embodiment.
Figure 8D:
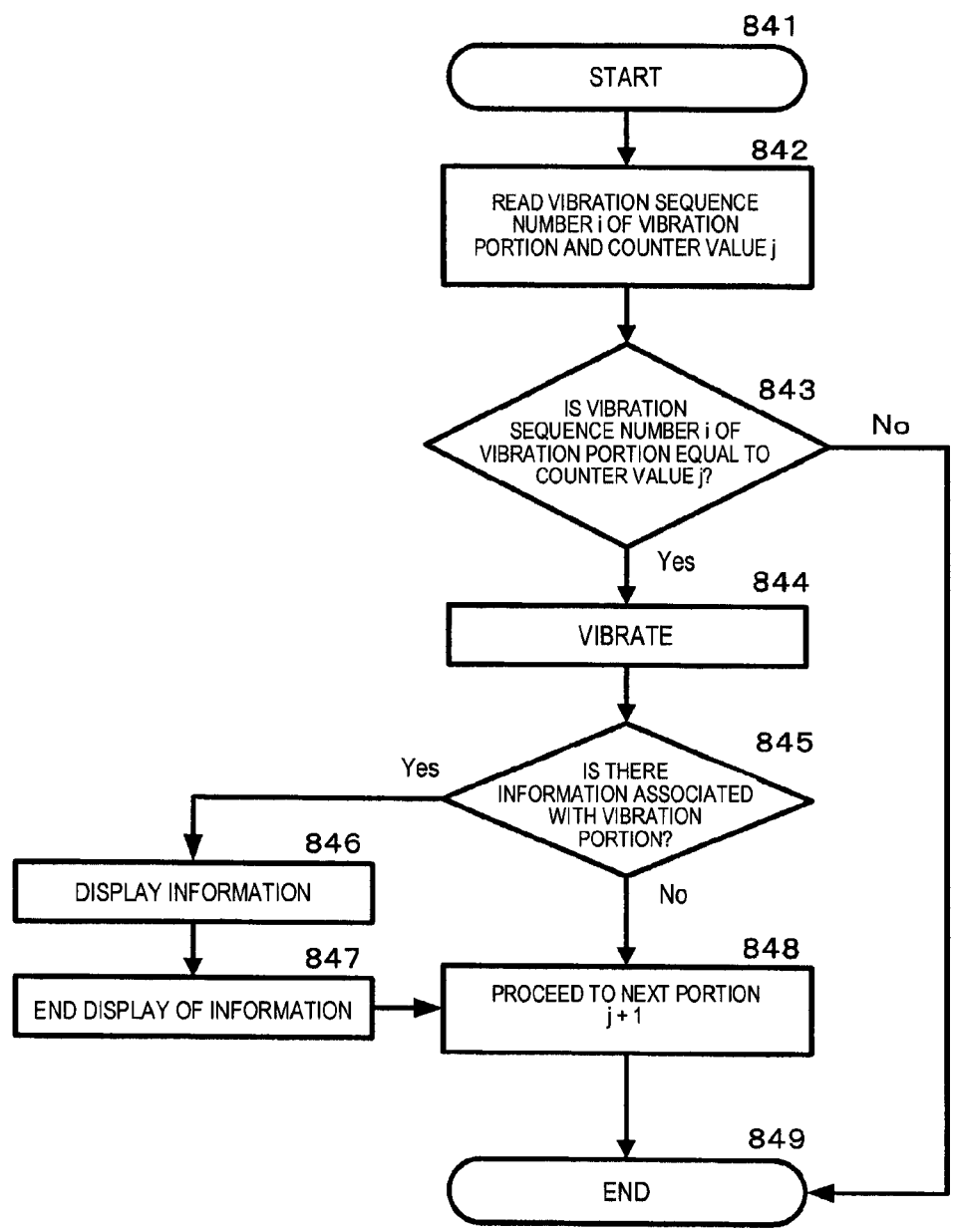
FIG. 8D illustrates a flowchart of a process for causing vibrations in a set vibration sequence and displaying information associated with a plurality of vibration portions in response to the plurality of vibration portions set in electronic data being specified with a movable object according to an embodiment.

FIGS. 8B, 8C and 8D illustrate flowcharts of a process for causing vibrations according to a set vibration sequence in response to a plurality of vibration portions set in electronic data being specified with a movable object and displaying information associated with the vibration portions according to an embodiment.

FIG. 8B illustrates a flowchart of a process for determining whether a vibration portion for which vibration is set is included in electronic data or in a page in the process for causing vibration in accordance with a set vibration sequence according to an embodiment.

At block 821, the apparatus with vibrating means 101-2 enters the vibration mode and starts the process. The display control means 207 reads electronic data to access from the storage device 210 or downloads electronic data to access from a network and displays the electronic data on the display device 201 of the apparatus with vibrating means 101-2.

At block 822, the vibration control means 206 detects a movement of an operating finger and determines the location of the operating finger.

At block 823, the vibration control means 206 determines whether or not the location of the operating finger is in electronic data including a vibration portion for which vibration is set. In response to the location of the operating finger not being in electronic data including a vibration portion for which vibration is set, the vibration control means 206 forwards the process to block 824. On the other hand, in response to the location of the operating finger being in electronic data including a vibration portion for which vibration is set, the vibration control means 206 forwards the process to block 831 of FIG. 8C at block 825.

At block 824, the vibration control means 206 determines whether or not the location of the operating finger is on a page including a vibration portion for which vibration is set. In response to the location of the operating finger not being on a page including a vibration portion for which vibration is set, the vibration control means 206 forwards the process to block 826. On the other hand, in response to the location of the operating finger being on a page including a vibration portion for which vibration is set, the vibration control means 206 forwards the process to block 831 of FIG. 8C at block 827.

At block 826, the vibration control means 206 determines whether or not the location of the operating finger is in a vibration portion for which vibration is set. In response to the location of the operating finger not being in a vibration portion for which vibration is set, the vibration control means 206 forwards the process to block 828. On the other hand, in response to the location of the operating finger being in a vibration portion for which vibration is set, the vibration control means 206 forwards the process to block 841 of FIG. 8D at block 829.

At block 828, the vibration control means 206 determines whether or not the vibration mode is to be existed. The vibration control means 206 may display a window to ask the user whether or not to exit the vibration mode. In response to the determination to exit the vibration mode, the vibration control means 206 forwards the process to block 830. In response to the determination not to exit the vibration mode, the vibration control means returns the process to block 822.

At block 830, the apparatus with vibrating means 101-2 ends the process with switching from the vibration mode to a normal mode.

FIG. 8C illustrates a process of an embodiment that follows blocks 823 and 824 in FIG. 8B.

After block 823 or 824, the vibration control means 206 starts at block 831 a vibration process and a process for displaying information associated with the electronic data or page that includes a vibration portion (information to be displayed in association with a vibration portion).

In response to the location of the operating finger at block 823 being electronic data including a vibration portion for which vibration is set, the vibration control means 206 reads the vibration sequence number i of the vibration portion from the vibration setting data 212 at block 832. Or, in response to the location of the operating finger at block 824 being a page including a vibration portion for which vibration is set, the vibration control means 206 reads the vibration sequence number i of the vibration portion from the vibration setting data 212 at block 832. The vibration control means 206 also reads the counter value j from the main memory 103.

At block 833, the vibration control means 206 compares the vibration sequence number i of the vibration portion with the counter value j. In response to the vibration sequence number i being equal to the counter value j, the vibration control means 206 forwards the process to block 834. In response to the vibration sequence number i being not equal to the counter value j, the vibration control means 206 forwards the process to block 838, which is the end block. The vibration control means 206 returns the process to block 822, detects a movement of the operating finger and determines the location of the operating finger.

In response to the vibration sequence number i being equal to the counter value j, the vibration control means 206 sends a vibration instruction to the vibrating means 205 at block 834. The vibrating means 205 receives the vibration instruction and triggers vibration. See the examples in FIGS. 6A and 6B, FIGS. 6C and 6D, FIGS. 6E and 6F, FIGS. 6G to 6I and FIGS. 6J to 6K for a vibration embodiment.

At block 835, the display control means 207 determines whether or not there is information to display in association with the vibration portion. The display control means 207 can make this determination by referring to the vibration setting data 212 to check whether or not a link to information to be displayed in association with the vibration portion is contained in a record corresponding to the vibration portion. In response to information to display in accordance with the vibration portion being found, the display control means 207 forwards the process to block 836. On the other hand, information to display in accordance with the vibration portion not being found, the display control means 207 forwards the process to block 838, which is the end block.

In response to information to display in accordance with the vibration portion being found, the display control means 207 displays the information on the display device 201 at block 836.

In response to an instruction to end the display of information in association with the vibration portion, the display control means 207 ends the display at block 837.

At block 838, the display control means 207 ends the process that follows blocks 823 and 824 of FIG. 8B. In response to the end of the process, the display control means 207 returns the process to block 822 of FIG. 8B, then detects a movement of the operating finger and determines the location of the operating finger.

FIG. 8D illustrates a process of an embodiment that follows block 826 of FIG. 8B.

After block 826, the vibration control means 206 starts a vibration process and a process for displaying information associated with the vibration portion at block 841.

In response to the location of the operating finger at block 826 being in a vibration portion for which vibration is set, the vibration control means 206 reads the vibration sequence number i of the vibration portion from the vibration setting data 212 at block 842. The vibration control means 206 also reads the counter value j from the main memory 103.

At block 843, the vibration control means 206 compares the vibration sequence number i of the vibration portion with the counter value j. In response to the vibration sequence number i being equal to the counter value j, the vibration control means 206 forwards the process to block 844. In response to the vibration sequence number i not being equal to the counter value j, the vibration control means 206 proceeds the process to block 849, which is the end block, returns to block 822 (see FIG. 8B) in response to the end (see FIG. 8B), then detects a movement of the operating finger and determines the location of the operating finger.

In response to the vibration sequence number i being equal to the counter value j, the vibration control means 206 sends a vibration instruction to the vibrating means 205 at block 844. The vibrating means 205 receives the vibration instruction and triggers vibration. See the examples in FIGS. 6A and 6B, FIGS. 6C and 6D, FIGS. 6E and 6F, FIGS. 6G to 6I, and FIGS. 6J to 6K for a vibration embodiment.

At block 845, the display control means 207 determines whether or not there is information associated with the vibration portion. The display control means 207 can make the determination by referring to the vibration setting data 212 to check whether or not a link to information associated with a vibration portion is contained in a record corresponding to the vibration portion. In response to information associated with the vibration portion being found, the display control means 207 forwards the process to block 846. On the other hand, in response to information associated with the vibration portion not being found, the display control means 207 forwards the process to block 848.

In response to information associated with the vibration portion being found, the display control means 207 displays the information on the display device 201 at block 846. See examples in FIGS. 6G to 6I and FIGS. 6J to 6K for the display of the information associated with the vibration portion of an embodiment.

In response to an instruction to end the display of the information, the display control means 207 ends the display at block 847.

At block 848, the display control means 207 assigns j+1 to the counter value j.

At block 849, the display control means 207 ends the process that follows block 826. In response to the end of the process, the display control means 207 returns the process to block 822 (see FIG. 8B), then detects a movement of the operating finger and determines the location of the operating finger.

Figure 9A:
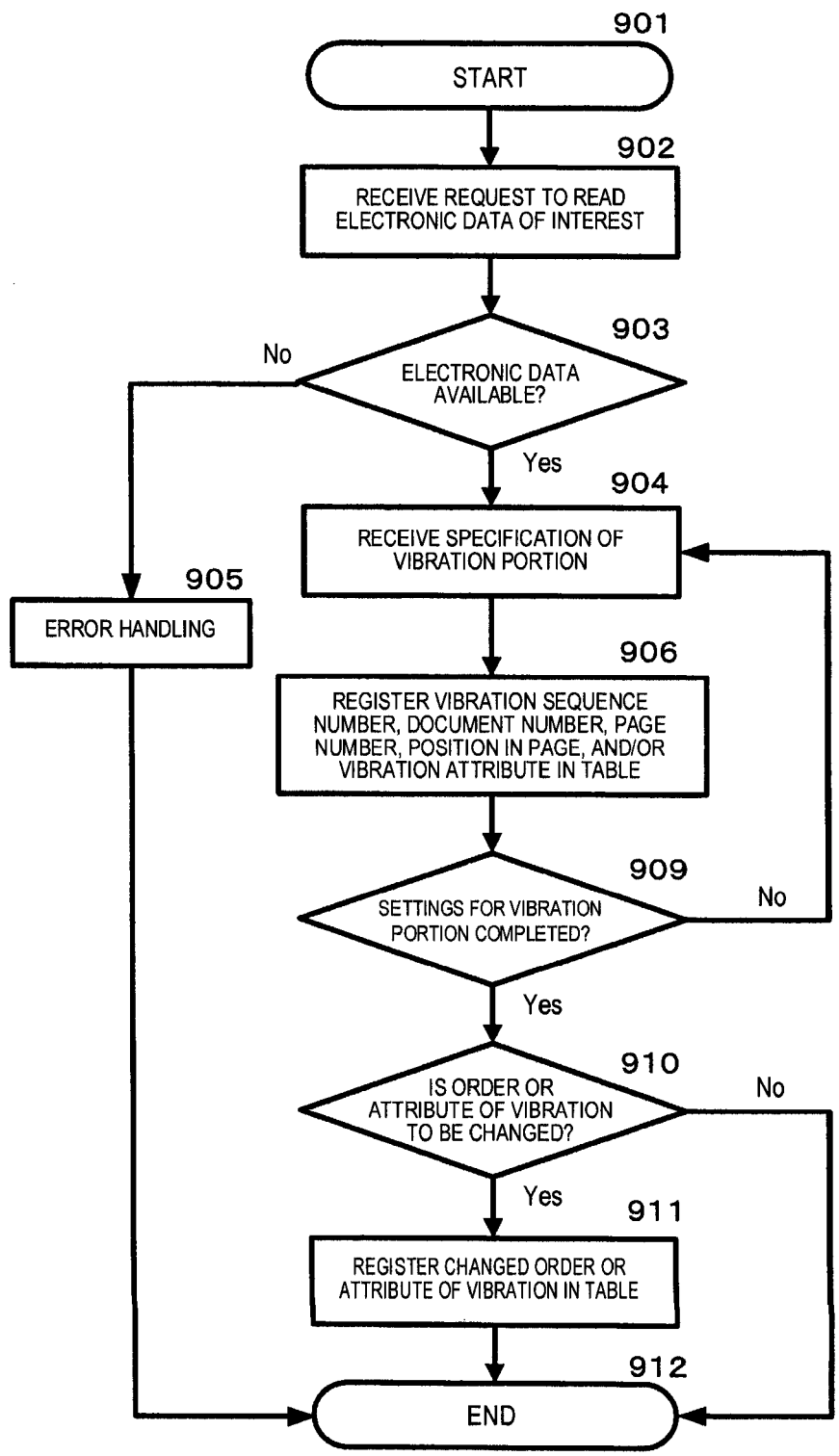
FIG. 9A illustrates a flowchart of a process for setting a plurality of vibration portions in electronic data according to an embodiment.

FIG. 9A illustrates a flowchart of a process for setting a plurality of vibration portions in electronic data according to an embodiment when information does not need to be associated with the vibration portions.

Blocks 901 to 906 and blocks 909 to 912 of FIG. 9A correspond to blocks 801 to 806 and blocks 809 to 812, respectively, of FIG. 8A. The flowchart of FIG. 9A differs from the flowchart of FIG. 8A in that the flowchart of FIG. 9A does not include block 807 of FIG. 8A. See the descriptions of blocks 801 to 806 and blocks 809 to 812 of FIG. 8A for details of blocks 901 to 906 and blocks 909 to 912 of FIG. 9A.

Figure 9B:
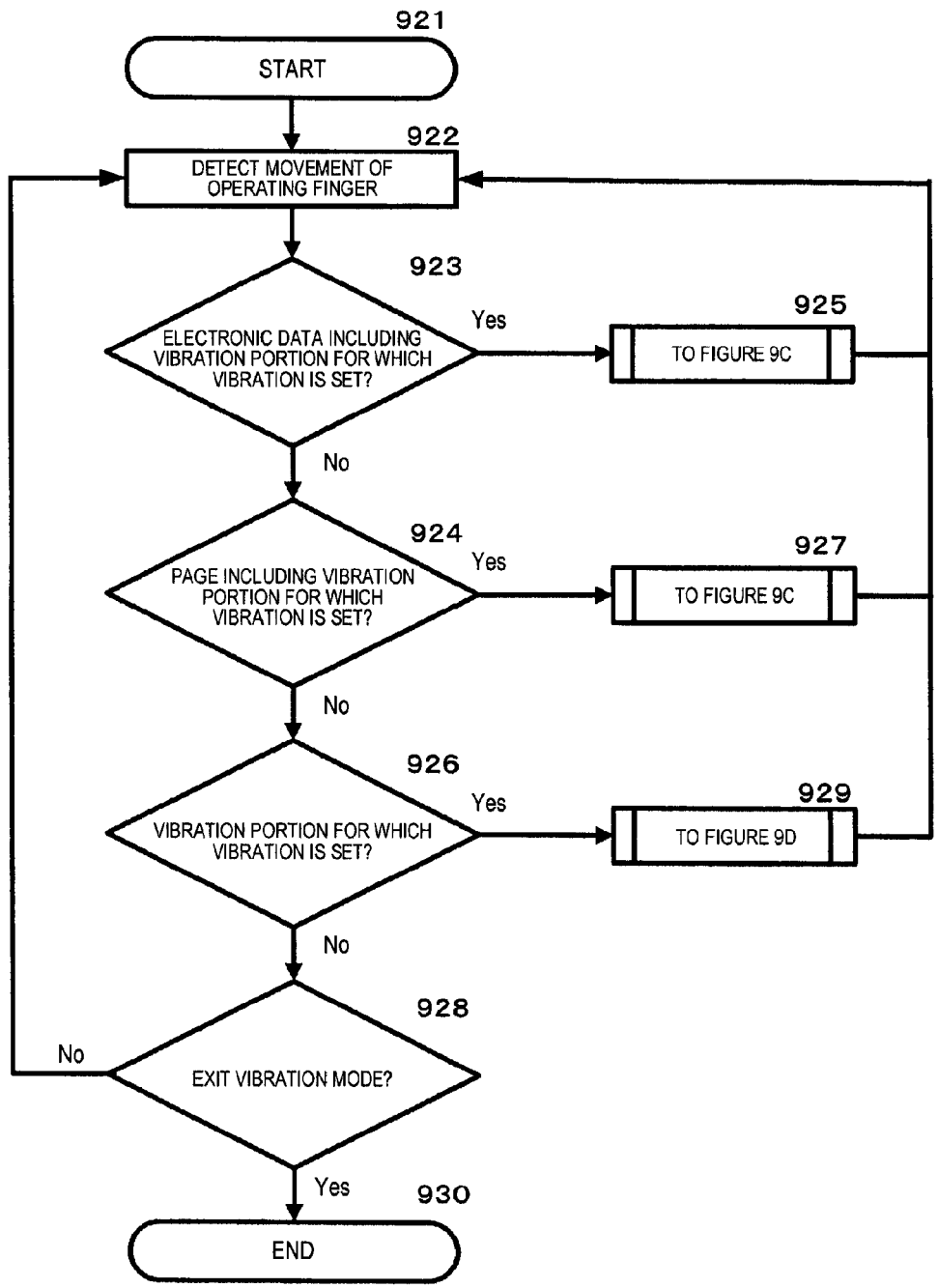
FIG. 9B illustrates a flowchart of a process for causing vibrations in a set vibration sequence in response to a plurality of vibration portions set in electronic data being specified with a movable object according to an embodiment.
Figure 9C:
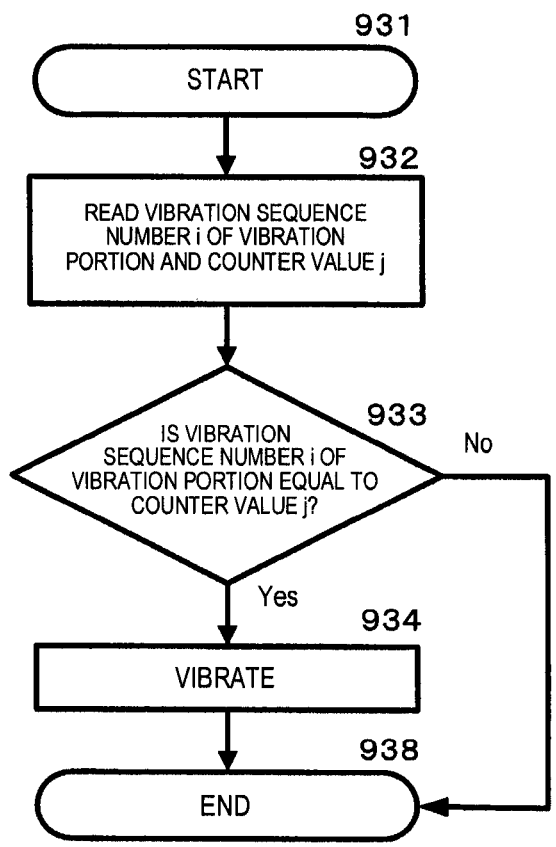
FIG. 9C illustrates a flowchart of a process for causing vibrations in a set vibration sequence in response to a plurality of vibration portions set in electronic data being specified with a movable object according to an embodiment.
Figure 9D:
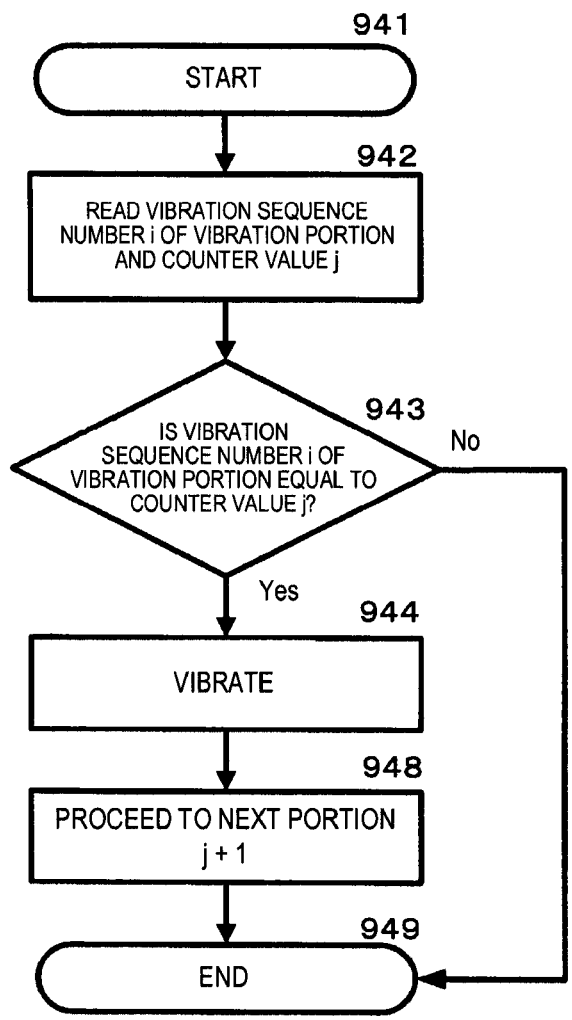
FIG. 9D illustrates a flowchart of a process for causing vibrations in a set vibration sequence in response to a plurality of vibration portions set in electronic data being specified with a movable object according to an embodiment.

FIGS. 9B, 9C and 9D illustrate flowcharts of processes for causing vibration in a set vibration sequence in response to a plurality of vibration portions set in electronic data being specified with a movable object according to an embodiment when information does not need to be associated with the vibration portions.

Blocks 921 to 930 of FIG. 9B correspond to blocks 821 to 830, respectively, of FIG. 8B. The flowchart of FIG. 9B does not differ from the flowchart of FIG. 8B. See the descriptions of blocks 821 to 830 of FIG. 8B for details of blocks 921 to 9 of FIG. 9B.

Blocks 931 to 934 and 938 of FIG. 9C correspond to blocks 831 to 834 and 838, respectively, of FIG. 8C. The flowchart of FIG. 9C differs from the flowchart of FIG. 8C in that the flowchart of FIG. 9C does not include blocks 835 to 837 of FIG. 8C. See the descriptions of blocks 831 to 834 and 838 for details of blocks 931 to 934 and 938 of FIG. 9C.

Blocks 941 to 944 and 948 to 949 of FIG. 9D correspond to blocks 841 to 844 and 848 to 849, respectively, of FIG. 8D. The flowchart of FIG. 9D differs from the flowchart of FIG. 8D in that the flowchart of FIG. 9D does not include blocks 845 to 847 of FIG. 8D. See the descriptions of blocks 841 to 844 and 848 to 849 for details of blocks 941 to 944 and 948 to 949 of FIG. 9D.

Embodiments disclosed herein provide a method for setting vibration portions in one or more pieces of electronic data displayable on a display device. The setting method includes displaying the one or more pieces of electronic data on the display device. In response to a first portion in the one or more pieces of electronic data being specified on the display device, setting the specified first portion as a first vibration portion, the first vibration portion causing first vibration in response to the first vibration portion being specified with a movable object. In response to a second portion in the one or more pieces of electronic data being specified on the display device, setting the specified second portion as a second vibration portion, the second vibration portion causing second vibration in response to the second vibration portion being specified with a movable object, wherein data storing settings for generating the first vibration and the second vibration includes a vibration sequence in which the first vibration and the second vibration are generated.

According to another embodiment, the setting of the first portion as a first vibration portion may further include associating the first vibration portion with first information so that the first information associated with the first vibration portion is displayed on the display device in response to occurrence of the first vibration. Setting the first portion as a first vibration portion may further include causing the second vibration in response to the second vibration portion being specified with the movable object after the first information associated with the first vibration portion is displayed on the display device. Setting the second portion as a second vibration portion may further include associating the second vibration portion with second information so that the second information associated with the second vibration portion is displayed on the display device in response to occurrence of the second vibration.

According to another embodiment, a vibration sequence in which the first vibration and the second vibration are triggered may be in accordance with an order in which the first vibration portion and the second vibration portion have been specified. The vibration sequence can be changed by a user. In one embodiment, the setting method may further include providing a user interface for changing the vibration sequence. In another embodiment, the setting method may further include providing a graphical user interface for allowing the user to change the vibration sequence.

In another embodiment, the electronic data may include a plurality of pages, the first vibration portion may be a first portion of one particular page among the plurality of pages, the second vibration portion may be a second portion of the particular page, the second portion being different from the first portion, and the data storing the settings may be set so that the first vibration is triggered in response to the first vibration portion being specified with the movable object and then the second vibration is triggered in response to the second vibration portion being specified with the movable object.

In another embodiment, the electronic data may include a plurality of pages, the first vibration portion may be a first portion of a first page among the plurality of pages, the second vibration portion may be a second portion of a second page among the plurality of pages, the second page being different from the first page, and the data storing the settings may be set so that the first vibration is triggered in response to the first vibration portion being specified with the movable object and then the second vibration is triggered in response to the second vibration portion being specified with the movable object.

According to another embodiment, the electronic data may include a plurality of pages, the first vibration portion may be one particular page among the plurality of pages, the second vibration portion may be a particular portion of the particular page, and the data storing the settings may be set so that the first vibration is triggered in response to the first vibration portion being specified with the movable object and then the second vibration is triggered in response to the second vibration portion being specified with the movable object.

According to another embodiment, the setting method may further include providing a user interface for allowing setting of a vibration attribute of the first or second vibration. In an embodiment, the setting method may further include providing a graphical user interface for allowing the user to set a vibration attribute of the first or second vibration.

Embodiments disclosed herein further provide a method for causing vibration on an apparatus which is connected with a display device including vibrating means in response to a predetermined portion in one or more pieces of electronic data displayable on the display device being specified with a movable object (hereinafter also referred to as the vibrating method). The vibrating method includes displaying on the display device the one or more pieces of electronic data in which a plurality of vibration portions are set; generating first vibration in response to a first vibration portion in the one or more pieces of electronic data being specified with the movable object on the display device; and generating second vibration in response to a second vibration portion in the one or more pieces of electronic data being specified with the movable object on the display device, wherein the one or more pieces of electronic data are associated with data storing settings for generating the first vibration and the second vibration, and the data storing the settings includes a vibration sequence in which the first vibration and the second vibration are generated.

According to another embodiment, the vibrating method may further include displaying the first information associated with the first vibration portion on the display device in response to occurrence of the first vibration. In another embodiment, the vibrating method may further include displaying first information associated with the first vibration portion on the display device in response to occurrence of the first vibration, wherein causing the second vibration in response to the second vibration portion being specified with the movable object may be executed after the first information associated with the first vibration portion is displayed on the display device. In another embodiment, the vibrating method may further include displaying second information associated with the second vibration portion on the display device in response to occurrence of the second vibration.

According to an embodiment, the vibration sequence in which the first vibration and the second vibration are triggered may be in accordance with an order in which the first vibration portion and the second vibration portion have been specified.

According to another embodiment, the electronic data may include a plurality of pages, the first vibration portion may be a first portion of one particular page among the plurality of pages, the second vibration portion may be a second portion of the particular page, the second portion being different from the first portion, the method may further include causing third vibration in response to the page including the first vibration portion being specified with the movable object on the display device, and the third vibration, the first vibration and the second vibration may be triggered in this order.

According to another embodiment, the electronic data may include a plurality of pages, the first vibration portion may be a first portion of a first page among the plurality of pages, the second vibration portion may be a second portion of a second page among the plurality of pages, the second page being different from the first page, the vibrating method may further include causing third vibration in response to the page including the first vibration portion being specified with the movable object on the display device and causing fourth vibration in response to the page including the second vibration portion being specified with the movable object on the display device, and the third vibration, the first vibration, the fourth vibration and the second vibration may be triggered in this order. According to another embodiment, the first vibration portion may be one particular page among the plurality of pages, the second vibration portion may be a particular portion of the particular page, and the first vibration and the second vibration may be triggered in this order.

According to another embodiment, specifications of the first and second vibration portions of the electronic data with the movable object may be detected by a pressure sensor capable of sensing pressure applied by the movable object in contact with the screen (hereinafter also referred to as a pressure sensor) or a sensor capable of sensing the distance of movement of the movable object near the screen in the direction perpendicular to the screen (hereinafter also referred to as a sensor capable of sensing moving distance).

Embodiments disclosed herein further provide an apparatus setting a vibration portion in one or more pieces of electronic data (hereinafter also referred to as the setting apparatus). The setting apparatus includes a display device capable of displaying the one or more pieces of electronic data and setting means for setting a first portion of the one or more pieces of electronic data as a first vibration portion in response to the first portion being specified on the display device and setting a second portion of the one or more pieces of electronic data as a second vibration portion in response to the second portion being specified on the display device, wherein first vibration is triggered in response to the first vibration portion being specified with a movable object and second vibration is triggered in response to the second vibration portion being specified with the movable object. The setting apparatus includes memory means for storing data storing settings for causing the first vibration and the second vibration, wherein the data includes the vibration sequence in which the first vibration and the second vibration are triggered.

According to another embodiment, the setting means may associate the first vibration portion with first information so that the first information associated with the first vibration portion is displayed on the display device in response to occurrence of the first vibration. According to another embodiment, the setting means may associate so that the second vibration is triggered in response to the second vibration portion being specified with the movable object after the first information associated with the first vibration portion is displayed on the display device. According to another embodiment, the setting apparatus may associate the second vibration portion with second information so that the second information associated with the second vibration portion is displayed on the display device in response to occurrence of the second vibration.

According to another embodiment, the vibration sequence in which the first vibration and the second vibration are triggered may be in accordance with the order in which the first vibration portion and the second vibration portion have been specified. According to another embodiment, the vibration sequence can be changed by a user. In one embodiment of the setting apparatus according to the present invention, the setting means may provide a user interface for changing the vibration sequence. According to another embodiment, the setting means may provide a graphical user interface for allowing a user to change the vibration sequence.

According to another embodiment, the electronic data may include a plurality of pages, the first vibration portion maybe a first portion of one particular page among the plurality of pages, the second vibration portion may be a second portion of the particular page that differs from the first portion, the setting means may set the data that stores the settings so that the first vibration is triggered in response to the first vibration portion being specified with the movable object and then the second vibration is triggered in response to the second vibration portion being specified with the movable object. According to another embodiment, the electronic data may include a plurality of pages, the first vibration portion may be a first portion of a first page among the plurality of pages, the second vibration portion may be a second portion of a second page among the plurality of pages that is different from the first page, the setting means may set the data that stores the settings so that the first vibration is triggered in response to the first vibration portion being specified with the movable object and then the second vibration is triggered in response to the second vibration portion being specified with the movable object. According to another embodiment, the electronic data may include a plurality of pages, the first vibration portion may be one particular page among the plurality of pages, the second vibration portion may be a particular portion of the particular page, and the setting means may set the data that stores the settings so that the first vibration is triggered in response to the first vibration portion being specified with the movable object and then the second vibration is triggered in response to the second vibration portion being specified with the movable object.

According to another embodiment, a vibration attribute of the first vibration or the second vibration can be set by a user. In one embodiment of the setting apparatus, the setting means may provide a user interface for setting a vibration attribute of the first vibration or the second vibration. According to another embodiment, the setting means may provide a graphical user interface for allowing the user to set a vibration attribute of the first vibration or the second vibration.

Embodiments disclosed herein further provide an apparatus for generating vibration in response to a predetermined portion of one or more pieces of electronic data being specified with a movable object (hereinafter also referred to as the first apparatus with vibrating means). The first apparatus with vibrating means includes: a display device that displays the one or more pieces of electronic data; vibrating means for causing vibration of the display device; a CPU; and a memory connected with the CPU, wherein the one or more pieces of electronic data are associated with data storing settings for generating the first vibration and the second vibration, the data storing the settings includes a vibration sequence in which the first vibration and the second vibration are generated, and the apparatus reads the computer program according to an embodiment of the present invention into the memory and triggers the vibrating means to generate, in accordance with the order, first vibration in response to a first vibration portion in the one or more pieces of electronic data being specified with the movable object on the display device and second vibration in response to a second vibration portion in the one or more pieces of electronic data being specified with the movable object on the display device.

Embodiments disclosed herein further provide an apparatus for generating vibration in response to a predetermined portion of one or more pieces of electronic data being specified with a movable object (hereinafter also referred to as the second apparatus with vibrating means). The second apparatus with vibrating means includes: a display device capable of displaying the one or more pieces of electronic data; detection means for detecting specification with the movable object; and vibrating means for causing vibration of the display device in response to specification with the movable object; wherein the one or more pieces of electronic data are associated with data storing settings for generating the first vibration and the second vibration, the data storing the settings includes a vibration sequence in which the first vibration and the second vibration are generated, and the vibrating means generates, in accordance with the vibration sequence, the first generation in response to a first vibration portion in the one or more pieces of electronic data being specified with the movable object on the display device and the second vibration in response to a second vibration portion in the one or more pieces of electronic data being specified with the movable object on the display device.

According to another embodiment, the display device may display first information associated with the first vibration portion on the display device in response to occurrence of the first vibration. According to another embodiment, the display device may display first information associated with the first vibration portion on the display device in response to occurrence of the first vibration and the vibrating means may trigger the second vibration in response to the second vibration portion being specified with the movable object after the first information associated with the first vibration portion is displayed on the display device. According to another embodiment, the display device may display second information associated with the second vibration portion on the display device in response to occurrence of the second vibration.

According to another embodiment, the vibration sequence in which the first vibration and the second vibration are triggered may be in accordance with the order in which the first vibration portion and the second vibration portion have been specified.

According to another embodiment, the electronic data may include a plurality of pages, the first vibration portion may be a first portion of one particular page among the plurality of pages, the second vibration portion may be a second portion of the particular page that is different from the first portion, the vibrating means may trigger third vibration in response to the page including the first vibration portion being specified with the movable object on the display device, and the third vibration, the first vibration and the second vibration may be triggered in this order. According to another embodiment, the electronic data may include a plurality of pages, the first vibration portion may be a first portion of a first page among the plurality of pages, the second vibration portion may be a second portion of a second page among the plurality of pages that is different from the first page, the vibrating means may trigger third vibration in response to the page including the first vibration portion being specified with the movable object on the display device and may trigger fourth vibration in response to the page including the second vibration portion being specified with the movable object on the display device, and the third vibration, the first vibration, the fourth vibration and the second vibration may be triggered in this order. According to another embodiment, the electronic data may include a plurality of pages, the first vibration portion may be one particular page among the plurality of pages, the second vibration portion may be a particular portion of the particular page, and the first vibration and the second vibration may be triggered in this order.

According to another embodiment, the first apparatus may further include detection means for detecting specification with the movable object. The detection means may be a pressure sensor capable of sensing pressure applied by the movable object in contact with the screen (herein after also referred to as a pressure sensor) or a sensor capable of sensing the distance of movement of the movable object near the screen in the direction perpendicular to the screen (hereinafter also referred to as a sensor capable of sensing movement distance). According to another embodiment, the detection means may be the pressure sensor or the sensor capable of sensing movement distance.

Embodiments disclosed herein further provide a computer program for setting a vibration portion in one or more electronic data that can be displayed on a display device. The computer program triggers the setting apparatus to execute any one of the setting methods described above.

Embodiments disclosed herein further provide a computer program for causing vibration in response to a predetermined portion in one or more electronic data that can be displayed on a display device being specified with a movable object on the first or second apparatus with vibrating means connected to the display device including vibrating means. The computer program triggers the first or second apparatus with vibrating means to execute any one of the vibrating methods described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
   setting, by a processing device, vibration portions in one or more pieces of electronic data displayable on a display device, the vibration portions associated with sequence numbers that indicate an order of vibrations associated with the vibration portions, the processing device enforcing the order using a current sequence number to track a current location in the order, the setting of the vibration portions comprising:
   displaying the one or more pieces of electronic data on the display device;
   in response to a first portion in the one or more pieces of electronic data being specified on the display device, setting the specified first portion as a first vibration portion, the first vibration portion causing a first vibration in response to the first vibration portion being specified with a movable object and to a first sequence number associated with the first vibration portion matching the value of the current sequence number; and
   in response to a second portion in the one or more pieces of electronic data being specified on the display device, setting the specified second portion as a second vibration portion, the second vibration portion causing a second vibration in response to the second vibration portion being specified with a movable object and to a second sequence number associated with the second vibration portion matching the value of the current sequence number, the second sequence number larger than the first sequence number,
   wherein a third vibration indicates a page location of the second vibration in response to a third vibration portion including an entire page, to the third vibration portion causing the third vibration in response to the third vibration portion being specified with a movable object, to the second portion including a subset of the entire page, and to the second sequence number matching the value of the current sequence number,
   wherein the enforcing the order using a current sequence number to track a current location in the order includes the first vibration occurring prior to the second vibration.

2. The computer-implemented method according to claim 1, wherein setting the first portion as the first vibration portion further comprises associating the first vibration portion with first information so that the first information associated with the first vibration portion is displayed on the display device in response to occurrence of the first vibration.

3. The computer-implemented method according to claim 2, wherein setting the first portion as the first vibration portion further comprises triggering the second vibration in response to the second vibration portion being specified with the movable object after the first information associated with the first vibration portion is displayed on the display device.

4. The computer-implemented method according to claim 1, wherein setting the second portion as a second vibration portion further comprises associating the second vibration portion with second information so that the second information associated with the second vibration portion is displayed on the display device in response to occurrence of the second vibration.

5. The computer-implemented method according to claim 1, wherein the order of vibrations can be changed by a user.

6. The computer-implemented method according to claim 1, wherein:
   the electronic data includes a plurality of pages;
   the first vibration portion is a first portion of one particular page among the plurality of pages; and
   the second vibration portion is a second portion of the particular page, the second portion being different from the first portion.

7. The computer-implemented method according to claim 1, wherein:
   the electronic data includes a plurality of pages;
   the first vibration portion is a first portion of a first page among the plurality of pages; and
   the second vibration portion is a second portion of a second page among the plurality of pages, the second page being different from the first page.

8. The computer-implemented method according to claim 1, wherein:
the electronic data includes a plurality of pages;
the first vibration portion is one particular page among the plurality of pages; and
the second vibration portion is a particular portion of the particular page.

9. The computer-implemented method according to claim 1, further comprising providing a user interface for setting a vibration attribute of the first or second vibration.

10. A computer-implemented method, comprising:
generating, by a processing device, vibration on a display device in response to a predetermined portion in one or more pieces of electronic data on the display device being specified with a movable object, the generating of vibration on the display device comprising:
displaying on the display device the one or more pieces of electronic data in which a plurality of vibration portions are set, wherein sequence numbers associated with the vibration portions indicate an order of vibrations on the display device, and the processing device stores a value of a current sequence number to enforce the order;
generating a first vibration in response to
a first vibration portion in the one or more pieces of electronic data being specified with the movable object on the display device, and
a first sequence number associated with the first vibration portion matching the value of the current sequence number;
incrementing the value of the current sequence number based on the generating a first vibration; and
generating a second vibration in response to
a second vibration portion in the one or more pieces of electronic data being specified with the movable object on the display device, and
a second sequence number associated with the second vibration portion matching the value of the current sequence number, the second sequence number larger than the first sequence number,
wherein a third vibration indicates a page location of the second vibration in response to a third vibration portion including an entire page, to the third vibration portion causing the third vibration in response to the third vibration portion being specified with a movable object, to the second portion including a subset of the entire page, and to the second sequence number matching the value of the current sequence number,
wherein the processing device enforces the order such that the first vibration occurs prior to the second vibration.

11. The computer-implemented method according to claim 10, further comprising displaying first information associated with the first vibration portion on the display device in response to occurrence of the first vibration.

12. The computer-implemented method according to claim 11,
wherein in response to the second vibration portion being specified with the movable object, the generating the second vibration is performed after the first information associated with the first vibration portion is displayed on the display device.

13. The computer-implemented method according to claim 10, further comprising displaying second information associated with the second vibration portion on the display device in response to occurrence of the second vibration.

14. The computer-implemented method according to claim 10, wherein:
the electronic data includes a plurality of pages;
the first vibration portion is a first portion of one particular page among the plurality of pages;
the second vibration portion is a second portion of the particular page, the second portion being different from the first portion;
the method further comprises causing a fourth vibration in response to the page
including the first vibration portion being specified with the movable object on the display device and to a sequence number associated with the fourth vibration portion matching the value of the current sequence number; and
the fourth vibration, the first vibration and the second vibration are triggered in this sequence.

15. The computer-implemented method according to claim 14, wherein;
the method further comprises causing a fifth vibration in response to the page including the second
vibration portion being specified with the movable object on the display device and to a sequence number associated with the fifth vibration portion matching the value of the current sequence number; and
the fourth vibration, the first vibration, the fifth vibration and the second vibration
are triggered in this sequence.

16. The computer-implemented method according to claim 10, wherein:
the electronic data includes a plurality of pages;
the first vibration portion is one particular page among the plurality of pages; and
the second vibration portion is a particular portion of the particular page.

17. A computer program product for causing vibration in response to a predetermined portion in one or more pieces of electronic data displayable on a display apparatus with a vibrating device being specified with a movable object, the computer program product comprising a non-transitory computer readable storage medium having program code embodied therewith, the program code executable by a processor for causing a device connected to the display device to execute a method comprising:
generating, by a processing device, vibration on a display device in response to a predetermined portion in one or more pieces of electronic data on the display device being specified with a movable object, the generating of vibration on the display device comprising:
displaying on the display device the one or more pieces of electronic data in which a plurality of vibration portions are set, wherein sequence numbers associated with the vibration portions indicate an order of vibrations on the display device, and the processing device stores a value of a current sequence number to enforce the order;
generating a first vibration in response to
a first vibration portion in the one or more pieces of electronic data being specified with the movable object on the display device, and
a first sequence number associated with the first vibration portion matching the value of the current sequence number;
incrementing the value of the current sequence number based on the generating a first vibration; and
generating a second vibration in response to a second vibration portion in the one or more pieces of electronic data being specified with the movable object on the display device, and a second sequence number associated with the second vibration portion matching the value of the current sequence number, the second sequence number larger than the first sequence number, wherein a third vibration indicates a page location of the second vibration in response to a third vibration portion including an entire page, to the third vibration portion causing the third vibration in response to the third vibration portion being specified with a movable object, to the second portion including a subset of the entire page, and to the second sequence number matching the value of the current sequence number, wherein the processing device enforces the order such that the first vibration occurs prior to the second vibration.

18. An apparatus, comprising:

a display device for displaying one or more pieces of electronic data;

a vibrating device for causing vibration of the display device;

a central processing unit (CPU); and a memory connected with the CPU, the apparatus configured for:

generating, by a processing device, vibration on a display device in response to a predetermined portion in one or more pieces of electronic data on the display device being specified with a movable object, the generating of vibration on the display device comprising:

displaying on the display device the one or more pieces of electronic data in which a plurality of vibration portions are set, wherein sequence numbers associated with the vibration portions indicate an order of vibrations on the display device, and the processing device stores a value of a current sequence number to enforce the order;

generating a first vibration in response to a first vibration portion in the one or more pieces of electronic data being specified with the movable object on the display device, and a first sequence number associated with the first vibration portion matching the value of the current sequence number;

incrementing the value of the current sequence number based on the generating a first vibration; and generating a second vibration in response to a second vibration portion in the one or more pieces of electronic data being specified with the movable object on the display device, and a second sequence number associated with the second vibration portion matching the value of the current sequence number, the second sequence number larger than the first sequence number, wherein a third vibration indicates a page location of the second vibration in response to a third vibration portion including an entire page, to the third vibration portion causing the third vibration in response to the third vibration portion being specified with a movable object, to the second portion including a subset of the entire page, and to the second sequence number matching the value of the current sequence number, wherein the processing device enforces the order such that the first vibration occurs prior to the second vibration.

* * * * *